Dec. 9, 1930. P. S. SMITH ET AL 1,784,552
MACHINE FOR PRODUCTION OF PILE FABRICS
Filed Feb. 23, 1929 30 Sheets-Sheet 21
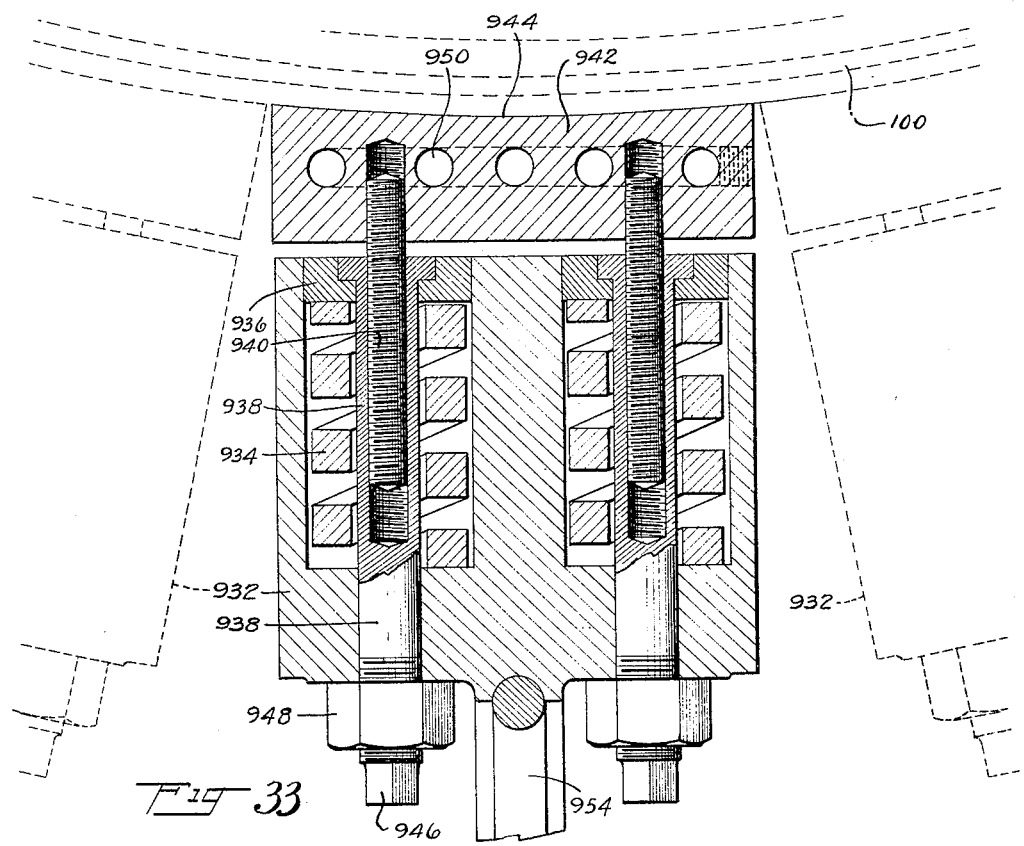
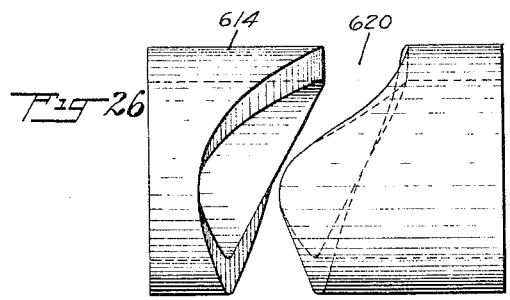
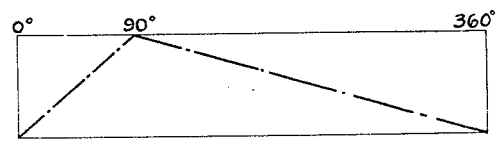
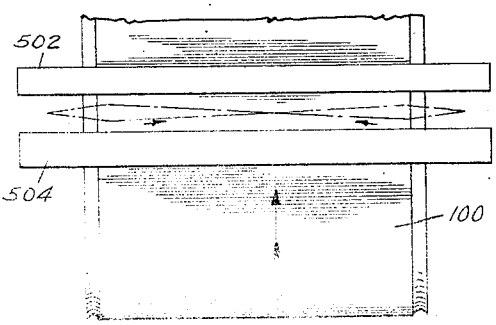
INVENTORS:
Paul S. Smith
Emil G. Jegge
BY
ATTORNEY.

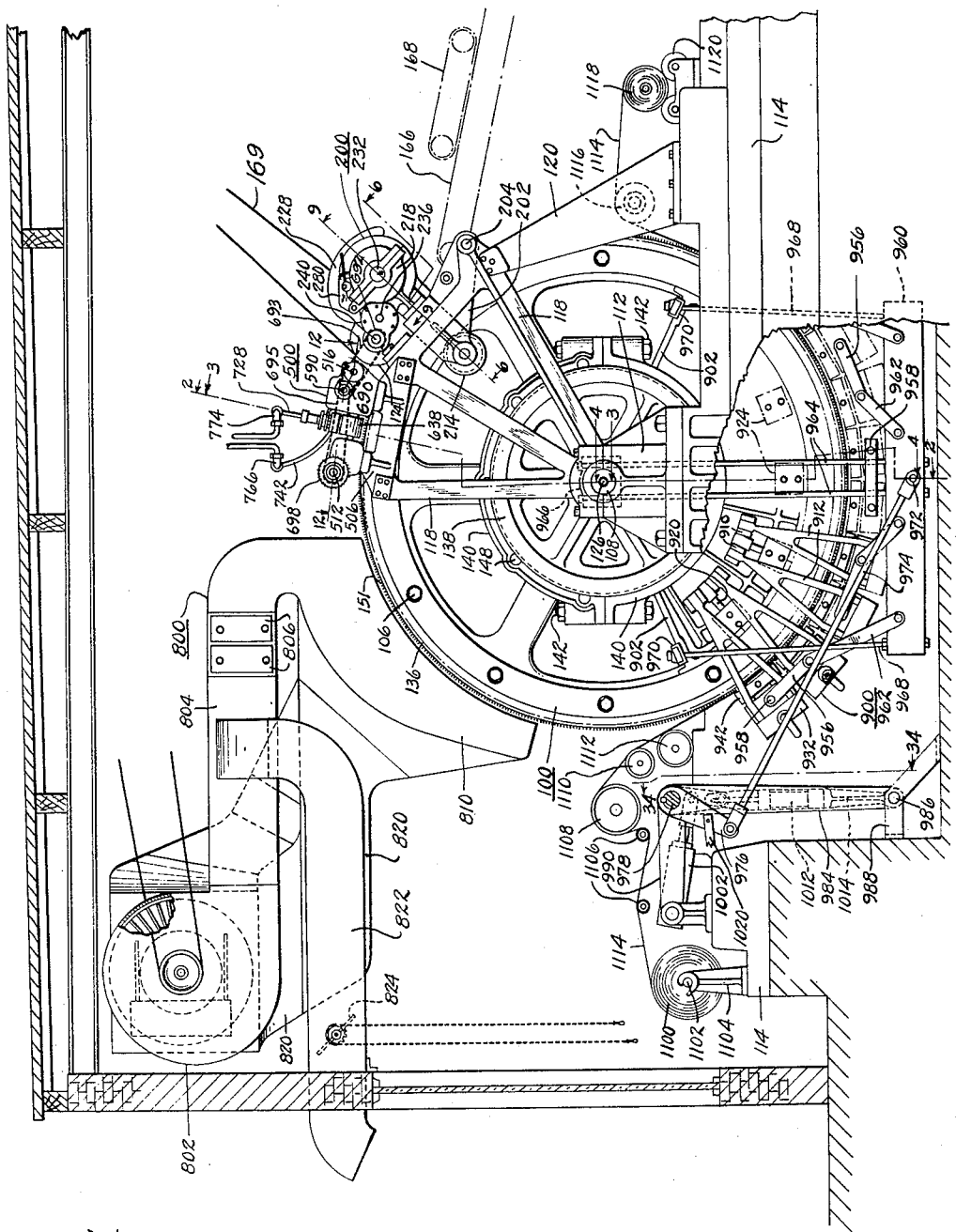

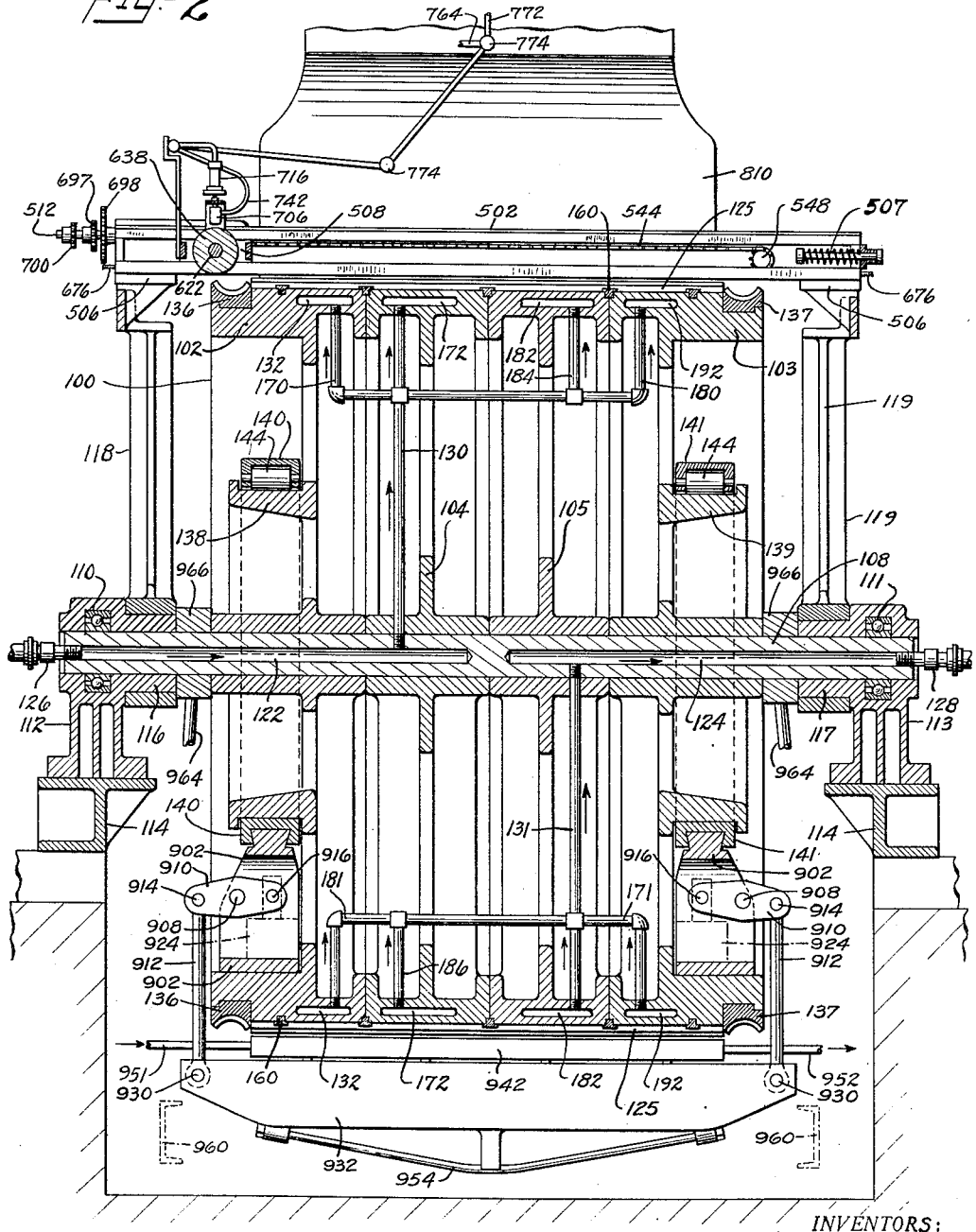

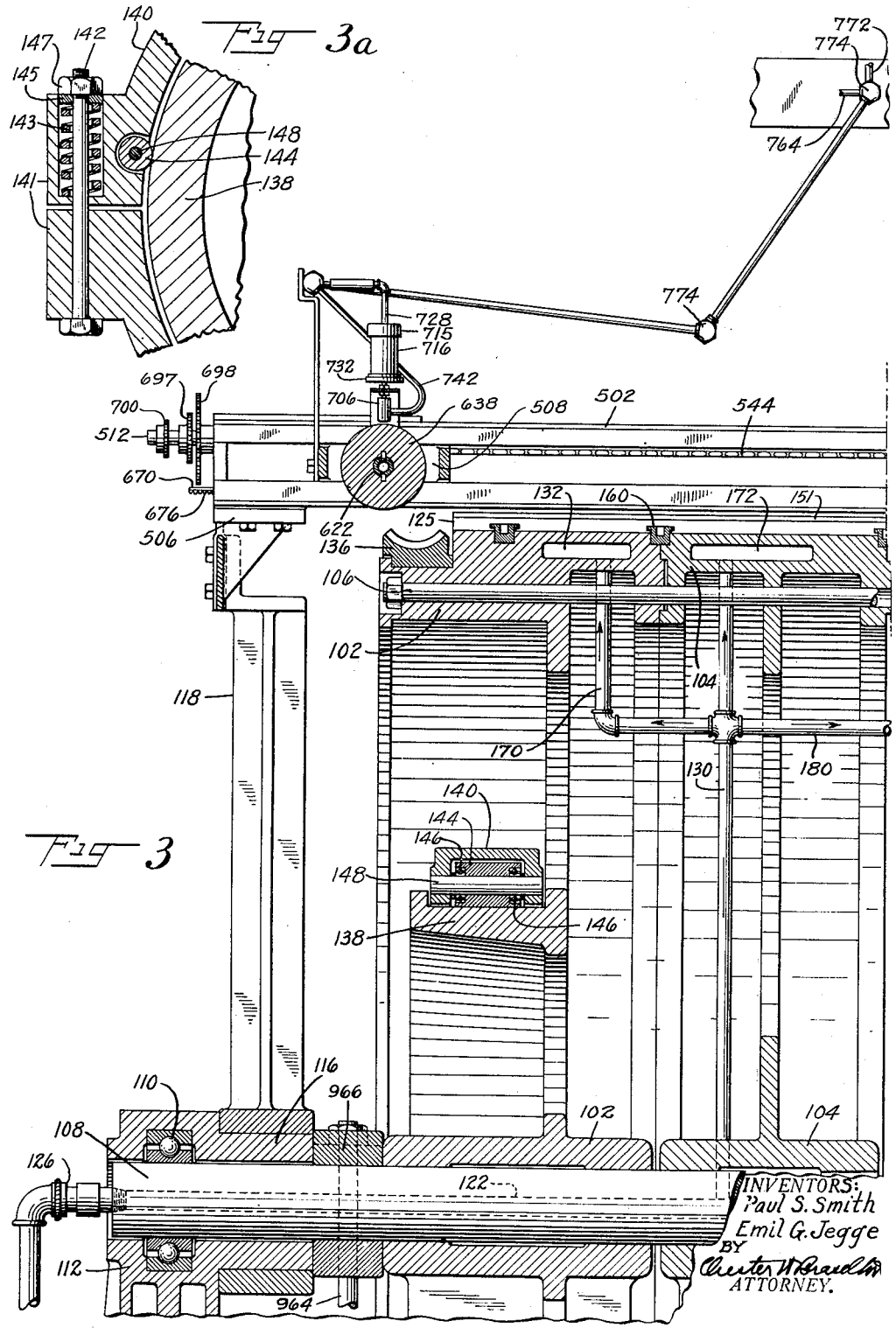

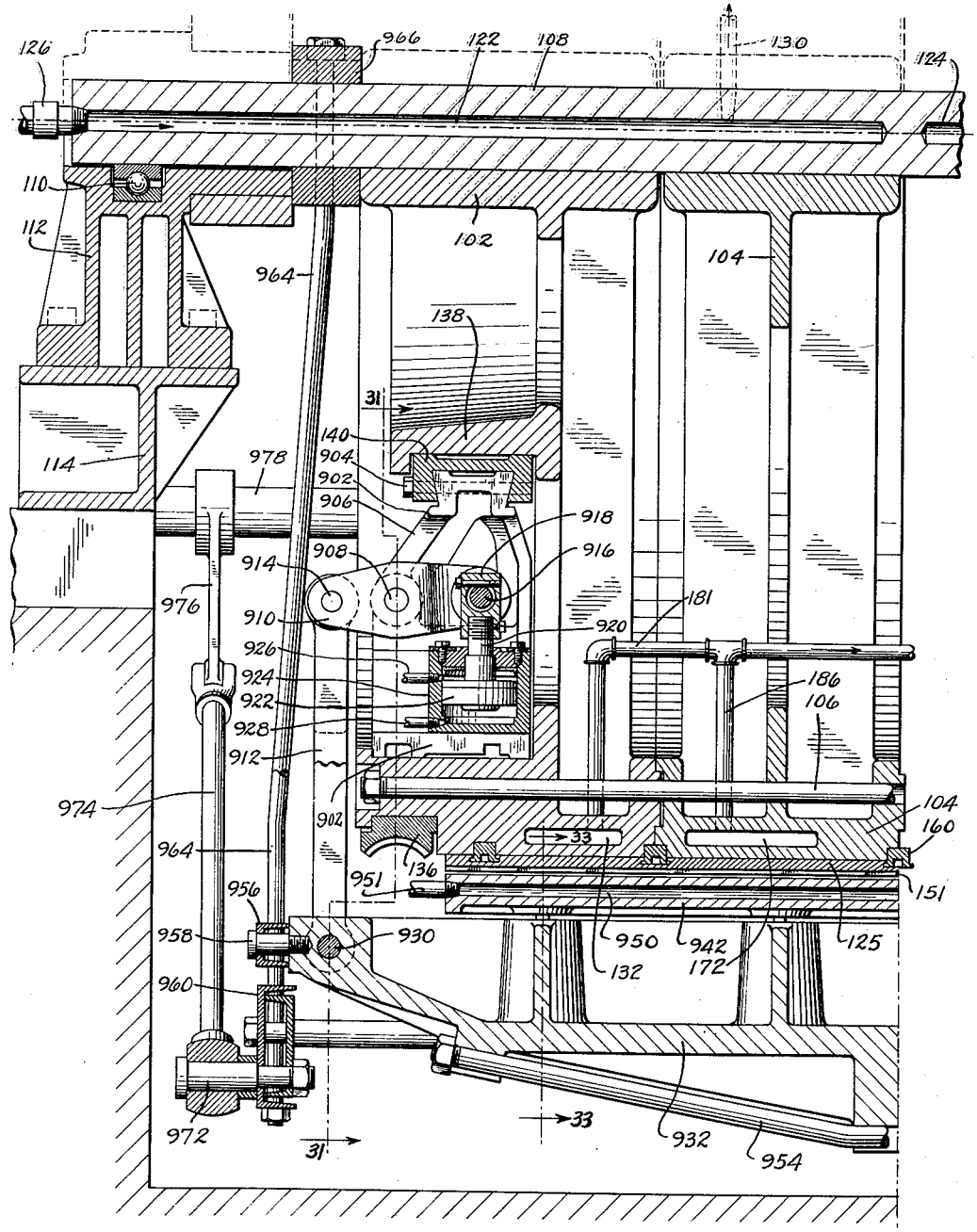

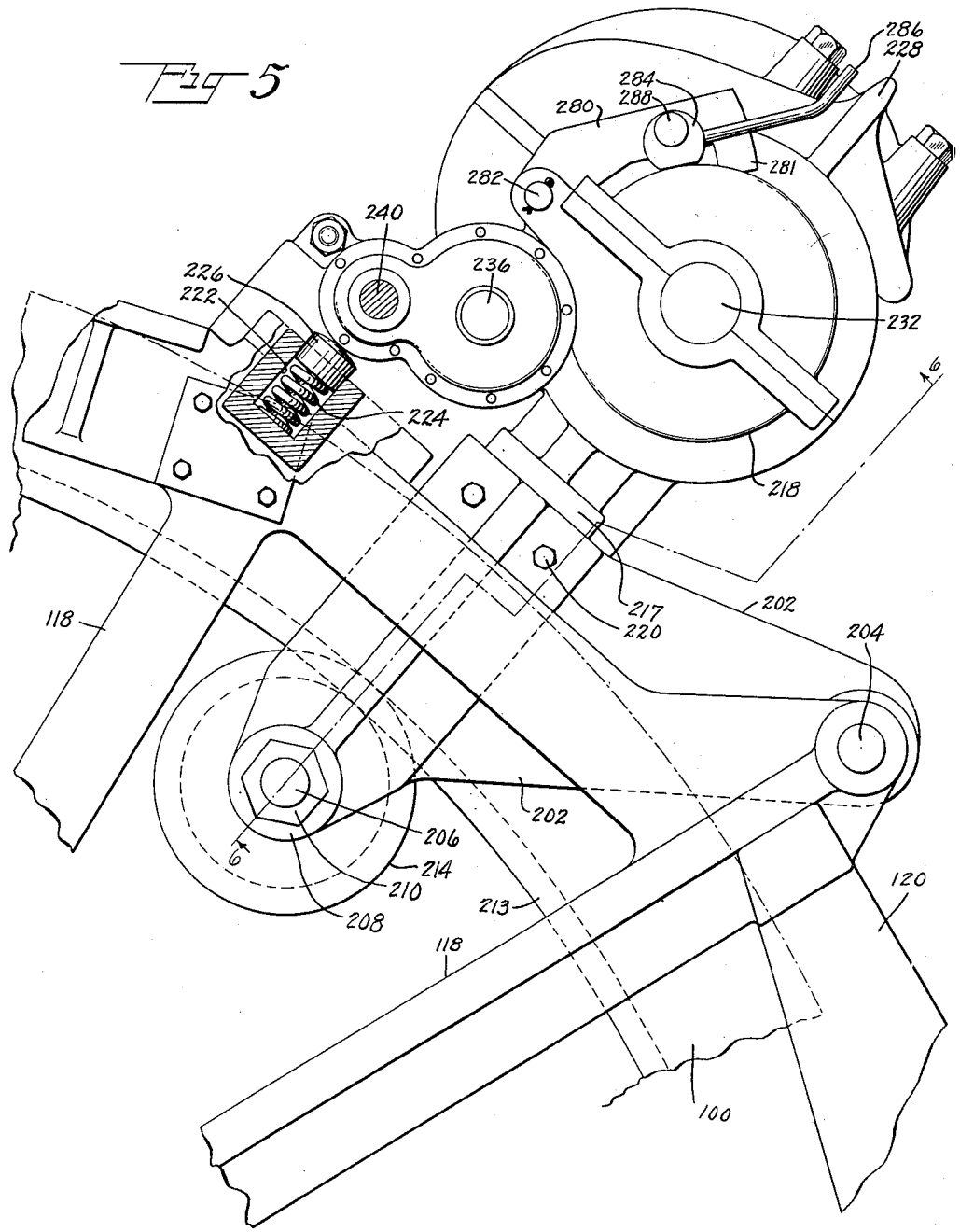

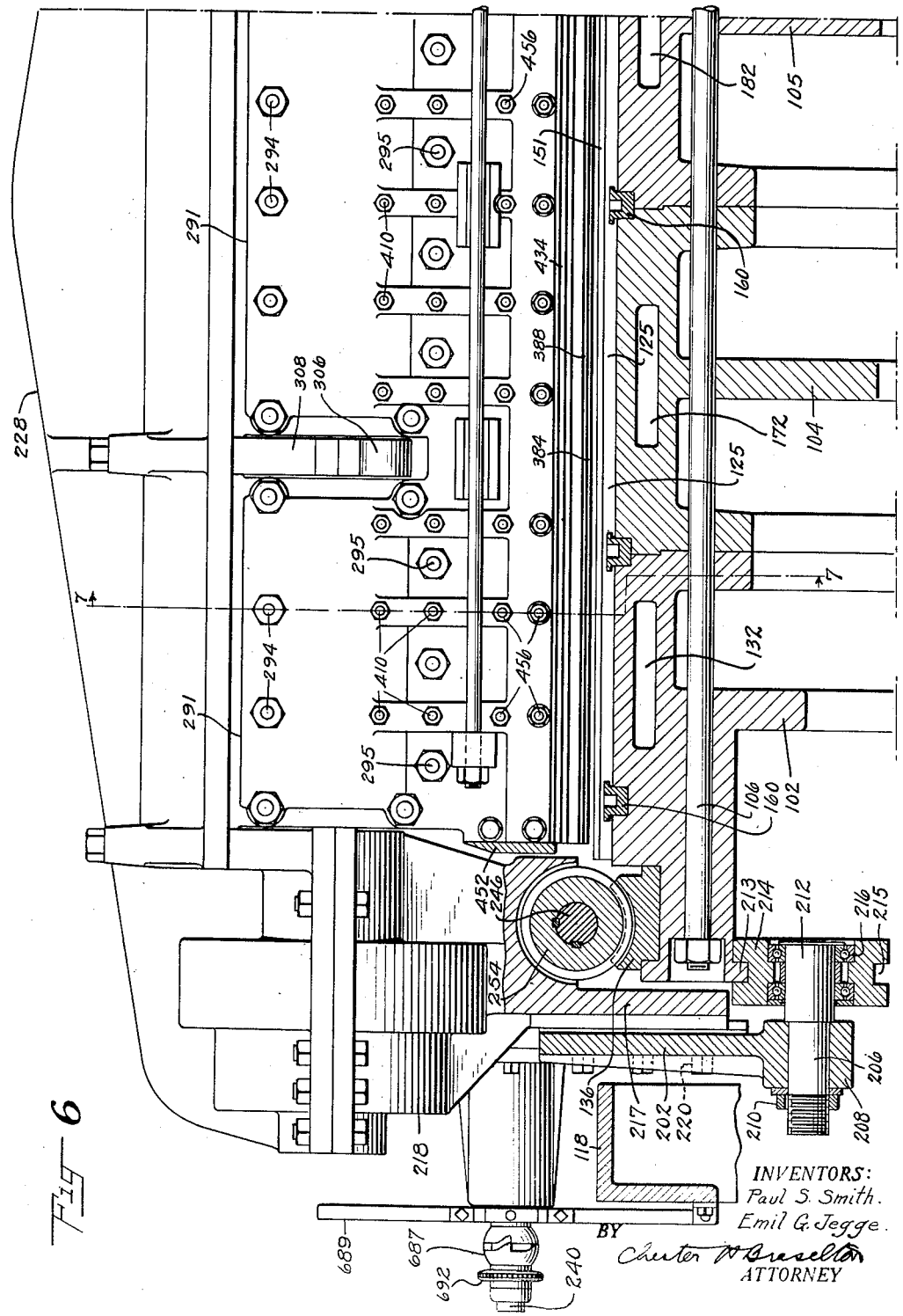

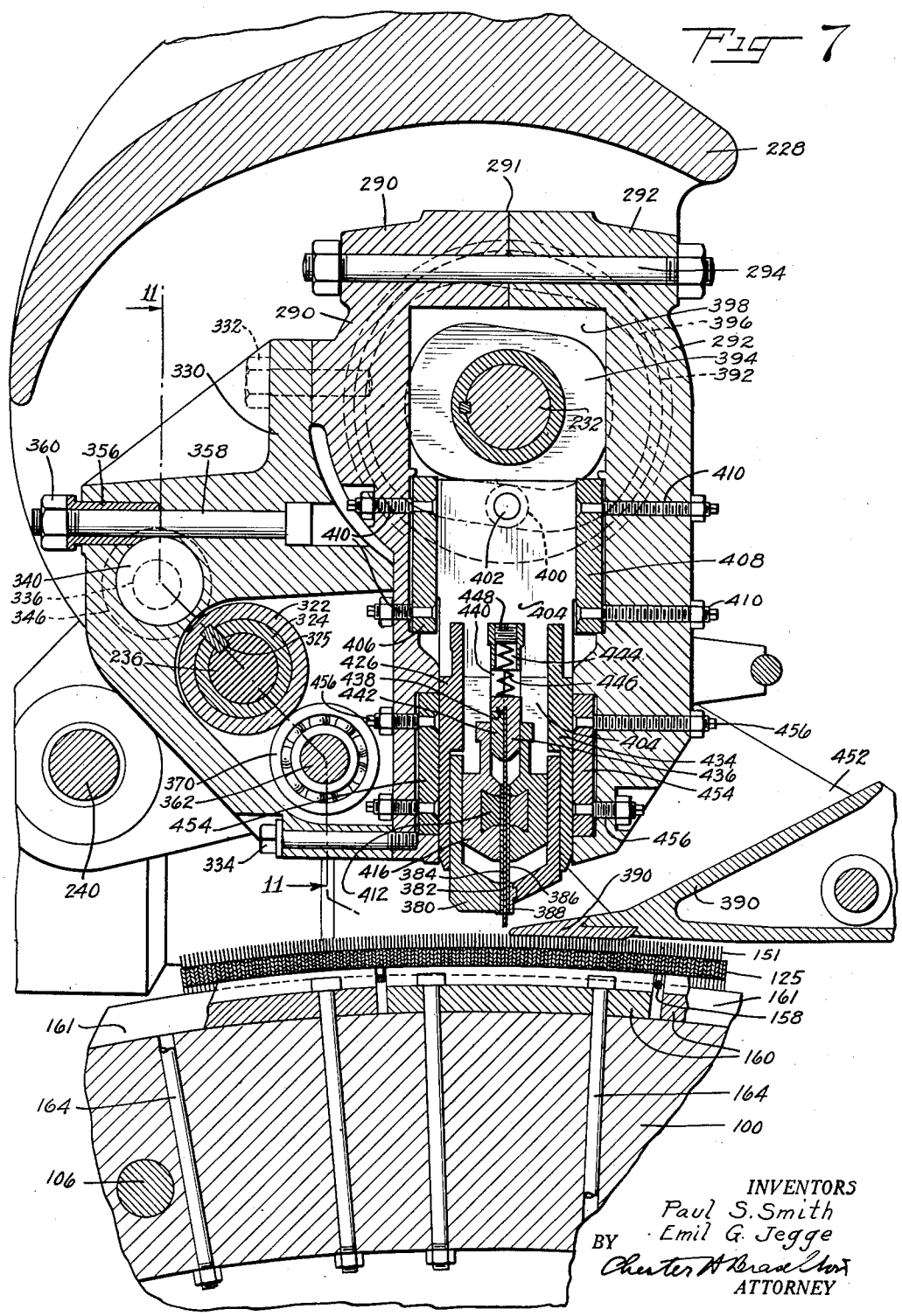

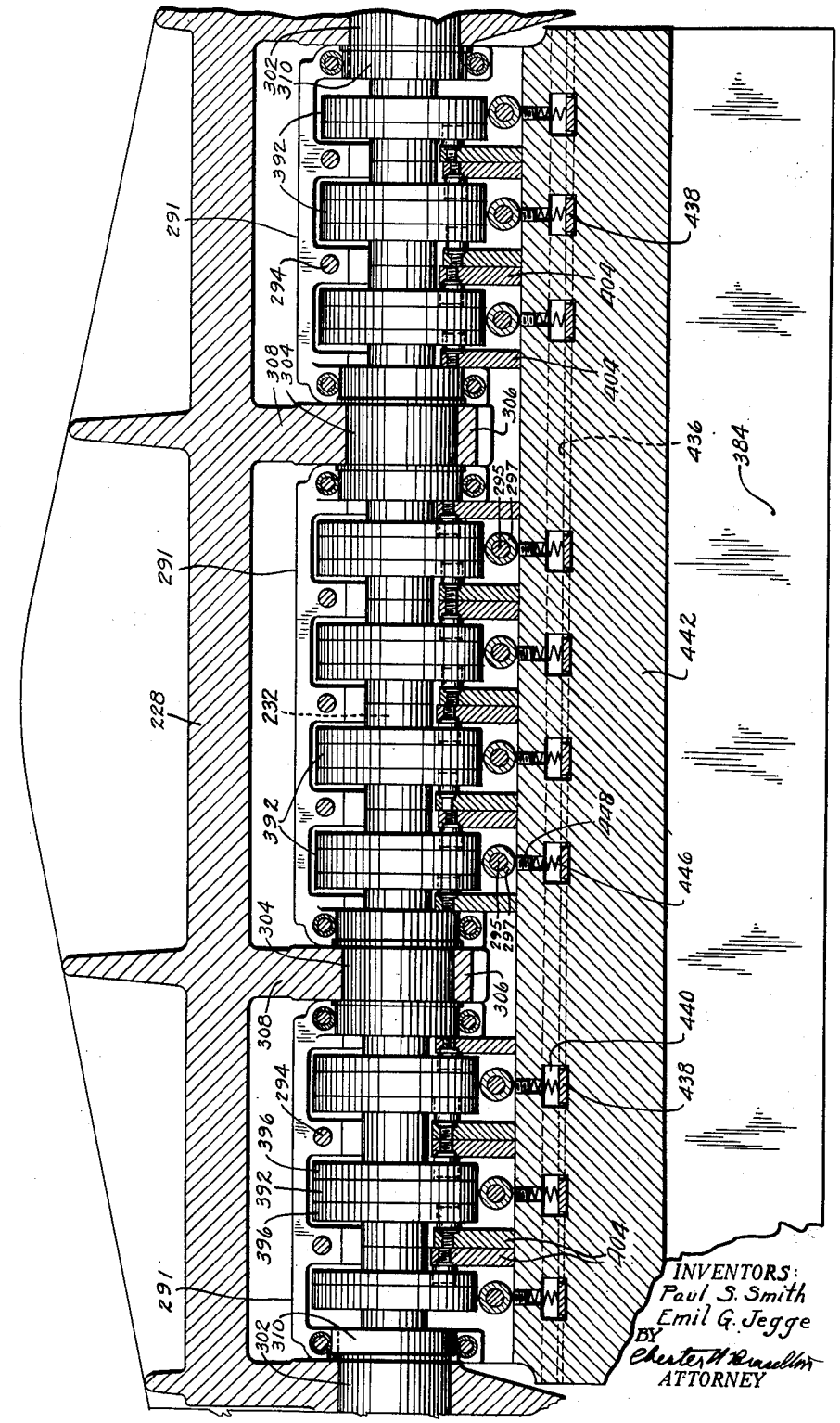

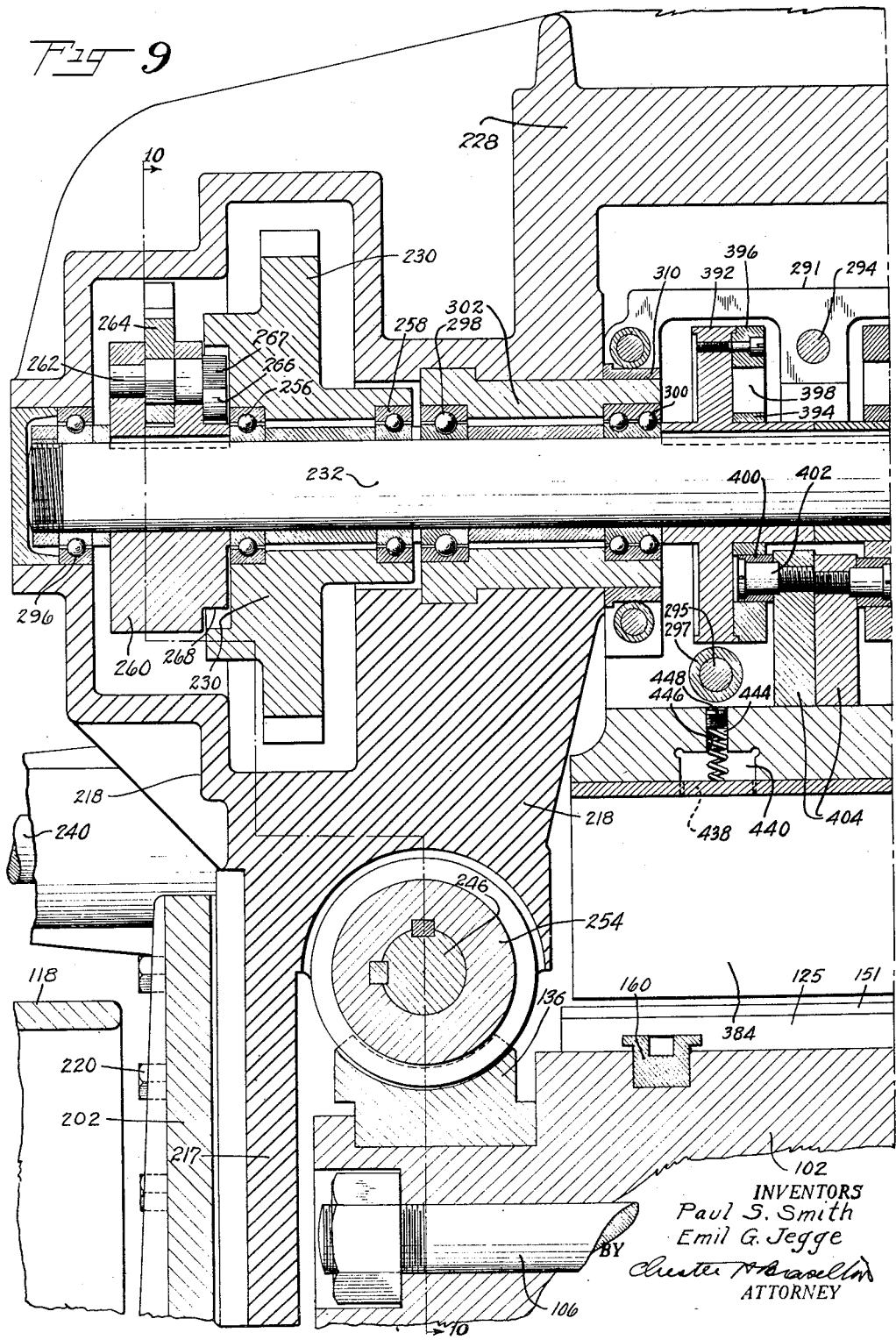

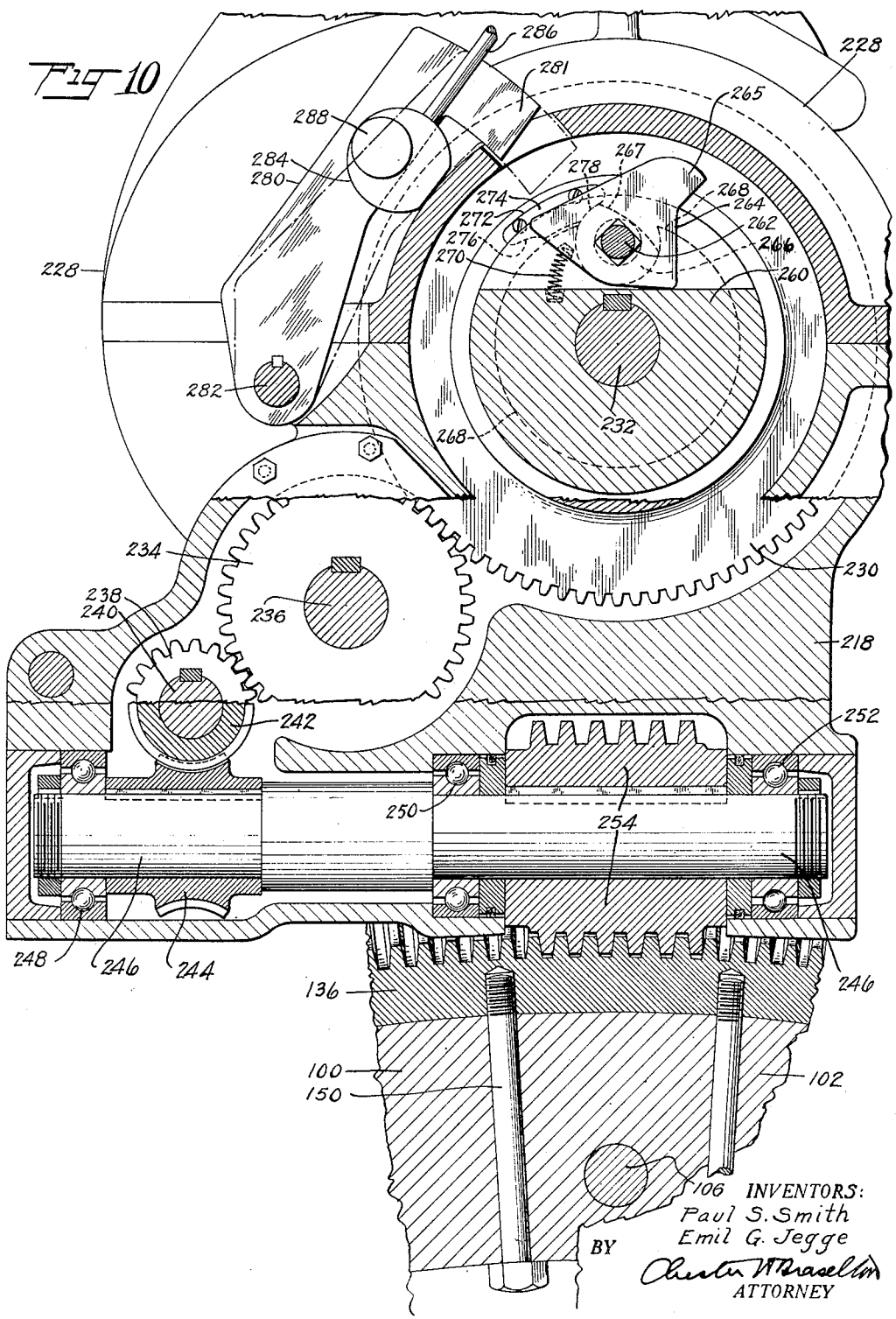

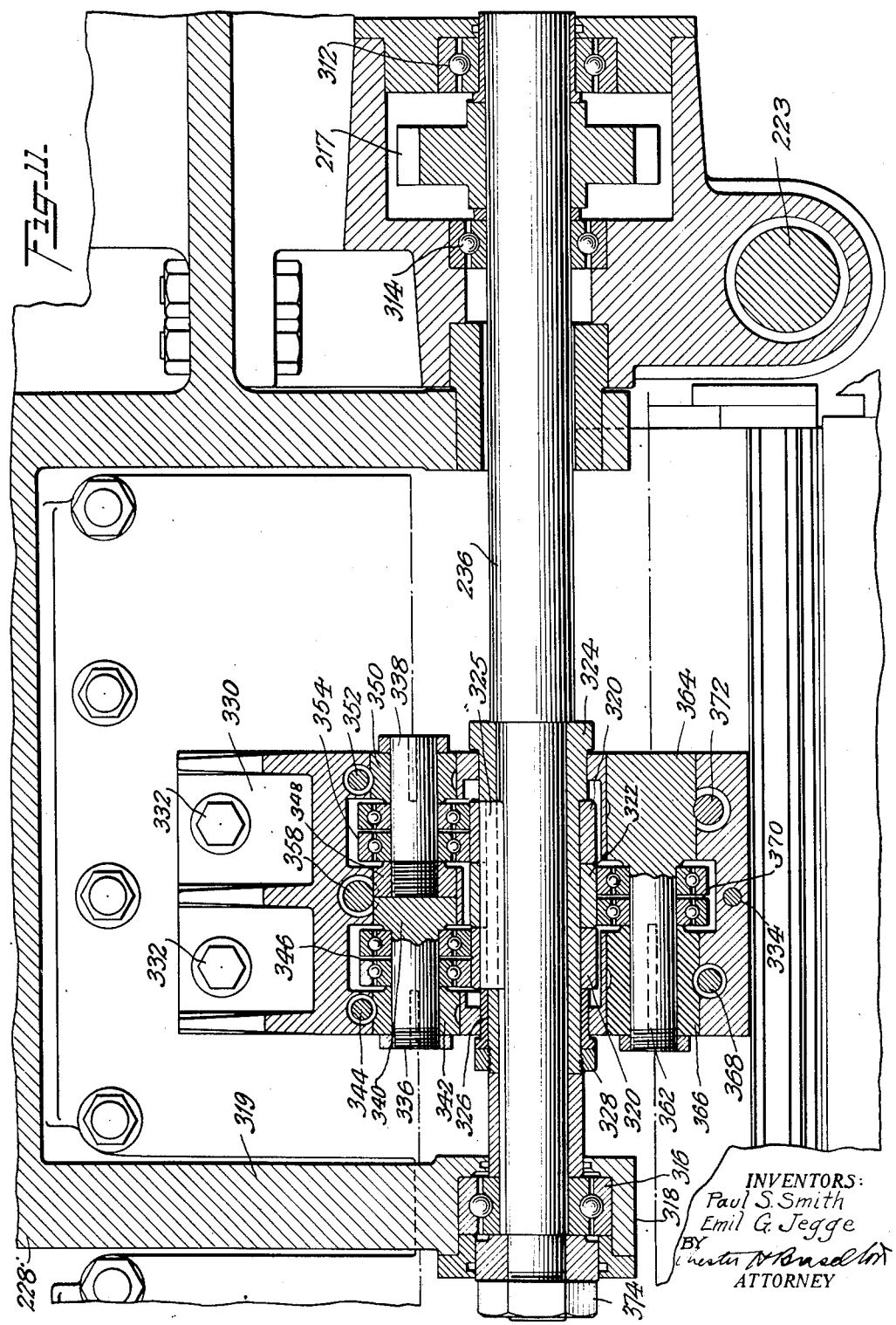

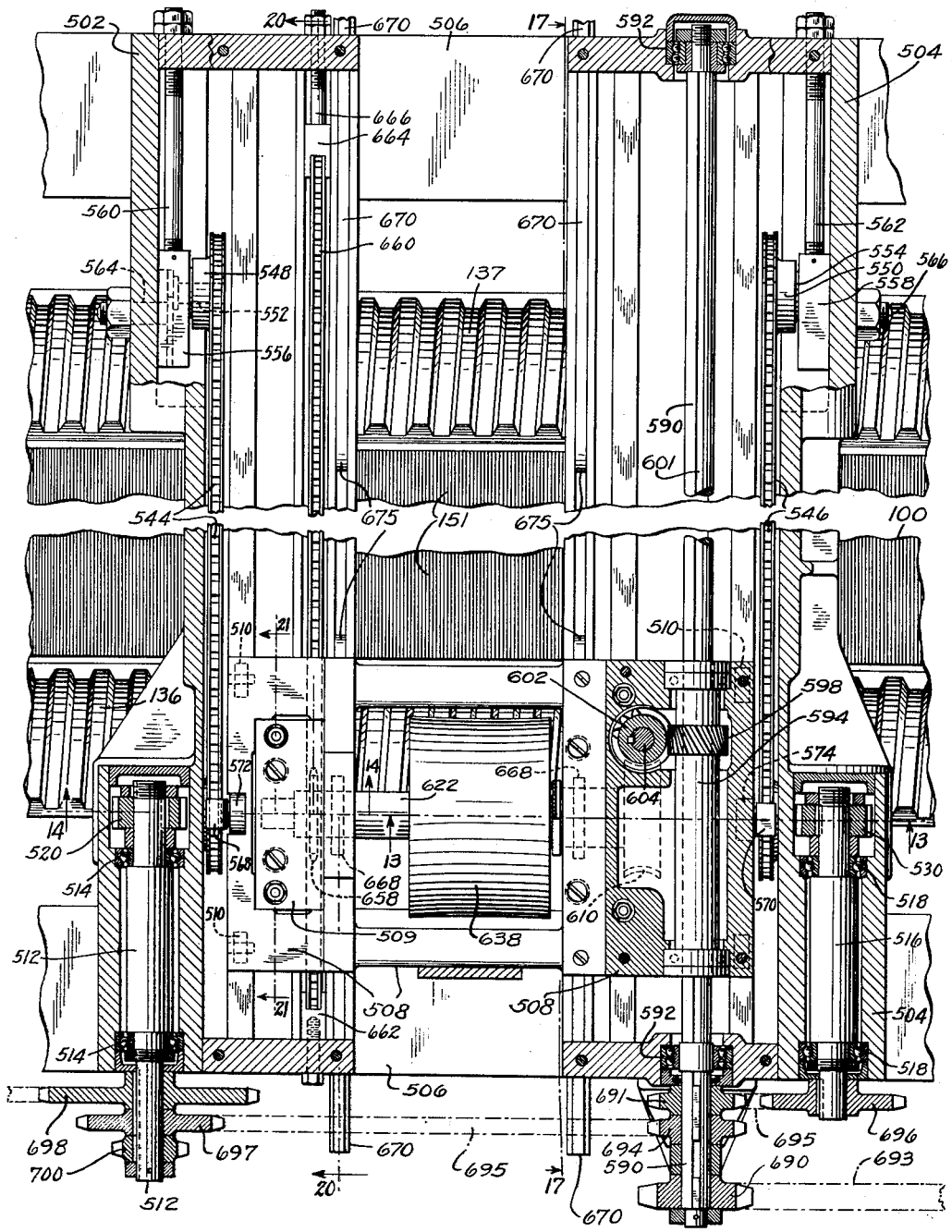

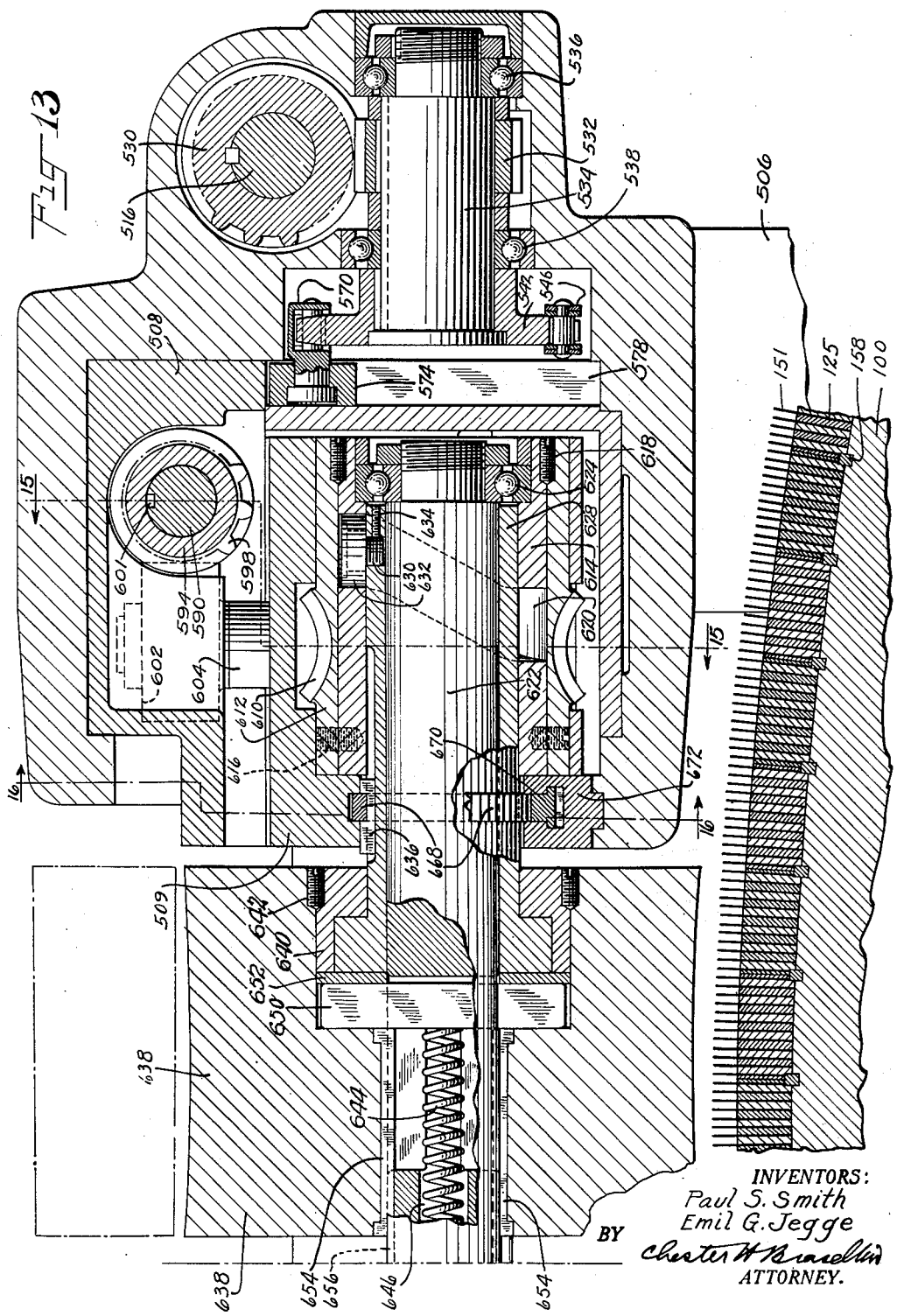

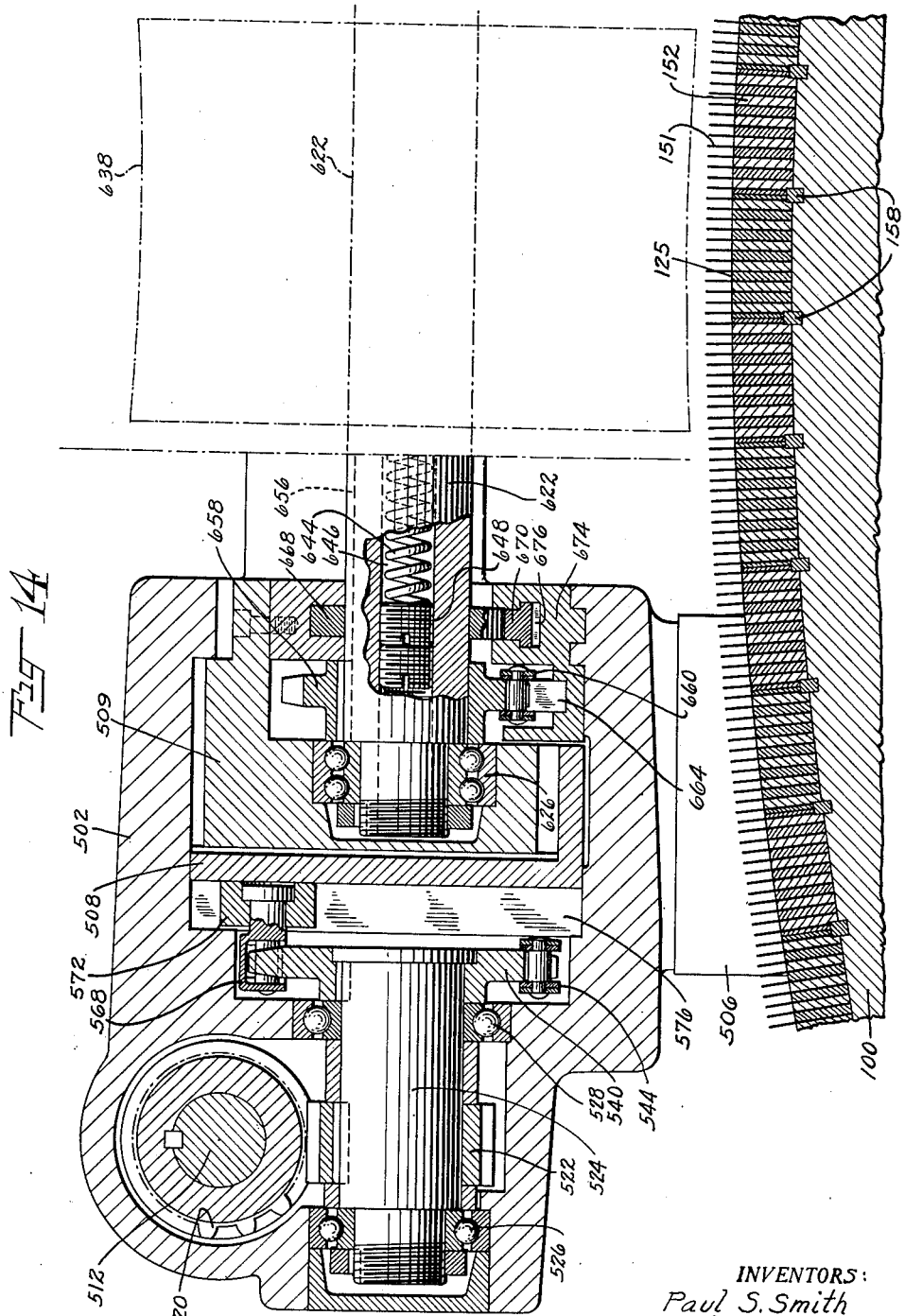

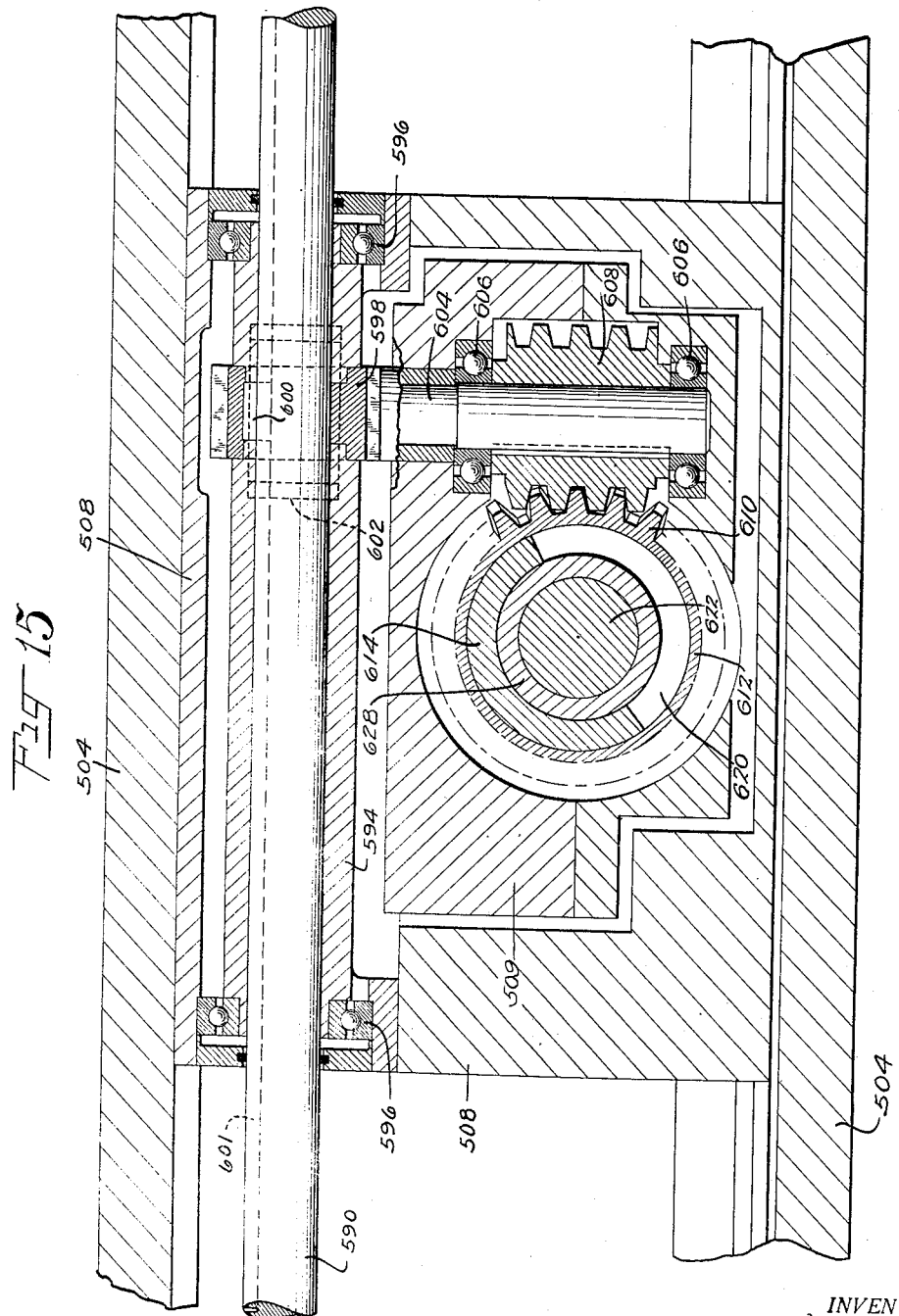

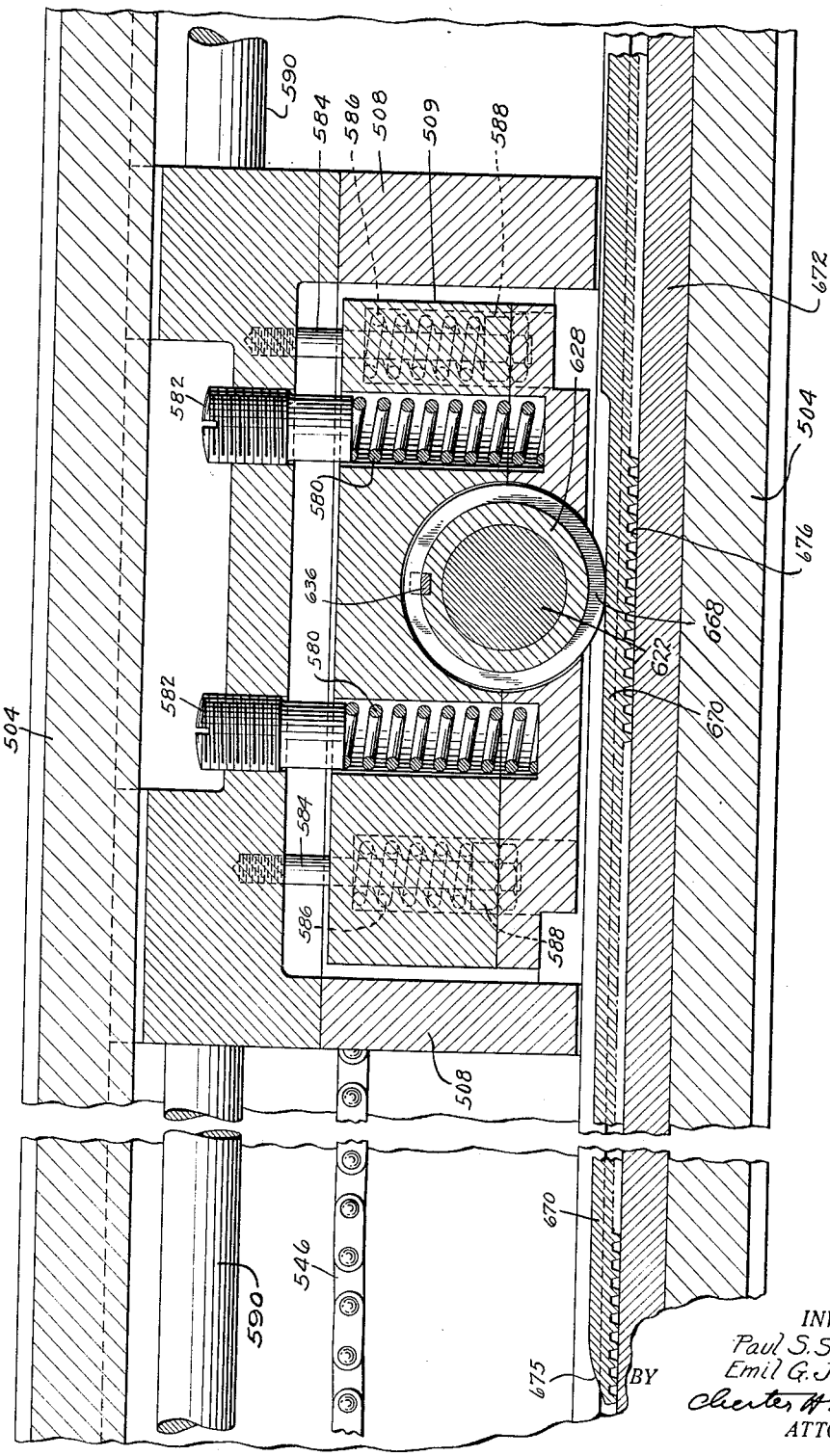

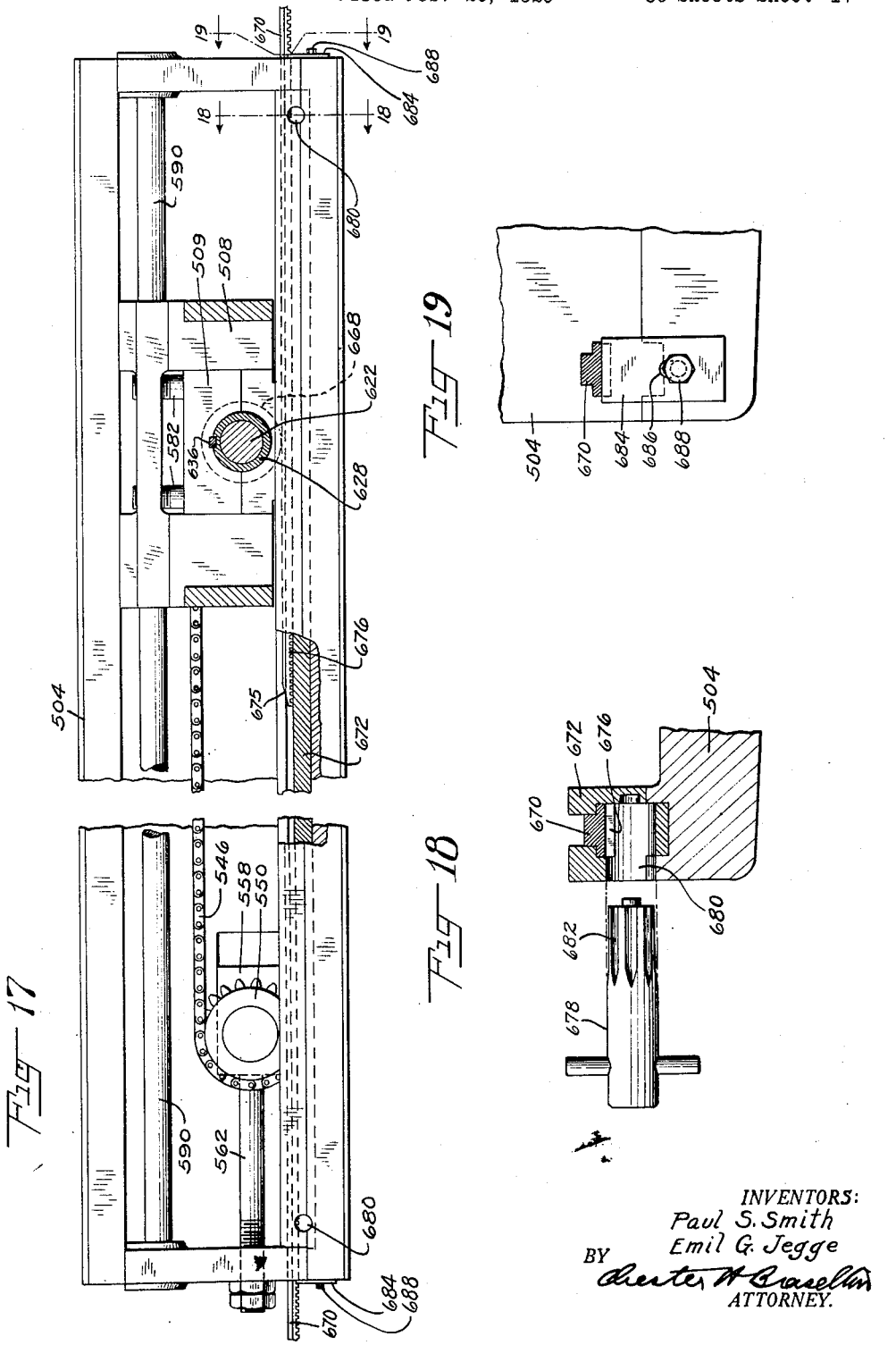

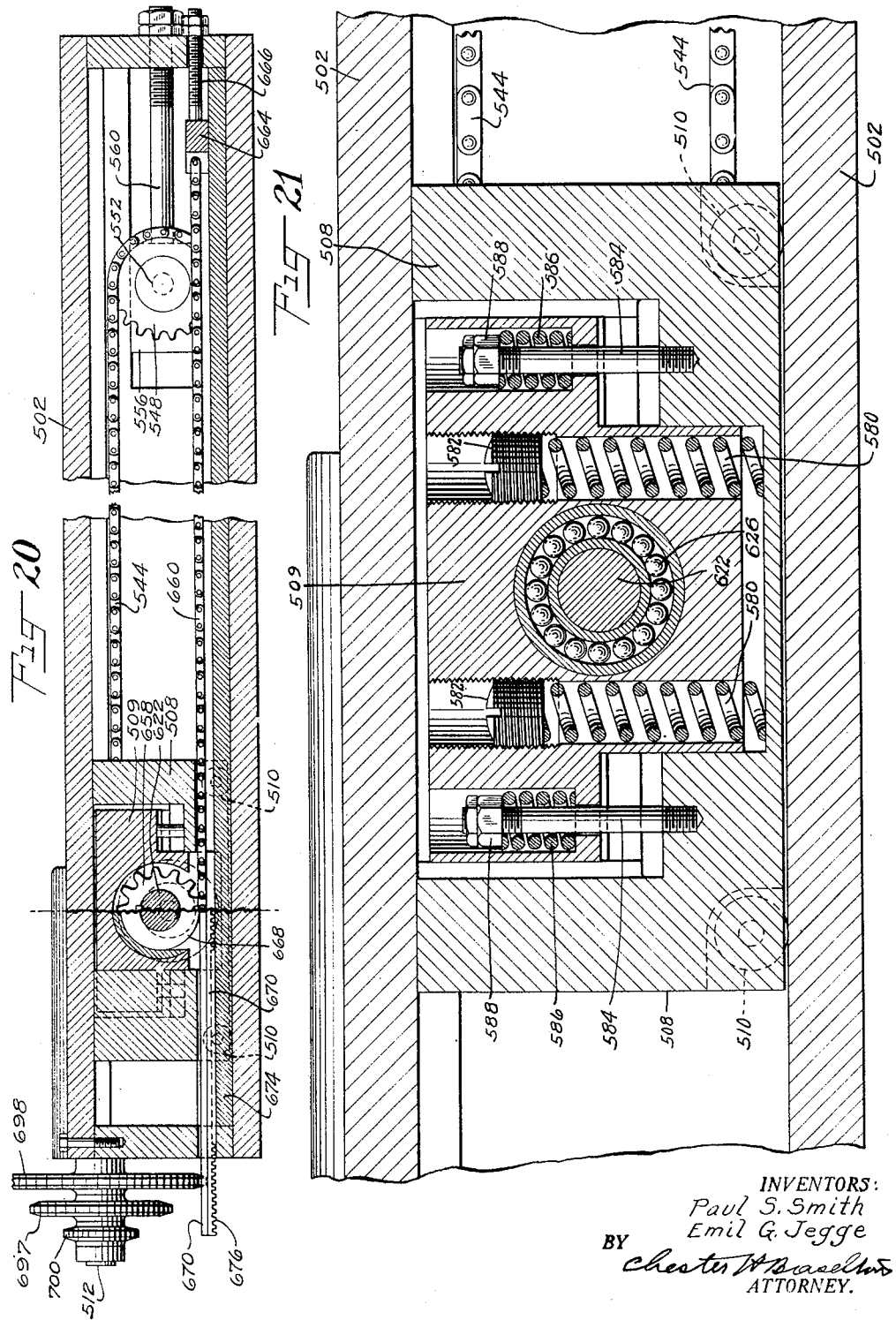

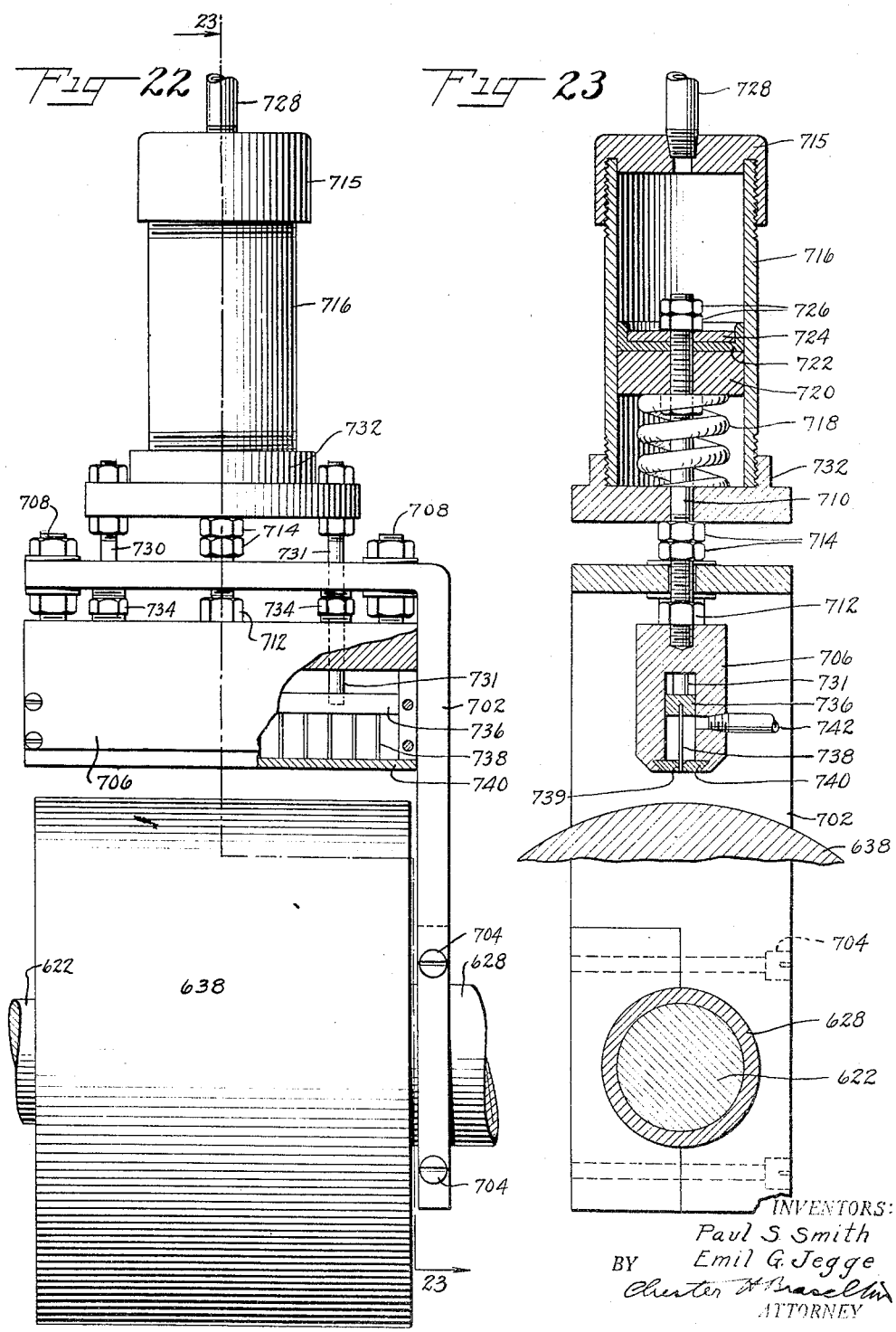

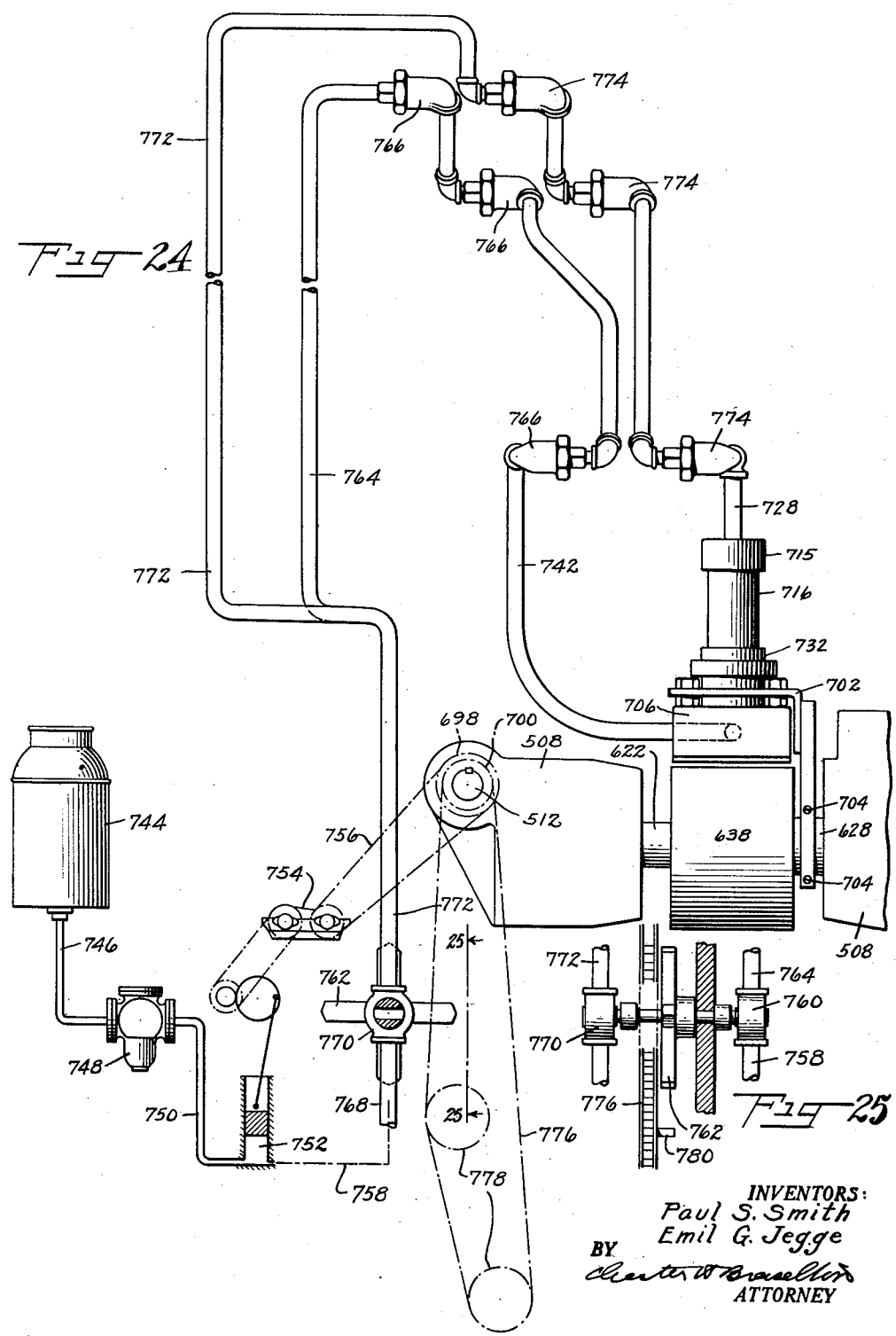

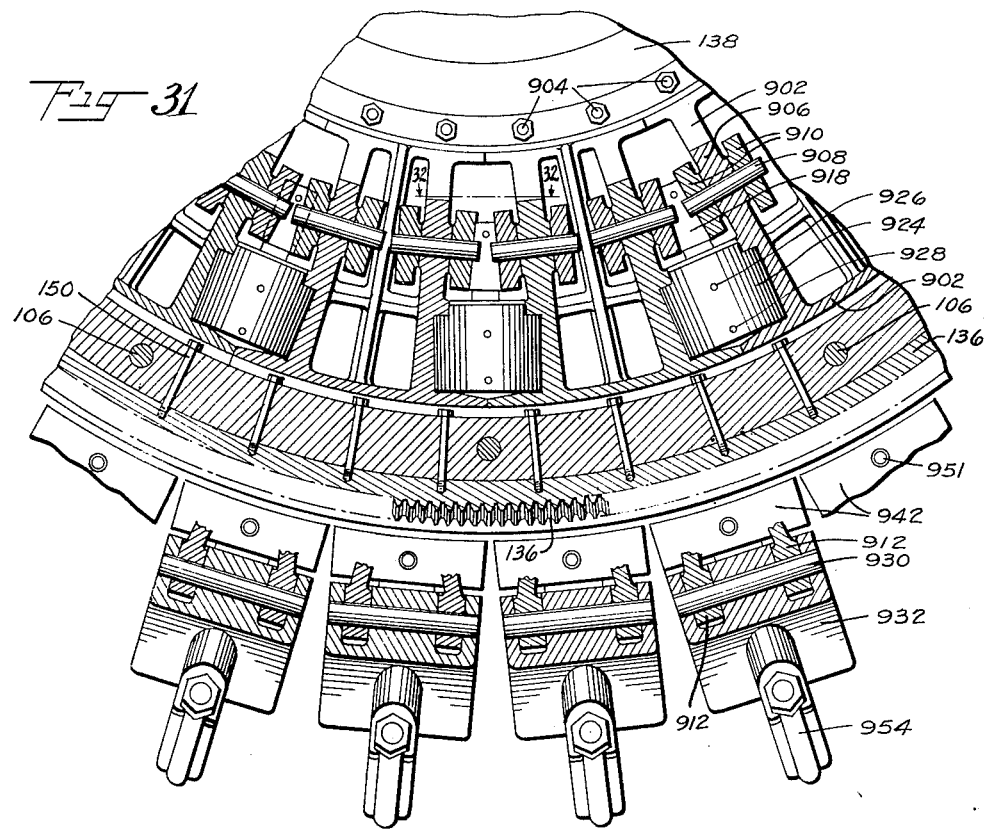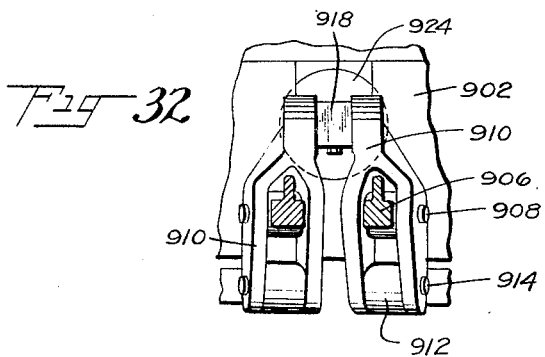

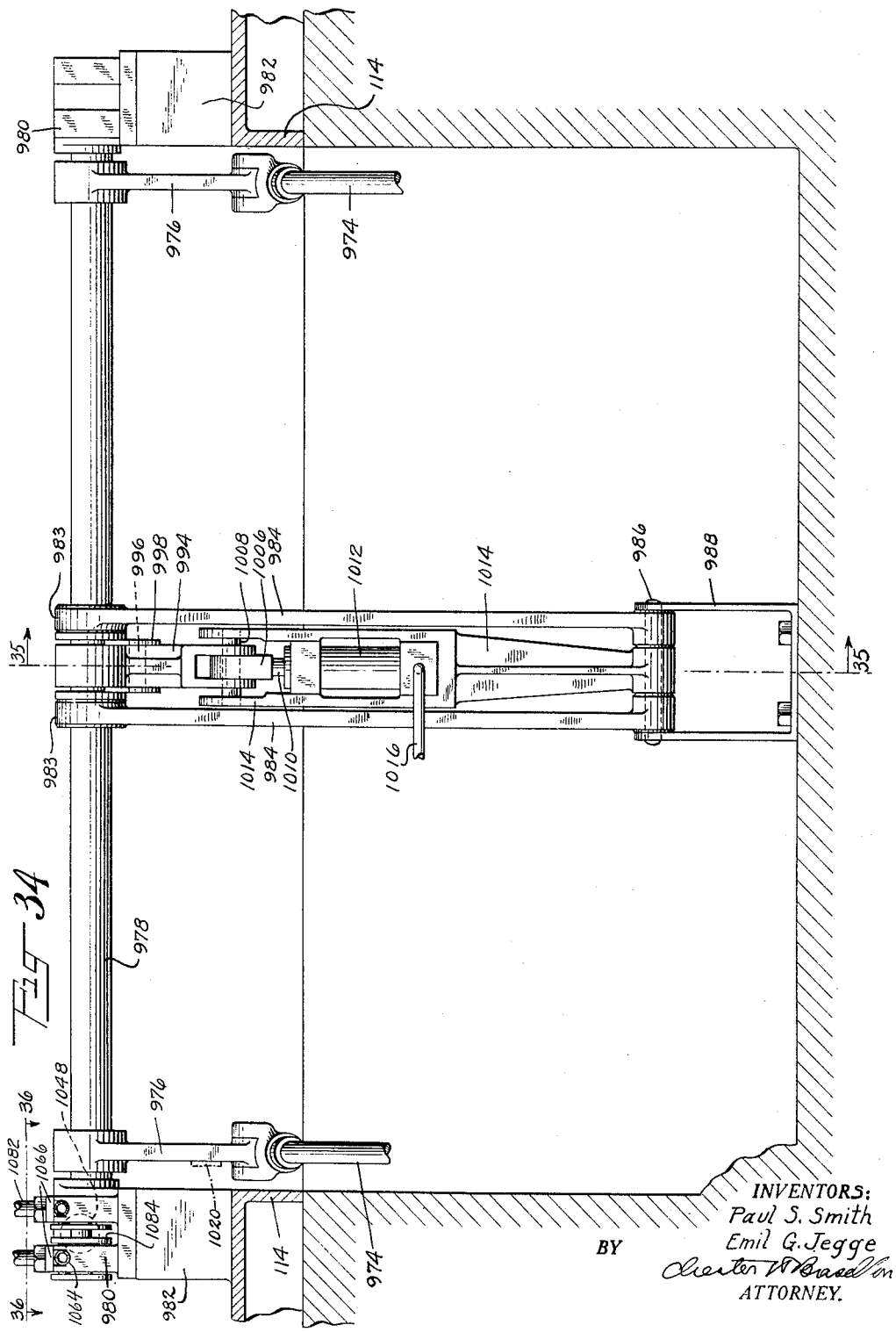

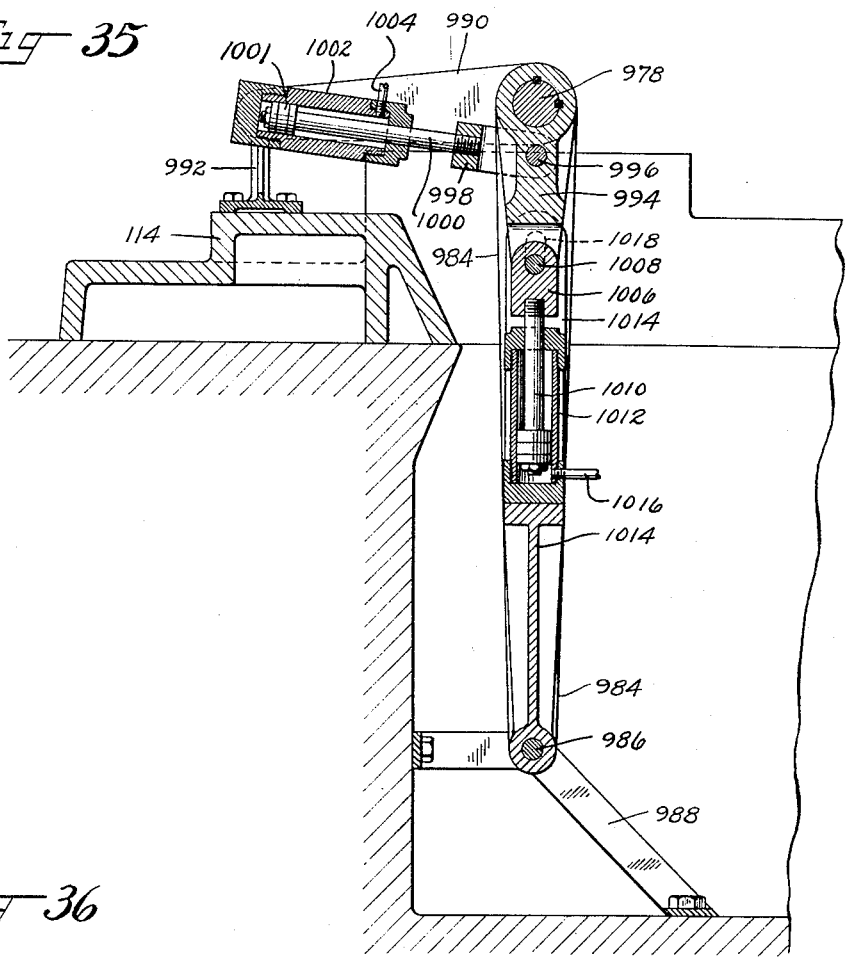
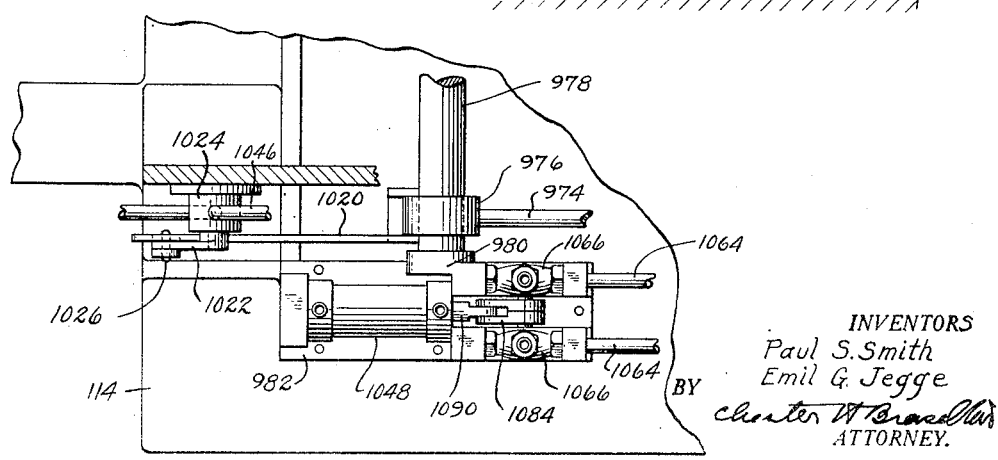

Dec. 9, 1930.  P. S. SMITH ET AL  1,784,552
MACHINE FOR PRODUCTION OF PILE FABRICS
Filed Feb. 23, 1929   30 Sheets-Sheet 26
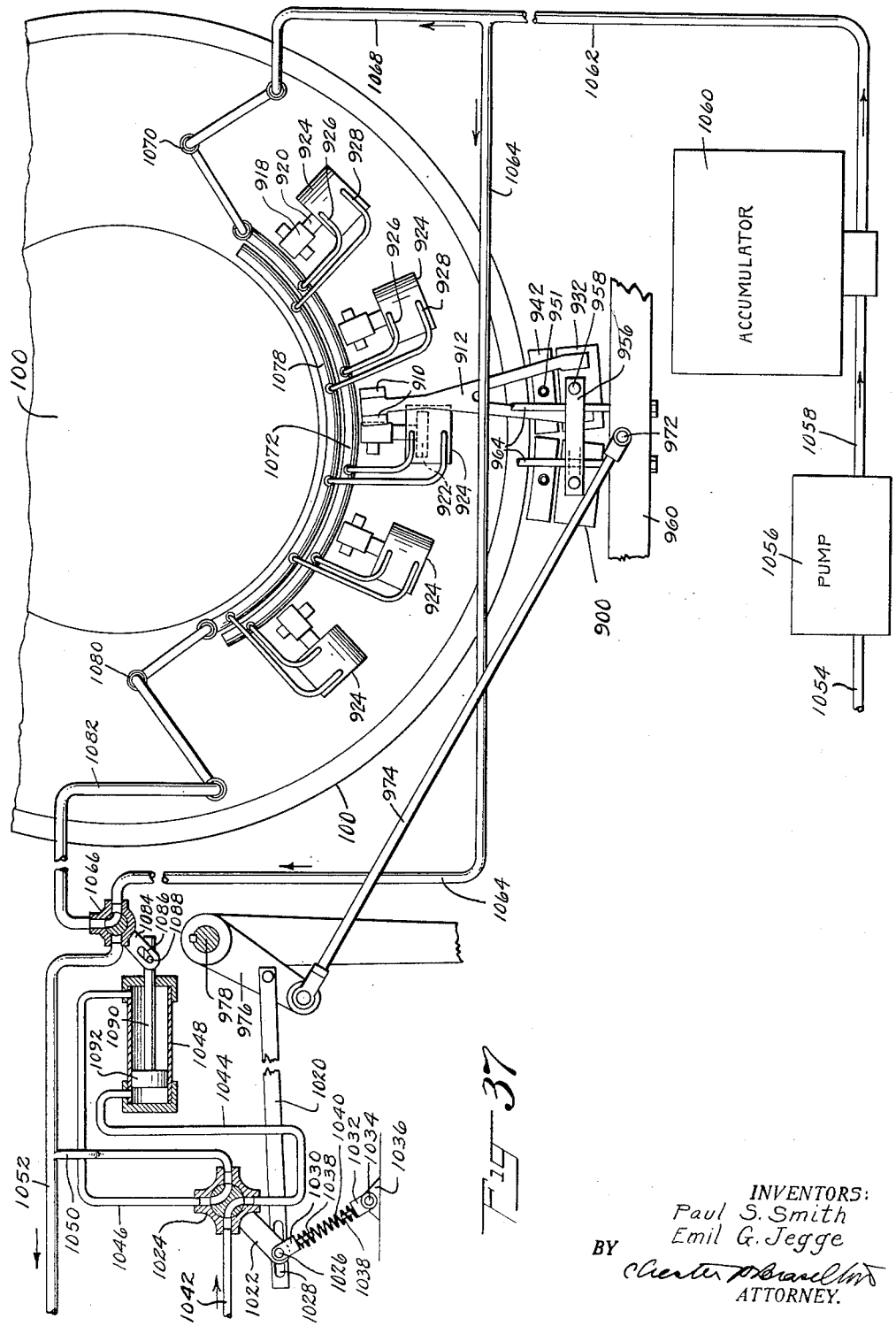
INVENTORS:
Paul S. Smith
Emil G. Jegge
BY
ATTORNEY.

Dec. 9, 1930.  P. S. SMITH ET AL  1,784,552
MACHINE FOR PRODUCTION OF PILE FABRICS
Filed Feb. 23, 1929   30 Sheets-Sheet 27

INVENTORS:
Paul S. Smith
Emil G. Jegge
BY Chester D. Braselton
ATTORNEY

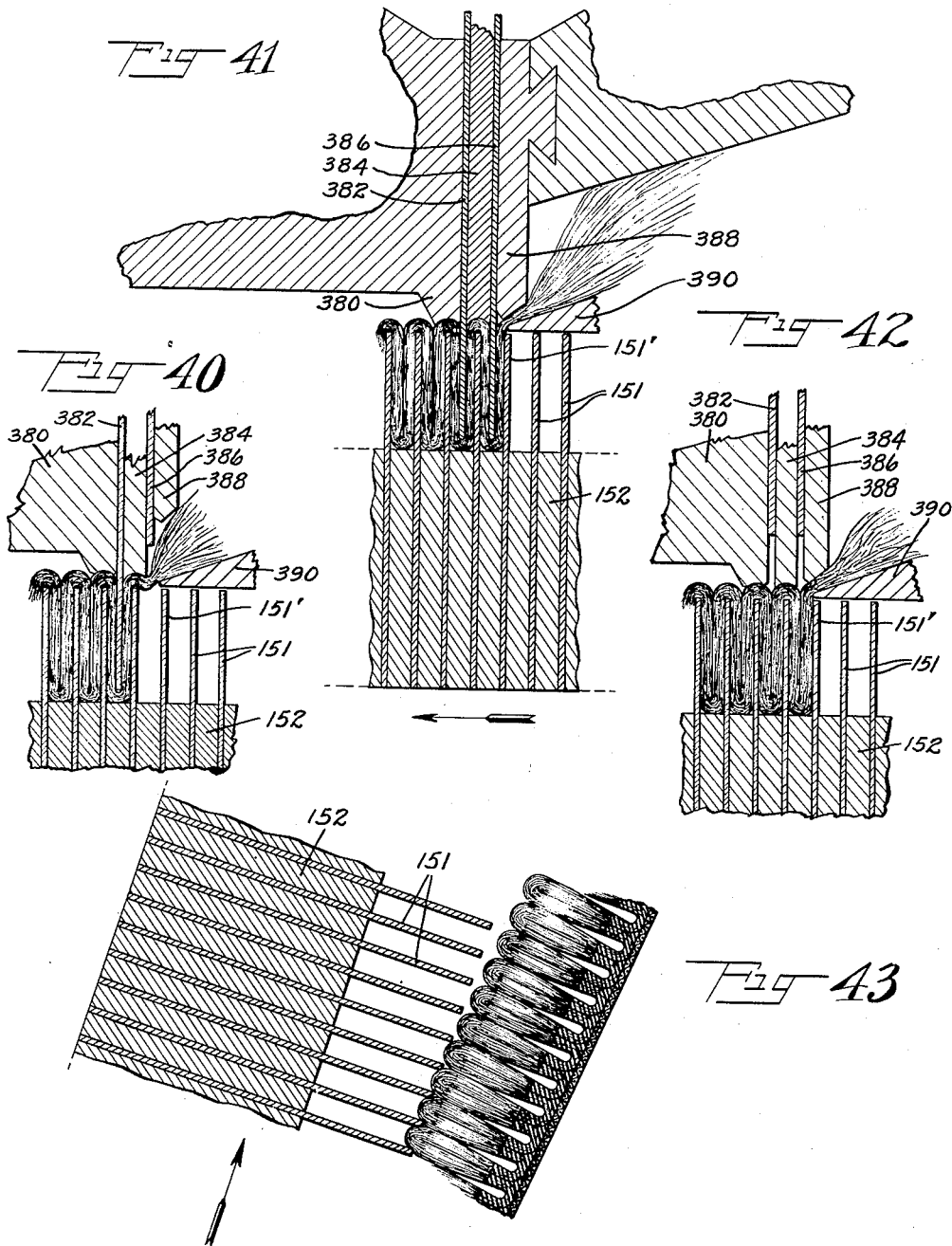

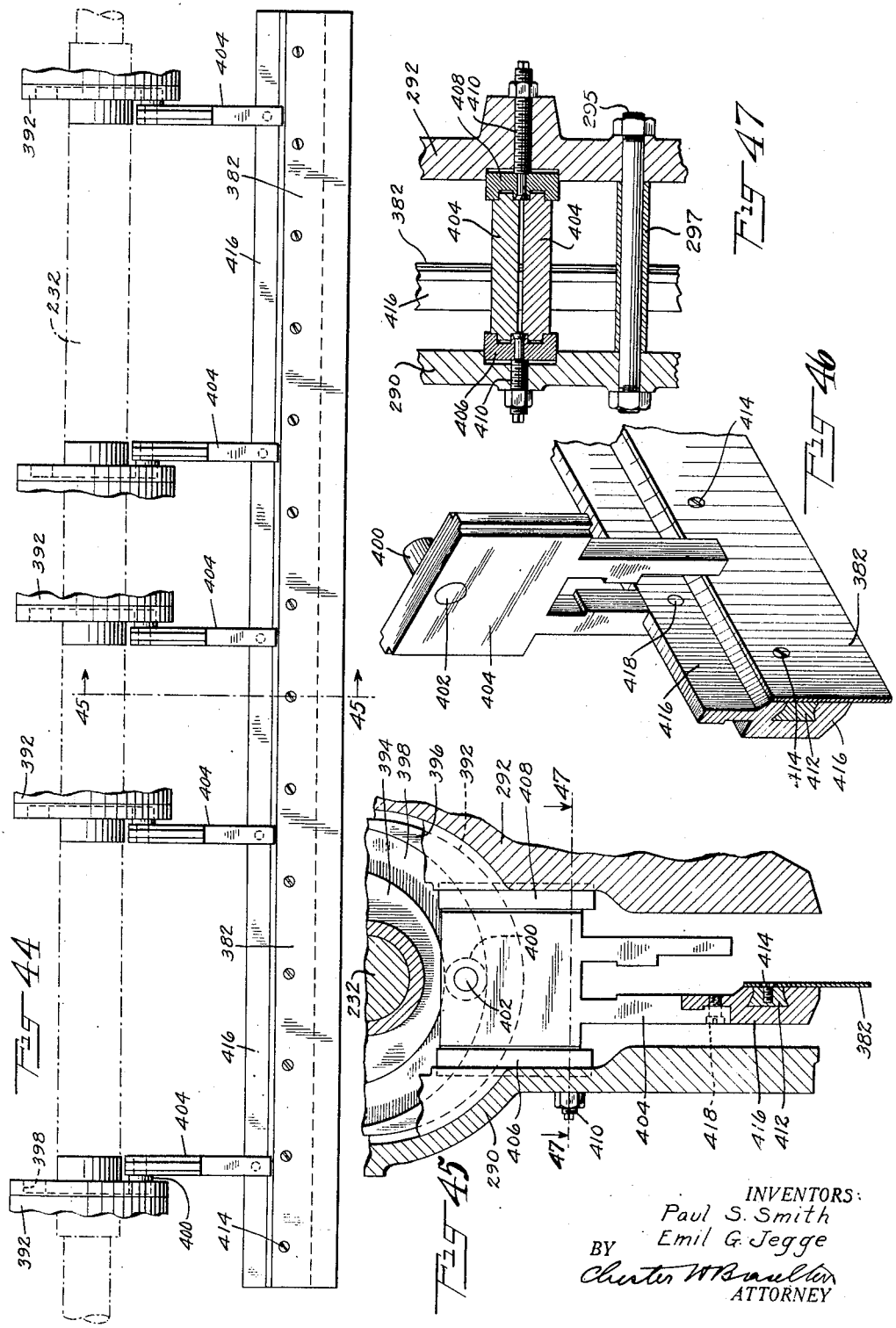

Dec. 9, 1930.　　　　P. S. SMITH ET AL　　　　1,784,552
MACHINE FOR PRODUCTION OF PILE FABRICS
Filed Feb. 23, 1929　　　30 Sheets-Sheet 30
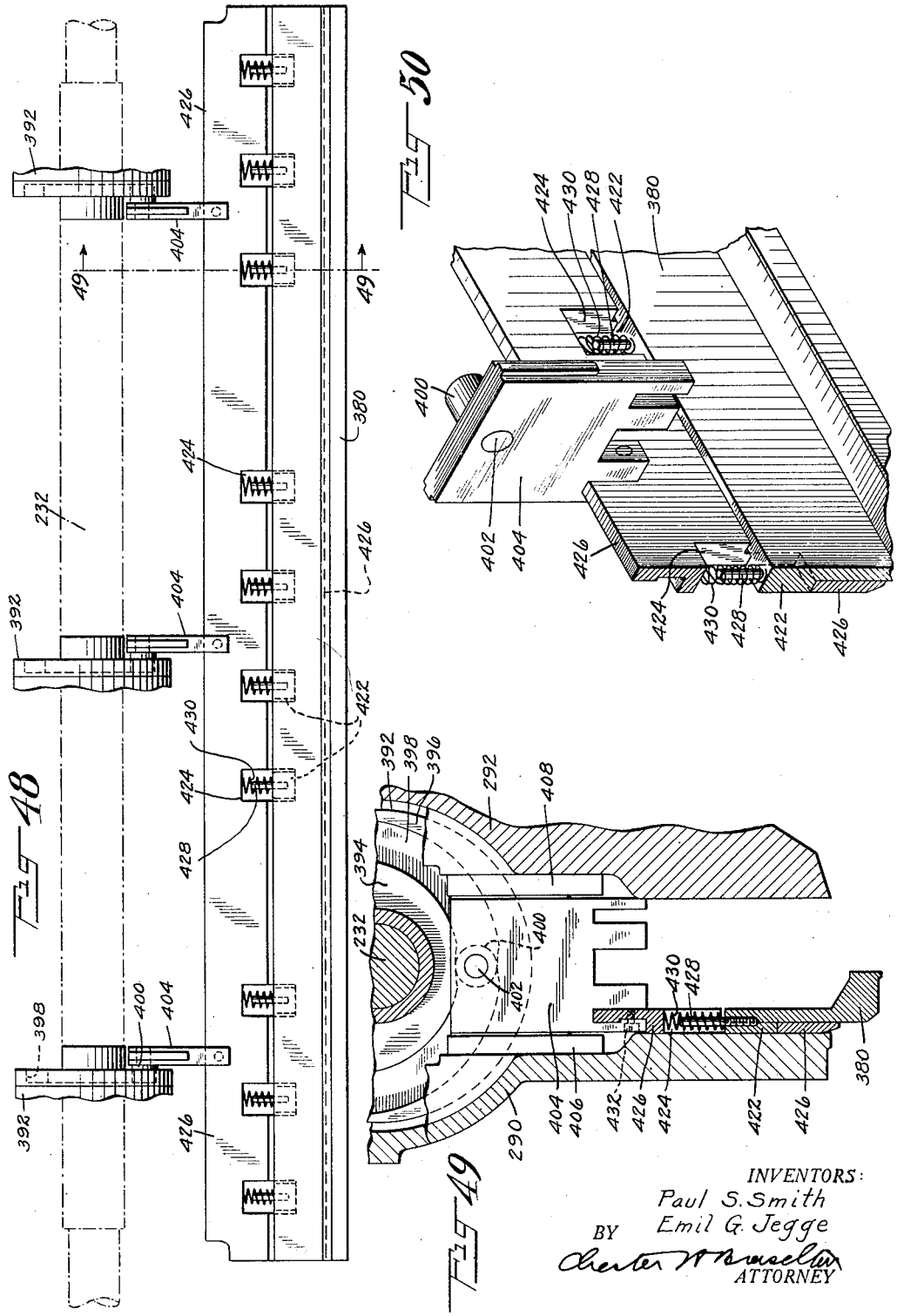
INVENTORS:
Paul S. Smith
Emil G. Jegge
BY
ATTORNEY Patented Dec. 9, 1930

1,784,552

UNITED STATES PATENT OFFICE

PAUL S. SMITH, OF MADISON, AND EMIL G. JEGGE, OF MONTCLAIR, NEW JERSEY, ASSIGNORS TO LEA FABRICS INC., OF NEWARK, NEW JERSEY, A CORPORATION OF DELAWARE

MACHINE FOR PRODUCTION OF PILE FABRICS

Application filed February 23, 1929. Serial No. 342,216.

This invention relates to a new and useful form of machine for the production of cemented pile fabrics, and more particularly to a form of machine adapted for continuous operation and for adjustment to produce any desired width of pile fabric material within the operative limits of the machine.

Our invention relates to the drum-type of machine shown and described in the application of Paul S. Smith, Ser. No. 211,660, filed August 9, 1927, and embodies certain improvements in construction whereby the operation of the machine is rendered more rapid and more accurate and effective in the registration and interaction of parts as will be hereinafter fully explained.

One of the objects of the present invention is to provide a new and improved form of machine of the drum type for the production of cemented pile fabric by means of which material may be produced continuously in any desired length at a higher rate and at a lower cost than has heretofore been possible.

Another object of the invention is to provide a machine of the drum type for the purposes set forth in which the steps of forming pile from unspun fibres, or other pile element material, applying rubberizing material to appropriate portions of the pile elements, drying the rubberizing material, applying a base fabric to the pile element material, and vulcanizing the rubberizing material, may be carried out by new and improved means mutually cooperating to continuously produce the pile fabric product at a high rate.

Another object of the invention is to provide a novel form of machine for the making of cemented pile fabric having a construction such that the stresses and strains produced upon various cooperating parts of the machine during operations, will not be excessive with the extremely small parts operating and operated upon.

Another object of our invention is to provide an improved form of cemented pile fabric-making machine having parts cooperating in such a manner that, with the extremely fine adjustments required to produce registration of the "wires" or separator elements on the drum with the inserting-blade, the holding-blade for the material operated upon, and the presser-feet, changes in temperature due to the passage of the drum through varying zones of heat, such as those involved in vulcanization, removal of moisture or solvent, and removal of the finished product, for example, will not produce disalignment or faulty operation.

Another object of the invention is to provide means for preserving the proper relationship between the moving element or drum carrying the "wires" or spacing elements and the driving means irrespective of wear or expansion of parts due to heat or changes of temperature; or, in other words, to provide means to prevent disalignment or lack of accurate registry between the inserting elements and the spacing elements during operation of the machine due to changes in temperature or wear which ordinarily produces back-lash in the gears or changes in configuration operating to throw parts out of adjustment.

Another object of the invention is to provide a drum-type of machine for the making of cemented pile fabric having a piling or inserting mechanism which is operative in synchronism with the drum or pile-retaining elements so as to continuously retain parts in adjustment irrespective of the wear of operating parts of the machine.

Another object of the invention is to provide means in a machine of the form described for relating the inserting elements to successive "wires" on the moving element at a high rate of speed without correspondingly moving the inserting mechanism as a whole.

Another object of the invention is to provide in a machine of the form described, a unitary-inserting mechanism which may function with respect to a continuously moving element supporting the "wires", with a minimum power consumption, and means for mounting the inserting mechanism on a stationary center of rotation so that the operating parts thereof, moving with the drum during the period in which the inserting parts and holding elements are engaged with the "wires", are displaced angularly with respect to the latter to a negligible degree.

Another object of the invention is to provide a form of machine for continuous production of pile fabric material which is operative to rapidly insert pile element material between spacing elements or "wires" rigidly attached on the surface of the drum or cylinder of large mass and to provide means directly associated with the inserting elements for substantially relieving the "wires" or spacing elements and associated mechanism of strain during the operation of compressing the fibrous material at the moment of formation of the pile loops or pleats.

Another object of the invention is to provide means for applying a rubber cement or dispersion of rubber in controlled amounts to appropriate parts of the pile element material, said means operating frictionally to provide the desired impregnation with a minimum amount of the impregnating material, and with a minimum pressure of the rubberizing means to properly distribute the cement material.

Another object of the invention is to provide a means for the application of a rubber cement material or rubber dispersion in a machine of the form described which operates controllably or adjustably to apply cement material along a predetermined path without distributing the cement material in undesired parts of the machine or in undesired relationship upon the pile element material, and which embodies means for self-cleaning so as to maintain freely-operating condition of the rubberizing parts.

Another object of the invention is to provide means for moving the rubberizing element over the looped sections of the pile element material, or exposed portions of the pleats, strictly longitudinally of the "wires" on the drum irrespective of continuous movement of the "wires" or spacing elements during the rubberizing operation.

Another object of the invention is to provide a form of cement-applying mechanism or rubberizing device by means of which cement or rubberizing material may be applied only along a width corresponding to the width of batt or pile element material employed.

Another object of the invention is to provide a form of cemented pile fabric-making machine which is adapted for use on substantially any form of pile element material, such as a loose batt or yarns or fibres of substantially any available form and which may be used with substantially any form of cementing material, such, for example, as a rubber dispersion in water or a vulcanizable rubber cement dissolved in a volatile solvent, and which provides means for uniformly expelling or continuously drawing off moisture, or solvent or other volatile ingredient present in the cementing composition applied to the pile element material, during the operation of the machine.

Another object of the invention is to provide vulcanizing means, in a machine of the kind described, which is adapted to be applied to desired portions of the loops or pleats, held in place by the "wires" on the moving element, in such a manner that stresses and strains resulting from the application thereof will be localized on the immediate portion of the moving element to which the vulcanizing means is directly applied.

Another object of the invention is to provide vulcanizing means whereby heated surfaces of suitable contour may be flexibly applied to the material to be vulcanized.

Another object of the invention is to provide means whereby the vulcanizing surfaces and their associated actuating parts may be alternately applied to and withdrawn from a continuously moving element such as a drum bearing the "wires" or spacing elements with which the material to be vulcanized is associated without substantially changing the load imposed on the driving means for the continuously moving element or rotatable drum.

Various other objects of the invention and novel features of construction and operation will be apparent from the following description setting forth the construction and operation of the machine in detail.

Referring to the accompanying drawings, showing the invention in its preferred form:

Fig. 1 is a general view in elevation showing the main elements of our machine, including the drum or cylinder upon which the "wires" or spacing elements are mounted together with the piling mechanism, rubberizing device, drying mechanism, vulcanizing apparatus and associated parts for operating the machine;

Fig. 2 is a sectional view in elevation of the machine taken on the line 2—2 of Fig. 1;

Fig. 3 is a sectional view of the left side of the upper half of the drum, with reference to Fig. 1, taken on the section line 3—3;

Fig. 3a is a fragmentary section of a split ring assembly supporting the vulcanizing assembly;

Fig. 4 is a sectional view taken on the section line 4—4 of Fig. 1 showing the left side of the lower half of the drum and associated parts;

Fig. 5 is an enlarged view in elevation, partly in section, of a portion of the inserting mechanism and associated parts;

Fig. 6 is an enlarged detailed sectional view taken on the section line 6—6 of Fig. 1 or Fig. 5;

Fig. 7 is a sectional view in elevation taken on the section line 7—7 of Fig. 6;

Fig. 8 is an enlarged detailed sectional view in elevation showing the cams for operating parts of the inserting mechanism;

Fig. 9 is a view in elevation partly in section taken on the line 9—9 of Fig. 1, showing a portion of the operating parts of the inserting mechanism;

Fig. 10 is a sectional view in elevation taken on the section line 10—10 of Fig. 9;

Fig. 11 is a sectional view through a portion of the inserting mechanism taken on the section line 11—11 of Fig. 7, showing the means for indexing the inserting mechanism;

Fig. 12 is a plan view partly in section of a portion of the rubberizing mechanism taken substantially along the line 12—12 of Fig. 1, the top of the casting being removed to show the underlying portions of the rubberizing unit;

Fig. 13 is a sectional view in elevation taken on the line 13—13 of Fig. 12;

Fig. 14 is a view similar to Fig. 13 taken on the section line 14—14 of Fig. 12;

Fig. 15 is a detailed sectional view in elevation taken on the section line 15—15 of Fig. 13;

Fig. 16 is a detailed sectional view taken on the section line 16—16 of Fig. 13;

Fig. 17 is a detailed view, partly in section, taken on the line 17—17 of Fig. 12, showing the means for raising the rubberizing roller on its rails at the end of its travel, parts being broken away to show underlying parts;

Fig. 18 is a detailed sectional view taken on the section line 18—18 of Fig. 17;

Fig. 19 is a detailed sectional view taken on the section line 19—19 of Fig. 17;

Fig. 20 is a detailed sectional view in elevation taken on the line 20—20 of Fig. 12;

Fig. 21 is an enlarged detailed sectional view taken on the section line 21—21 of Fig. 12;

Fig. 22 is a detailed view in elevation of the rubberizing roller and associated parts, parts being shown broken away to show underlying parts;

Fig. 23 is a sectional view in elevation taken on the section line 23—23 of Fig. 22;

Fig. 24 is a detailed diagrammatic view showing the rubber feeding system;

Fig. 25 is a detailed view, partly in section, taken on the line 25—25 of Fig. 24;

Fig. 26 is a detailed view of the rubber-roller translating cam (see 614 Fig. 13);

Fig. 27 is a diagram of the developed movement of the cam shown in Fig. 26;

Fig. 28 is a diagrammatic plan-view of the drum and rubberizing unit, showing the path of travel for one complete cycle of the rubberizing roller;

Fig. 31 is a sectional view in elevation taken on the line 31—31 of Fig. 4;

Fig. 32 is a detailed plan view taken on the line 32—32 of Fig. 31;

Fig. 33 is a detailed sectional view in elevation taken on the section line 33—33 of Fig. 4;

Fig. 34 is a view in elevation taken along the line 34—34 of Fig. 1;

Fig. 35 is a detailed sectional view taken on the line 35—35 of Fig. 34;

Fig. 36 is a plan view taken on the section line 36—36 of Fig. 34;

Fig. 37 is a detailed diagrammatic view, partly in section, of the hydraulic control means of the vulcanizing unit;

Fig. 40 is an enlarged detailed sectional view showing the position of the holding blade and presser feet before the inserting blade is passed between separators or "wires" to form a loop;

Fig. 41 is a view similar to Fig. 40, indicating the position of the parts when the inserting blade has been inserted to form the new loop;

Fig. 42 is a sectional view, similar to Figs. 40 and 41, indicating the next position of the parts in which the inserting blade and the holding blade have been withdrawn from between the "wires" or separators;

Fig. 43 shows the relative position of the "wires" and the product at the point of complete withdrawal from the "wires";

Fig. 44 is a view in elevation showing a holding blade, together with the associated parts for operating the blade;

Fig. 45 is an enlarged sectional view taken on the line 45—45 of Fig. 44;

Fig. 46 is a detailed view in perspective of a portion of an inserting blade together with one of the cam slides for operating the blade;

Fig. 47 is a detailed sectional view taken on the section line 47—47 of Fig. 45;

Fig. 48 is a detailed view of a presser foot together with the associated cams, slides and spring-relief elements for operating the presser foot;

Fig. 49 is a detailed sectional view taken on the line 49—49 of Fig. 48; and

Fig. 50 is a detailed view in perspective of a portion of a presser foot showing the spring-relief units together with one of the cam slides.

Figure 29:
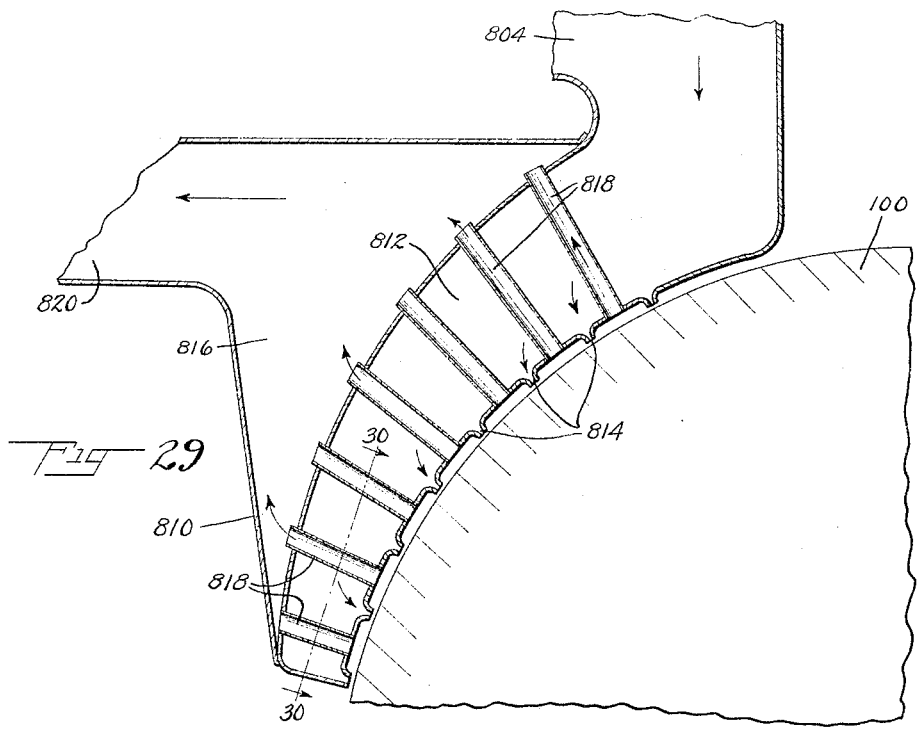
Fig. 29 is a sectional view of the drying apparatus employed in connection with the drum.

Referring more in detail to the drawings, the machine, in its preferred form, comprises as its main elements, the drum 100, an inserting mechanism 200, a rubberizing mechanism 500, a drying system 800, and a vulcanizing mechanism 900, as may best be seen by reference to Figs. 1 and 2 of the drawings.

Referring more particularly to Fig. 2, the drum 100 consists preferably of similar end sections 102 and 103 and similar middle or central sections 104 and 105, the drum being preferably built in a plurality of sections for convenience in assembling and handling the large masses involved, since the drum, for ordinary commercial purposes may have a diameter of from ten to twenty feet, for example. The sections may be united by means of tie-bolts 106 as best seen in Figs. 3 and 4 of the drawings. The drum is preferably supported on a shaft 108, journaled in ball-bearings 110 and 111 contained in pedestals 112 and 113, the pedestals being in turn supported on a bed plate 114. The pedestals 112 and 113 may be provided with bosses 116 and 117, concentric with the shaft 108, serving to support spider frames 118 and 119, on which the inserting mechanism 200 and the rubberizing mechanism 500 may be mounted, the spider frames being preferably rigidly connected to the bed plate 114 by means of struts 120, as seen in Figs. 1 and 5.

The shaft 108 supporting the drum 100, is preferably made hollow through portions of its length so as to provide two passages or passageways 122 and 124, which may be connected at their respective outer ends with pipe connections 126 and 128, for the admission and exhaust of a heating medium, as steam, employed for suitably heating the drum sections. The passageway 122 may be connected by a pipe 130 with circumferential passageways 132, 172, 182 and 192, which may be cored out in the respective sections 102, 104, 105 and 103. As shown in Fig. 2 of the drawings, the pipe 130 is preferably directly connected with the passageway 172, and is connected to the passageway 132 by means of a branch pipe 170, and with the passageway 192 by means of a branch pipe 180, from which a second branch pipe 184 leads to the passageway 182. Similarly, with respect to the lower portion of the drum, as shown in Fig. 2 of the drawings, the passageway 124 is connected by means of a pipe 131 to the circumferential passageway 182, and by means of a branch pipe 171 to the passageway 192, and by means of a branch pipe 181 with the passageway 132, a second branch pipe 186 being provided to connect the pipe 181 with the circumferential passageway 172.

In order to rotate the drum, the end sections 102 and 103 preferably carry worm wheels 136 and 137 (see Figs. 2, 3, 4 and 6 of the drawings), which are rigidly mounted on the sections and adapted to be engaged by suitable driving worms 254 (see Fig. 6), as hereinafter fully explained.

In order to support the weight of the vulcanizing elements hereinafter more fully described, and to permit their application under heavy pressure in a manner to localize the resulting stresses and strains on the immediate portion of the drum or cylinder to which the vulcanizing elements are directly applied, the end sections 102 and 103 have cast integrally therewith flanged pulleys 138 and 139, on which may be mounted, so as to turn thereon, split rings 140 and 141, which may consist of two halves united by bolts 142, as shown in Fig. 1 of the drawings. The split rings are preferably provided with bosses through which pass the bolts 142. The bosses on the upper halves of the split ring assemblies may be provided with spring pockets, as shown in Fig. 3a, containing spiral springs 143, which are adapted to be retained or compressed by nuts 147 bearing on washers 145. These split rings are designed to carry the entire weight of the vulcanizing elements when out of contact with the surface of the drum, the upper halves of the rings being preferably provided with anti-friction rollers 144. The outer ends of the rollers may be provided with recesses in which ball-bearings 146, mounted on pins 148 are seated, thereby reducing the friction of moving parts to a minimum.

In order to support the inserting mechanism 200 in operative position with reference to the drum member, we preferably employ a construction comprising levers 202, as shown more particularly in Fig. 5 of the drawings, which are pivoted on a tie-rod 204, supported by the spider frames 118 and 119 above referred to. The levers 202, as shown more particularly in Fig. 6, carry studs 206, which are locked in position on bosses 208 by means of nuts 210. Projecting sections 212 on the studs 206 carry grooved rollers 214 adapted to turn on ball-bearings 216, as may be seen by reference to Fig. 6 of the drawings. In order to guide the head with reference to the drum, and to limit the upward movement of the inserting mechanism away from the drum surface, we preferably provide grooves 215, in the rollers 214, which are adapted to engage corresponding projections 213 on the end sections 102 and 103 of the drum. The projecting sections 212 of the studs 206 are preferably eccentric with reference to the main portion of the studs, so as to permit a final adjustment after a suitable preliminary adjustment has been obtained by adjusting the position of the levers 202 with reference to the lugs 217, with which the gear casings 218 are integral.

In order to provide for preliminary adjustment both of the inserting mechanisms, and of the meshing of the driving worms 254 with the worm-wheels 136 and 137 (see Fig. 6), we preferably employ guides comprising planed surfaces on the projecting lugs 217 of the gear casings 218, which are slidably fitted in planed depressions in the corresponding portions of the levers 202, the parts being adjustably locked in place by means of cap-screws 220.

In order that the inserting mechanism may be operated with minimum power consumption, in view of the necessity of rapidly and intermittently relating the inserting elements with the "wires" on the continuously moving drum or cylinder, we preferably mount the inserting mechanism in the manner hereinafter described so as to be moved about a fixed center of rotation located at a substantial distance from the portions of the inserting elements which engage the "wires". In order to compensate automatically for changes in temperature, we employ the construction as shown more particularly in Fig. 5 of the drawings, comprising spring pockets 222 carried in the spider frames 118 and 119, the spring pockets containing spiral springs 224 and plungers 226, which bear upon and support the gear casings 218 mounted, together with the inserting mechanism, on the levers 202 pivoted on the tie-rod 204.

Referring more particularly to Fig. 6, in the construction shown the lower halves of the gear-casings 218, which are integral with the lugs 217, are bolted to the corresponding upper halves, which are integral with the yolk 228, which unites, or associates the levers 202, the gear casings 218, and the inserting mechanism, later to be described, into a rigid unit pivoted on the tie-rod 204 as an axis or center of rotation, the whole mass being supported by the spiral springs 224, as above described.

From the construction, above described, it will be understood that a proper meshing of the driving worms 254 with the worm-wheels 136 and 137 (Fig. 6) may be secured by the sliding adjustment obtained by the projecting lugs 217 of the gear-casings 218 in the corresponding grooves or planed surfaces of the levers 202. The adjustment just described also serves to locate the inserting elements, hereinafter more particularly referred to, radially with reference to "wires" 151, as seen in Fig. 6. It will also be understood that the spiral springs 224 (see Fig. 5) pressing on the plungers 226 tend to lift the gear casings 218, the yoke 228 and the associated inserting mechanism about the tie-rod 204 as a center. The grooved rollers 214 (Fig. 6) bearing on the projections 213 of the drum on the sections 102 and 103 serve to limit the upward movement just described; and the position of the grooved rollers 214, required to exactly locate the inserting mechanism and the main driving worms 254 at the desired point, may be adjusted by rotating the studs 206 with their eccentric portions 212 in the bosses 208.

The arrangement just described, whereby the assembly consisting of the gear casings 218, the yoke 228, the inserting mechanism 200, later to be described, and the levers 202, are pivoted on the tie-rod 204 as a center, provides together with the rollers 214, an automatic adjustment of the relationship of the inserting elements with the surface of the drum 100. When the drum 100 expands under the influence of heat during the operation of the machine, the inner surfaces of the end sections 102 expand correspondingly, allowing the spiral springs 224 to raise the whole assembly, thereby maintaining the correct meshing of the worms 254 with the worm-wheels 136 and 137, and at the same time, the proper relationship between the inserting elements and the "wires" 151.

In the preferred construction shown, referring to Fig. 10, the gear casings 218, together with the corresponding end portions of the yoke 228, house gears 230 which are concentric with a shaft 232. The gears 230 mesh with gears 234, which are keyed on cam-shafts 236. The gears 234 mesh with gears 238, which are keyed on a shaft 240, which is the main driving shaft of the machine. The shaft 240 carries worms 242, which mesh with worm-wheels 244, keyed on shafts 246, which are supported by ball-bearings 248, 250 and 252. Keyed to the shafts 246 are worms 254, which mesh with worm-wheels 136, 137 attached to the drum 100 by cap-screws 150.

Referring to Fig. 9, the gears 230 are mounted on ball-bearings 256 and 258 so as to turn freely on the shaft 232. On the shaft 232 are also mounted the hubs 260, which are keyed thereon so as to rotate therewith. Rocker-shafts 262 (Fig. 10), central square portions of which engage similar square holes in dogs 264, bear on their innermost ends cams 266, a part of whose surfaces are cylinders of small radius fitting in corresponding recesses in the inner faces of the hubs 260. Other portions 267 of the faces of the cams 266 are cylindrical surfaces of the same radius as reduced portions 268 of the hubs 260, as shown in Fig. 9. The dogs 264 are provided with spiral springs 270, which act to retain the dogs 264 and the cams 266 in the position shown in Fig. 10. The gears 230 are provided with recesses 272 as shown in Fig. 10 of the drawings. In these recesses 272 are inserted lugs 274, whose surfaces 276 and 278 are of the same radius as those portions of the surfaces of the cams 266 which fit the corresponding recesses in the hubs 260. As shown in Fig. 10, latches 280 are keyed on a shaft 282, which is supported in the yoke 228, and cams 284, which carry operating handles 286, are attached to the latches 280 by means of pins 288.

It is obvious from the preceding description, that, by the movement of the hand levers 286 the latches 280 may be retained in the position shown on Fig. 10, or in the alternate position shown in dotted lines. In the position shown in full lines the rotation of the gears 230 brings the lugs 274 into contact with the related portions of the rocker-cams 266 attached to the rocker-shafts 262, which are pivoted in the body of the hub 260, thereby causing the hubs to rotate in unison with the gears 230, imparting motion to the shaft 232.

When, by the movement of either of the handles 286, the latches 280 are brought into the position shown in dotted lines in Fig. 10, it is obvious that the hooked portions 281 on the latches 280 will engage, at the next revolution of the clutch parts, the nose portions 265 on the dogs 264, causing the spiral springs 270 to be compressed and the rocker-shafts 262 to be rotated until the cams 266 occupy a position such that their surfaces 267 are concentric with the reduced portions 268 of the hubs 260. Under these conditions, the clutches are disengaged, and the continued rotation of the gear 230 does not impart motion to the shaft 232.

Referring to Fig. 7, the inserting mechanism is preferably mounted in a casing 291 consisting of two parts 290 and 292, divided vertically and clamped together by means of through-bolts 294 and 295. The bolts 295 are provided with sleeves 297 (Fig. 47) which serve suitably to space apart the lower portions of the sections 290 and 292 for the reception of the slides, later to be described, which are associated with the inserting and holding elements. The shaft 232, mounted in the casing, is supported at its extreme ends by means of ball-bearings 296 (Fig. 9), the shaft receiving intermediate support from ball-bearings 298 and 300, located in spool-pieces 302, which may be clamped in cylindrical recesses in the castings 218 and the yoke 228.

Referring to Fig. 8, the spool-pieces 302, just referred to, appear at the extreme ends of the figure, while intermediate spool-pieces 304, containing ball-bearings similar to 298 and 300, are shown clamped by means of caps 306 in semi-cylindrical recesses in brackets 308, projecting from the yoke 228.

Referring particularly to Figs. 7, 8 and 9, the shells or portions 290 and 292 of the casing 291 are preferably provided with bushings 310 (Fig. 9), closely fitting the spool-pieces 302 and 304, which permit the inserting mechanism casing 291 to have a motion of rotation about the shaft 232 as a center. As shown in Fig. 11, the cam-shafts 236 are preferably supported at their outer ends by ball-bearings 312 and 314, and are supported at their inner ends by means of ball-bearings 316, which are inserted in housings 318, formed in brackets 319 projecting from the yoke 228. Referring more particularly to Fig. 11, a pair of identical cams 320, separated by a complementary cam 322, are keyed on a sleeve 324, by means of a key 325, which at the same time keys the sleeve 324 to the shaft 236, the assembly of cams, key and sleeve being fixed longitudinally of the shaft 236 within a bracket 330 by means of a flanged collar 326 and a nut 328 screwed upon a threaded portion of the sleeve 324. It will be understood that the assembly just described is applied to both of the cam shafts 236. In the construction shown the brackets 330 are secured to the rearmost half 290 of the inserting mechanism casing 291, by means of cap-screws 332 and 334, as shown most clearly in Fig. 7.

Referring particularly to Fig. 11, the brackets 330 are bored for the reception of eccentric bushings 336 and 338. As constructed, the bushing 336 consists of sections 340 and 342, the sections 340 being eccentric with reference to a smaller cylindrical section 336, the section 342 being similarly eccentric with reference to the section 336 and keyed thereon. The cylindrical surface of the section 342 is preferably milled into the form of a worm-wheel, which meshes with an adjusting screw 344, whereby the eccentric bushing 336 may be rotated as a whole, thus adjusting ball-bearings 346, which serve as cam rollers, in their relationship to one of the cams 320. The eccentric bushing 338, above referred to, is identical in function with bushing 336, but is preferably of slightly different construction from that of the bushing 336 because of the exigencies of assembly. The bushing 338, as shown in the preferred construction, consists of elements 348 and 350, which are identically eccentric with the element 338, the element 348 being tightly screwed on the element 338, while the element 350 is keyed thereon. The element 350, like the element 342, is preferably milled in the form of a worm-wheel, meshing with an adjusting screw 352, whereby the bushing assembly may be rotated as a whole, thus adjusting ball-bearings 354, which serve as cam rollers, in their relationship to the corresponding cam 320. The bushing assemblies 336 and 338 are locked in position, when adjusted, by means of a bushing 356 (Fig. 7) in co-operation with a bolt 358 and a nut 360.

Similarly, the bracket 330 is preferably bored for an eccentric bushing assembly 362 (Fig. 11), comprising a large cylindrical element 364, eccentric with the element 362, and a separate element 366, identically eccentric with reference to the element 362 and keyed thereto. The element 366 is preferably milled to form a worm-wheel, which meshes with an adjusting screw 368, whereby ball-bearings 370, used as cam rollers, may be adjusted in their relationship with the cam 322. A locking bolt 372, analogous to the locking bolt 358, locks the eccentric bushing assembly 362 in position after adjustment.

For purposes of clearness, the bushing assemblies, just described, have been related to a single bracket 330. It will be understood, however, that in the preferred construction embodying our invention exactly similar assemblies are provided in a corresponding bracket related to the other cam shaft 236.

With reference to Fig. 7 of the drawings, it will be understood that the cams 320 and 322 on their respective cam-shafts, operating through associated cam rollers and bushings housed in the brackets 330, which are attached to the inserting mechanism casing 291, fix the position of the inserting elements, later to be described, with reference to the "wires" 151.

The various eccentric bushings serve to adjust this relationship, as desired, and also to insure that motion imparted by the various cams to the casing 291 shall be positive in both directions without lost motion or back-lash.

Figure 38:
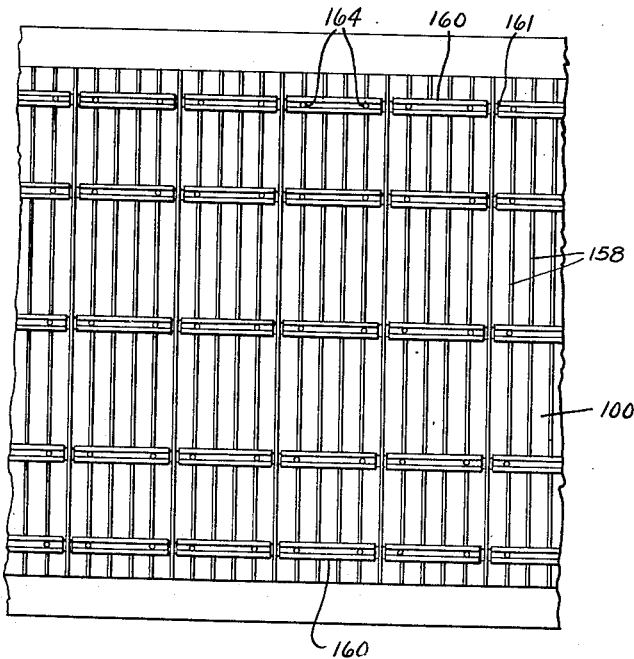
Fig. 38 is a detailed plan view of a portion of the drum, showing the means for attaching the clothing units to the drum.
Figure 39:
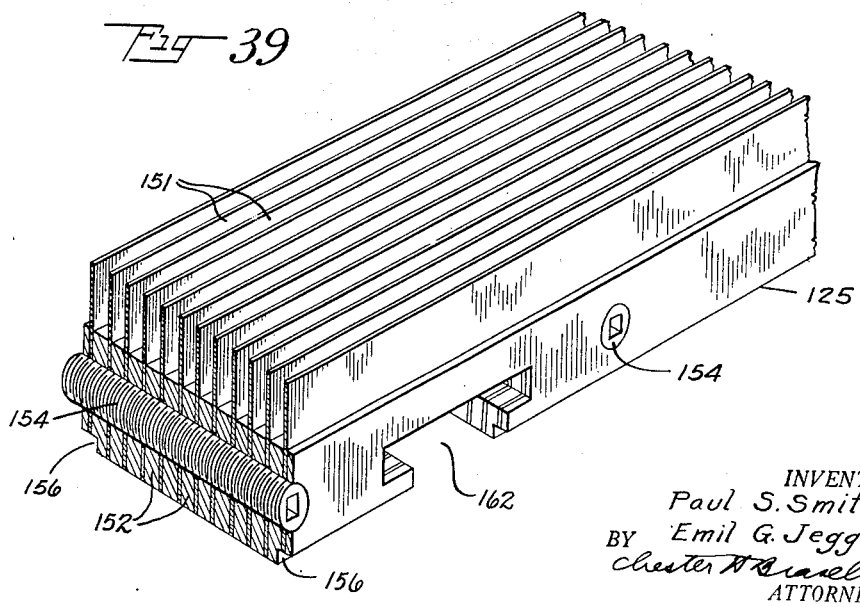
Fig. 39 is a view in perspective showing a portion of a clothing unit.

As shown more particularly in Figs. 7 and 14, the entire cylindrical surface of the drum is provided with a series of grouped spacing elements or "clothing" 125 in the form of radially projecting blades or "wires" 151 (Fig. 14) uniformly spaced apart by a series of thicker spacing elements 152. The "clothing" above referred to, is preferably assembled in the form of unitary blocks or bundles, a portion of one of which, partly in section, is illustrated in Fig. 39. The elements comprising a single bundle, as shown, are united into a mass by means of screws 154, although obviously other means might be employed for this purpose. The opposite lower edges of each bundle are preferably milled with recesses 156, which are adapted to register with keys 158, shown in cross-section on Fig. 14 and in developed plan in Fig. 38. These keys 158 serve to accurately align the "clothing" units parallel with the axis of the drum. In the preferred form of our invention the drum is milled circumferentially with slots 161 adapted for the reception of T-bars 160, shown in cross-section in Fig. 6, and in developed plan in Fig. 38, and being further shown in side elevation, partly in section, in Fig. 7 of the drawings. In this construction, the T-bars 160 engage similarly shaped T-slots 162 milled in the "clothing" units, the T-bars, together with the clothing units interlocked therewith, being firmly secured to the surface of the drum by means of bolts 164, as shown more particularly in Fig. 7.

The relationship of the inserting elements, about to be described in connection with Fig. 41, is best shown in relation to the "clothing" elements on the drum in Figs. 6 and 7, Fig. 6 being a view in elevation parallel with the clothing elements, and Fig. 7 being a view in cross-section.

Referring more particularly to Figs. 7 and 41 of the drawings, the preferred form of the inserting mechanism 200 comprises preferably a rear presser-foot 380, a holding blade 382, a center presser-foot 384, an inserting blade 386, a front presser-foot 388 and a spacing bar 390.

In our preferred construction of the inserting mechanism (Figs. 7 and 8), which serves to operate the blades and presser-feet at predetermined desired intervals and sequence, the main operating shaft 232 carries a series of cams or cam discs 392 which are preferably keyed to the shaft, and comprise inner and outer portions 394 and 396 which define between them grooves 398 carrying rollers attached to the respective parts to be operated. A cam-roller 400 is mounted on a stud 402, which is attached to a cam-slide 404, adapted to reciprocate vertically between adjustable gibs 406 and 408. Referring to Fig. 47, which is a horizontal section through the gibs 406 and 408, it will be noted that each gib forms a bearing for a pair of cam-slides 404. The proper adjustment between the cam-slides 404 and the gibs 406 and 408 is secured by adjusting screws 410.

Referring to Figs. 45 and 46, the holding blade 382 is attached to a bar 412, by means of screws 414, for example, the bar being mounted so as to make a sliding, dove-tailed fit in a slide 416, which is attached to the cam-slide 404 by means of screws 418 for example. The slide 416 and the cam-slides 404 are preferably further secured into a unit by the mutually interlocking portions shown in section in Fig. 45.

Referring to Fig. 44, it will be seen that the holding blade 382 is attached throughout its length to the slide 416, and that this slide is attached to a plurality of cam-slides 404, co-operating, through their respective studs 402 and cam-rollers 400, with an equal number of identical cams 392.

The inserting blade 386 (Fig. 41) is attached to a corresponding slide in a manner exactly similar to that by which the holding blade 382 is attached to the slide 416 as just described. This corresponding slide in turn is similarly interlocked with cam-slides 404, which co-operate with an equal number of cams 392.

Referring to Fig. 49, the rear presser-foot 380, is, through the greater portion of its length, of a section indicated by the dotted line. At certain points, however, it has a section indicated by the full line, being provided with a plurality of projecting rectangular lugs 422 which fit within corresponding rectangular openings 424 in a slide 426 (Figs. 48, 49 and 50). The rectangular openings 424 are of greater vertical height than that of the projecting lugs 422 on the presser-foot 380, with the result that this presser-foot may be raised by upward motion of the slide 426, while, on the other hand, the slide may have downward motion without moving the presser-foot. The presser-foot 380 is preferably provided with pins 428 which serve as guides for spiral relief-springs 430, a pin 428 and a spiral spring 430 being located in the construction shown in each of the rectangular openings 424 in the slide 426. The slide 426 is interlocked with cam slides 404, to which it is additionally secured by screws 432. Referring to Fig. 48, it will be noted that in the preferred construction shown the rear presser-foot 380 is in contact throughout its length with the slide 426, that the lug-like projections 422 are engaged in the rectangular openings 424 in the slide 426, that a similar number of guide pins 428 and spiral relief-springs 430 is provided, and that a plurality of cam slides 404 distributed throughout the length of the slide 426 co-operate with an equal number of appropriate cams 392.

The front presser-foot 388 (Fig. 41) is related to, interlocked with, and spring-relieved in connection with, a slide 434 (Fig. 7) in a manner exactly analogous with that existing between the rear presser-foot 380 and the slide 426, and the slide 434 is similarly interlocked with, and attached to, a plurality of cam-slides 404, which again co-operate with an identical number of cams 392 attached to the shaft 232.

The middle presser-foot 384 (Fig. 41), which is shown in elevation in Fig. 8, is attached in any suitable manner, as by screws (not shown) to a slide 436 (Fig. 7), which is provided with projecting lugs 438 interlocking with corresponding rectangular openings 440 in a slide 442 (Fig. 8). The slide 442 is provided with spring pockets 444 for the accommodation of spiral relief-springs 446, which are retained by screw plugs 448. The slide 442 interlocks with a plurality of cam-slides 404, which are actuated by an equal number of identical cams 392 on the shaft 232.

Referring further to Figs. 41 and 7, the spacing bar 390 which serves to relieve the strain from the forward "wire" or spacing element 151' during the insertion of the pile element material between the "wires" is preferably firmly attached by means of brackets 452 to the ends of the inserting mechanism casing 291.

The inserting elements 380, 382, 384, 386 and 388, together with their respective slides, are maintained in proper sliding relationship by means of gibs 454 which are adjustable by screws 456 (Fig. 7).

It will be apparent that by means of the construction shown, as above described, the inserting mechanism is operated in synchronism with the drum, or the pile-retaining elements, so as to continuously retain the parts of the inserting mechanism in adjustment irrespective of the wear on the operating parts concerned. It will also be apparent that by the means employed, the inserting elements may be registered or related with the successive "wires" on the moving element and may be operated at a high rate of speed without correspondingly moving the inserting mechanism as a whole. It will also be noted that, with the construction as shown, the inserting mechanism casing may move with the drum about the shaft 232 as a center of rotation in such a manner that during the interval in which the inserting and holding elements are engaged with the "wires", their relative angular displacement with reference to the "wires" is negligible.

In order to apply the rubber cement material to the exposed base portions of the loops or pleats formed in the pile element material between the "wires" of the drum by means of the inserting mechanism, we preferably employ the construction hereinafter described in detail by means of which the cement material may be applied along a predetermined path strictly longitudinally of the "wires" irrespective of the continuous movement of the drum, and by means of which the cement or rubberizing material is applied only along a width corresponding to the width of the batt or pile element material which is to be coated. In order that the rubberizing device may be manually disengaged, when desired, a clutch 687 is mounted, as shown at the left in Fig. 6, so as to be disengaged by a hand lever 689.

The construction of the rubberizing device may be described in detail as follows:

Referring to Figs. 12, 13 and 14, channel-shaped guides 502 and 504 are preferably supported on brackets 506, (Fig. 12), which are bolted to the spider frames 118 (Fig. 1). A carriage 508 (Fig. 21) is provided with rollers 510 adapted to support it and to permit it to travel longitudinally of the guides 502 and 504. The movement of the carriage may be cushioned, if desired, at the limits of its stroke by means of spring-actuated bumpers 507, one of which is illustrated at the right in Fig. 2. Referring to Figs. 12, 13 and 14, a shaft 512 is supported on ball-bearings 514 in the guide 502. Similarly a shaft 516 is supported in ball-bearings 518 in the guide 504. On the shaft 512 is keyed a helical gear 520, which meshes with a helical gear 522 keyed on a shaft 524, which is supported in ball-bearings 526 and 528. Similarly a helical gear 530 is keyed on the shaft 516 and meshes with a helical gear 532 keyed on a shaft 534, which is supported on ball-bearings 536 and 538. On the shafts 524 and 534 are keyed sprockets 540 and 542, respectively, over which pass roller-chains 544 and 546 respectively (Fig. 12). The roller-chains 544 and 546 pass around sprockets 548 (Fig. 20) and 550 (see Fig. 12), which are mounted on studs 552 (Fig. 20) and 554 (see Fig. 12) attached to blocks 556 and 558. Adjusting bolts 560 and 562 (Figs. 12 and 20) serve to move the blocks 556 and 558 longitudinally of the guides 502 and 504 for the purpose of taking up slack in the chains. The blocks 556 and 558, when adjusted, are rigidly clamped to the guides 502 and 504 by means such as bolts 564 and 566.

Corresponding links of the chains 544 and 546 are provided with fixtures 568 and 570 (Figs. 12, 13 and 14) carrying rollers 572 and 574, adapted to move in vertical slots 576 and 578 in the carriage 508. The carriage 508 (Figs. 20 and 21) contains a subsidiary carriage 509, the latter being supported in vertical relationship with the former by means of spiral springs 580, adjustably retained in corresponding spring pockets by suitable means, as screw plugs 582, for example. Studs 584 serve as guides for spiral springs 586, which may be compressed to any desired degree in corresponding spring pockets by adjusting nuts 588.

Referring to Fig. 12, a shaft 590 is supported by ball-bearings 592 at opposite ends of the guide 504. The shaft 590 passes through a sleeve 594 (Fig. 15), which is mounted in ball-bearings 596 in the frame of the carriage 508. A helical gear 598, slidably mounted on the shaft 590, is fitted with a key 600 adapted to slide in a keyway 601 extending throughout that portion of the length of the shaft 590 corresponding to the movement of the carriage 508. The helical gear 598 (Figs. 12, 13 and 15) meshes with a helical gear 602 keyed on a shaft 604 (Fig. 15), which is supported in ball-bearings 606. A worm 608 is keyed on the shaft 604 and meshes with a worm-wheel 610 cut on a shell 612 (Fig. 13), which fits rotatably in a corresponding cylindrical recess in the subsidiary carriage 509. The worm-wheel shell 612 is attached to a cylindrical cam 614 by means of set screws 616 and grub screws 618, the cam being provided with a groove 620, as shown in Fig. 26. A shaft 622 supported in ball-bearings 624 (Fig. 13) and 626 (Fig. 14) is surrounded by a sleeve 628, into which is screwed a cam-roller stud 630, bearing a cam-roller 632, and locked in position by suitable means such as a set screw 634. The sleeve 628 is prevented from rotating with the shaft 622 by means of a key 636, fixed in the body of the subsidiary carriage 509. A flanged end of the sleeve 628 is locked in position in a roller 638 by means of a bushing 640, which may be secured by grub screws 642, for example. A spiral spring 644 in a spring pocket 646 is adjusted and retained under the desired compression by means of screw plugs 648 (Fig. 14) and bears against a transverse key 650 (Fig. 13), which makes contact with a washer 652. The roller 638 is caused to rotate with the shaft 622 by means of keys 654 in keyways 656, which are extended longitudinally of the shaft 622 to permit the roller 638 to move thereon an amount corresponding to the amplitude of the groove 620 in the cam 614. The face of the roller 638 is machined to a contour corresponding to that of the outer ends of the "clothing" elements or "wires" 151.

Referring to Fig. 14, a sprocket 658 is keyed on the shaft 622 and meshes with a roller-chain 660 (see Figs. 12 and 20), which is extended between holding blocks 662 and 664, the former of which is rigidly attached to one end of the guide 502, while the latter is adjustable longitudinally of the guide 502 by means of a take-up bolt 666, whereby slack in the chain may be eliminated; the chain 660 thus serves as a rack with which the sprocket 658 is adapted to mesh. Referring particularly to Figs. 13 and 14, the shaft 622 is provided with rollers 668, adapted to bear, under certain conditions, upon adjustable rails 670 contained in rail guides 672 and 674.

Fig. 16, showing the carriage 508 and the subsidiary carriage 509 in section, shows one of the rollers 668 bearing upon one of the rails 670. The rails terminate in ramps 675, as shown in section in Fig. 16 and in top elevation in Fig. 12. The rails 670 (Fig. 17) are movable longitudinally in the guides 672 and 674, their under surfaces being cut in the form of racks 676, adjustment being effected by the insertion of a hand-wrench 678 (Fig. 18) in holes 680, an end of the wrench 678 being milled with teeth 682 adapted to mesh with the rack surfaces 676. The adjustment thus secured is locked by plates 684, (Figs. 17 and 19) which may be moved into and out of engagement with the rack teeth by means of slots 686 and secured by cap-screws 688.

Referring to Fig. 12, a sprocket 690 is keyed on the shaft 590 and is connected by a roller-chain 693 with a sprocket 692 (Fig. 1). Again referring to Fig. 12, identical sprockets 691 and 694 are also keyed on the shaft 590 and are connected by means of roller-chains 695 with a sprocket 696, keyed on the shaft 516 and sprocket 697 keyed on the shaft 512. Sprockets 698 and 700, to be hereinafter referred to, are also keyed on the shaft 512.

The means which we preferably employ for directly applying the rubber cement material to the appropriate portions of the loops or pleats formed in the pile element material operated upon comprises a rubberizing roller 638, which is preferably mounted and operated as follows:

Referring to Figs. 22 and 23, a bracket 702 is clamped on the sleeve 628 (Fig. 13) by means of screws 704, it being understood that sleeve 628 does not rotate with the shaft 622. A nozzle body 706 is adjustably attached to the bracket 702 by means of studs 708 for example. A piston-rod 710 is tapped into the nozzle body 706, being secured thereto by suitable means such as a jam nut 712. Nuts 714, threaded on the piston-rod 710 in the manner shown in the drawings, serve to limit the movement of a cylinder 716 which is forced downwardly under the pressure of a spiral spring 718. A piston 720 is mounted in the cylinder 716 on the rod 710 and is preferably provided with a packing 722, which is retained by a washer 724 secured by locknuts 726. An air supply pipe 728 is connected to the cylinder in any suitable way, being preferably tapped into the head 715 of the cylinder. Rods 730 and 731 which are preferably adjustably attached to the lower cylinder head 732 of the cylinder 716, pass through appropriate holes in the bracket 702 and through glands 734 tapped into the nozzle body 706. The rods 730 and 731 are attached to a plunger 736, in which are inserted pins 738, adapted to pass through corresponding openings or holes 739 in a nozzle plate 740. In order to supply the cement material to be distributed through the openings 739 to the surface of the roller 638, a cement supply pipe 742 is tapped into the nozzle body 706, as shown more particularly in Fig. 23 of the drawings.

In supplying the cement material to the nozzle body 706, we preferably employ the supply means shown in Fig. 24, comprising a supply tank 744, connected by a pipe 746 to a strainer 748, which in turn is connected by a pipe 750 to a plunger pump 752, shown diagrammatically in the drawings. The driving shaft of the pump 752 is connected by any suitable form of driving means with a variable speed transmission 754, which in turn is driven by a roller-chain 756, which passes around the sprocket 698 on the shaft 512 (Fig. 12).

In the construction shown, the pump 752 discharges through a pipe 758 to a cock 760 (Fig. 25) to whose spindle is keyed a star wheel 762. A pipe 764 connects the discharge side of the cock 760 through swing joints 766 with the supply pipe 742 attached to the nozzle body 706. Similarly, a compressed air supply pipe 768 is attached to a cock 770, whose spindle is also attached to the star wheel 762. A pipe 772 connects the discharge side of the cock 770 through swing joints 774 with the air supply pipe 728 attached to the cylinder 716. A roller-chain 776, indicated diagrammatically in Fig. 24 as passing around idler sprockets 778, is driven by the sprocket 700 (Fig. 12) on the shaft 512 and carries lugs 780 (Fig. 25) adapted to intercept the arms of the star wheel 762.

By this means as described a rubber cement or dispersion of rubber may be applied to appropriate parts of the pile element material in controlled amounts, the rubberizing roller 638 operating frictionally to provide the desired impregnation with limited amounts of impregnating material and serves to uniformly distribute the cement material with a minimum pressure. It will be obvious also that the distributing means which has been described may be operated controllably or adjustably to apply the cement material along a predetermined path on the machine without distributing the material to undesired portions of the machine or undesired portions of the pile element material held by the clothing elements or "wires".

It will be understood from the above description that any suitable form of cement material may be employed, such for example as a vulcanizable rubber compound dispersed in water or dissolved in a volatile solvent. After the material has been applied to the appropriate portions of the folded or pleated pile element material, it is preferable to expel volatile portions thereof such as moisture or solvent material, before subjecting the rubber cement material to vulcanization as will be hereinafter described in detail. In order to drive off moisture or other volatile ingredients present in the cementing composition applied to the pile element material, we preferably employ the mechanism or device illustrated more particularly in Figs. 1, 29 and 30, comprising a blower 802 which is connected by means of a discharge duct 804 passing to a section of the drum containing the coated or impregnated pile element material. The discharge duct 804 is preferably provided with heating elements as indicated at 806 for heating the air passing therethrough to the drum surface. The discharge duct 804 is preferably connected to a hood 810 which conforms with the contour of, and is mounted closely adjacent to, the surface of the drum 100.

Figure 30:
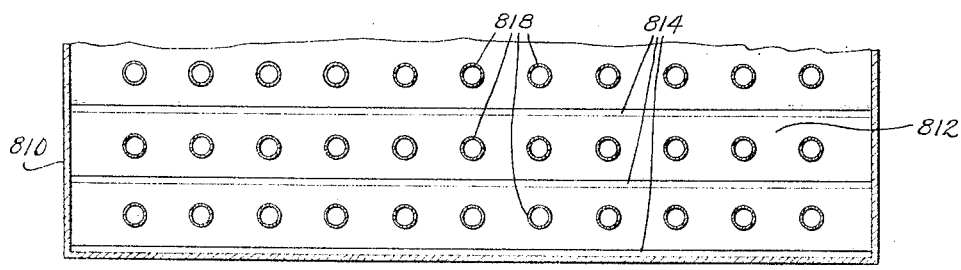
Fig. 30 is a detailed sectional view taken on the line 30—30 of Fig. 29.

Referring particularly to Figs. 29 and 30, the hood 810 consists of two parts, a plenum chamber 812 provided with nozzle openings 814, and a suction chamber 816 into which lead pipes 818, which pass through the plenum chamber 812. In the construction shown, a duct 820 connects the suction chamber 816 with the suction side of the blower 802 to assist in drawing off the vaporized volatile material. In order to systematically discharge a portion of the air circulated by the blower, so as to prevent accumulation of moisture or other ingredient therein, we preferably attach the duct 822 to the high pressure duct 820 between the blower 802 and the heating units 806, the duct 822 venting to the atmosphere, and being provided with an adjustable damper 824 to control the amount of discharge.

In order to vulcanize the cement material, applied to the inserted pile element material held between the "wires" on the drum as above described, in a manner so that the stresses and strains resulting from the application of the vulcanizing means will be localized on the immediate portion of the drum to which the vulcanizing means is directly applied; and further in order to provide vulcanizing means having heated surfaces adapted to be flexibly applied to the material to be vulcanized; and finally alternately to apply and withdraw the vulcanizing means without substantially changing the load imposed on the driving means for the drum, and without disturbance of the adjustment of the elements of the inserting mechanism relative to the "wires", we preferably employ the form of vulcanizing apparatus shown in detail in the drawings, which may be described as follows:

Referring to Fig. 1, the vulcanizing mechanism 900 consists of a plurality of units, ten or more in number, suspended from the lower halves of the split ring assemblies 140, which as has been previously stated, are adapted to rotate on the pulleys 138 and 139 projecting from the outer sections 102 and 103 of the drum 100. Referring to Fig. 4, ram supports 902 are preferably dove-tailed into the lower halves of the split ring assemblies 140, to which they may be further secured by means of cap-screws 904. Referring to Figs. 4 and 31, each ram support 902 preferably embodies two webs 906, through bosses in which pass pins 908, on which are pivoted forked levers 910. The forked ends of the levers 910 enclose the upper ends of forked hangers 912, to which they are pivoted by means of pins 914. The unforked ends of each pair of levers 910 (Fig. 32) are pivoted by pins 916 in blocks 918 (Fig. 4), into which are screwed piston-rods 920 attached to pistons 922 in the hydraulic cylinders 924. The pipes 926 and 928 for the passage of operating fluid to and from the cylinders are preferably tapped into opposite ends of the cylinders 924 as shown.

Referring particularly to Figs. 1, 2 and 4, the forked hangers 912 are preferably connected by means of pins 930 to opposite ends of yokes 932. In the construction shown, more particularly in Fig. 33, which is an enlarged cross-section of a single yoke 932 and its associated parts, the spiral springs 934 are preferably retained by spring followers 936, into which fit flanged ends of spindles 938. The spindles 938 are threaded internally for the reception of studs 940, which are tapped into the body of platens 942, whose surfaces 944 conform to the surface formed by the clothing elements of the drum 100. The platens 942 may be adjusted with reference to the surface of the drum and also to the yokes 932 by rotating the spindles 938 about the studs 940 by means of nuts 946. The spiral springs 934 may be precompressed to any desired degree, independently of the adjustment of the platens just described, by rotating nuts 948 on the threaded portions of the spindles 938, without at the same time permitting the spindles 938 themselves to turn.

The platens 942 are preferably provided with interconnected cored-out passages 950, to which steam is introduced through supply pipes 951 in order to heat the platens, condensation being withdrawn through pipe 952 (see Fig. 2).

In the construction shown, the yokes 932 for applying the platens are given an additional degree of rigidity by truss-rods 954 (Figs. 2, 4 and 31). Referring to Figs. 1, 4 and 37, the yokes 932 are preferably tied together in pairs by links 956, which are attached centrally to the ends of the yokes by studs 958. Referring particularly to Fig. 1, the paired units of yokes 932, as united by the links 956, are connected with beams 960 by links 962. The central pair of yokes (Fig. 1) are, in effect, tied to the beams 960 by the passage of suspension rods 964 through appropriate holes in the links 956. The suspension rods 964 pass through split blocks 966 (Figs. 3 and 4) which are free to turn on the shaft 108. The beams 960 are further attached by suspension rods 968 (Fig. 1) to channel-shaped brackets 970, which are attached to the outermost hydraulic ram supports 902. By means of the structure just described, comprising the links 956 and 962, together with the beams 960, the platens 942 are retained in proper spaced relationship under all conditions, their application to the drum 100, and withdrawal therefrom, being assured in a substantially radial direction.

Referring to Figs. 1, 4, 34 and 37, the beams 960 are provided with studs 972, on which are pivoted connecting rods 974, whose forked ends are pivotally attached to levers 976 keyed on a shaft 978. The shaft 978 is preferably supported in bearing blocks 980 (Fig. 34), which are bolted to pedestals 982 cast integrally with the bed plate 114.

In the preferred construction, as shown in Figs. 34 and 35, the shaft 978 passes through bosses 983 in the upper ends of struts 984, whose lower ends are connected by a pin 986 to braces 988 attached to the foundation walls. The shaft 978 supports braces 990, which are attached to trunnion brackets 992 (Fig. 35) bolted to the bed plate 114. A lever 994, keyed on the shaft 978, carries a pin 996, which passes through a forked block 998, which is attached to a piston rod 1000 of a hydraulic cylinder 1002, which is pivotally mounted in trunnions on the bracket 992, a water-supply pipe 1004 being tapped into the forward end of the hydraulic cylinder, as shown. The forked end of the lever 994 preferably encloses a block 1006, to which it is pivotally attached by means of a pin 1008. The block 1006 is screwed or otherwise connected to a piston rod 1010 of a hydraulic cylinder 1012, which is rigidly mounted in the forked lever 1014, the lower end of which is pivoted on the pin 986. A water-supply pipe 1016 is tapped into the lower end of the hydraulic cylinder 1012. The pin 1008, forming a pivotal connection between the lever 994 and the block 1006, is extended into slotted holes 1018 in the two legs of the forked lever 1014.

Referring to Figs. 36 and 37, one of the levers 976 is connected by means of a connecting rod 1020 with a lever 1022, which is mounted on the spindle of a four-way cock 1024. A pin 1026 on the lever 1022 engages a slot 1028 in the connecting rod 1020, and is also pivotally attached to a lug 1030. A lug 1032 is pivotally attached by a pin 1034 to a bracket 1036. The lugs 1030 and 1032 carry guide pins 1038 for a spiral spring 1040.

A pipe 1042 attached to the cock 1024 communicates through the pipes 1044 and 1046 with one end or the other of a hydraulic cylinder 1048, according to the setting of the cock 1024. A pipe 1050 connects the cock 1024 with a waste pipe 1052. A supply pipe 1054 is connected with a hydraulic pump 1056, which discharges through a pipe 1058 into a hydraulic accumulator 1060. The accumulator 1060 is connected by a pipe 1062, either through a branch pipe 1064 with a cock 1066, or through a branch pipe 1068 through swing joints 1070 with a header 1072, from which branch pipes 926 connect to the upper ends of the hydraulic rams 924. The lower ends of the hydraulic rams 924 are connected by pipes 928 with a header 1078, which is connected through swing joints 1080 with a pipe 1082 attached to the cock 1066. A lever 1084 is attached to the spindles of the three-way cocks 1066 (Fig. 36), and is provided with a slot 1086, which engages a pin 1088 attached to a piston rod 1090 to which is connected a piston 1092 in the hydraulic cylinder 1048. By the means just described, the vulcanizing mechanism may be operated in a manner to controllably vulcanize the rubber cement material in accordance with the objects above set forth relating to the vulcanizing operation.

Referring to Fig. 1, a roll of rubberized fabric 1100 is supported by gudgeons 1102 resting in pedestals 1104 on the bed plate 114. Rollers 1106, a tension roller 1108, a spreader roller 1110, and a guide roller 1112 constitute means for guiding the web 1114 from the supply roll 1100 to the drum 100. A roller 1116, covered with card-clothing, is frictionally over-driven with respect to the drum 100 by any suitable means. A roll 1118 of semi-finished material is similarly over-driven by frictional contact with rollers 1120, which may be driven by any suitable means.

Having described in detail the construction of the various operating parts of the preferred form of our machine, the operation thereof may now be broadly described, as follows:

A suitable pile element material, as, for example, a batt consisting of lose fibres, as formed by a lapper in conjunction with a card or Garnett, is carried at an appropriate rate on the moving apron 166 (Fig. 1) to the guide 390 (Fig. 7). The apron 168, driven at the same speed as the apron 166, serves to consolidate the batt. Referring to Figs. 40, 41 and 42, the inserting elements 380, 382, 384, 386 and 388 co-operate, in a manner to be described, to insert the batt in the clothing elements or "wires" 151 in the form of loops or pleats, as indicated in these figures.

It will be understood that the drum 100, carrying the clothing elements 151, is given a constant counter-clockwise motion with reference to Fig. 1, in a manner later to be described, and that the portion of the drum on which the loops or pleats have already been formed is thereby carried continuously to the rubberizing mechanism 500 (Fig. 1).

Referring particularly to Fig. 12, the rubberizing roller 638, supplied with rubber cement or other suitable material by means of the nozzle 706 (Figs. 22, 23 and 24), traverses and bears frictionally upon the exposed surfaces of the loops, thereby impregnating them with cement material. Continued motion of the drum 100 brings the impregnated surfaces of the loops under the action of hot air supplied by the blower 802 to the nozzles 814 in the hood 810 (Figs. 29 and 30) whereby the moisture in the cement is removed. Continued rotary motion of the drum then carries the impregnated loop portions ultimately into contact with the previously rubberized fabric 1114 (Fig. 1), after which the steam-heated platens 942 are applied under pressure for a suitable period, whereby the impregnated portions of the loops and the rubber coating on the web 1114 are vulcanized into a common mass. In the form of a machine shown, the platens 942, with all the associated mechanism, rotate with the drum during the period of application for a distance measured circumferentially on the drum somewhat less than the width of a single platen. The platens are released by appropriate valve mechanism later to be described, and the entire vulcanizing mechanism is returned to its original position by rotation on the flanged pulleys 138 under the influence of hydraulic compensating and controlling mechanism to be hereinafter further referred to.

The semi-finished product thus formed, as illustrated in Fig. 43, is drawn from the clothing elements or "wires" by tension applied by the card-cloth-covered roller 1116, (Fig. 1), and is then wound into the roll 1118. The material, which at this point is in a semi-finished state, may be finished, for example, by shearing off the upper curved portions of the loops, followed by a napping operation to remove loose stock and noils, and to straighten fibres which are irregularly disposed in the loops, after which a final shearing may be given. It is to be understood, however, that these finishing steps, referred to, do not constitute a part of the present invention.

In connection with the foregoing general description, it will be understood that the drum 100 is heated by steam introduced through the connection 126 (Figs. 2, 3 and 4), to the hollow shaft 108, and thence through the pipe 130 into the passages 132, 172, 182 and 192 (Fig. 2), and that condensation is withdrawn similarly through the pipe 124 and the pipe connection 128. It will be understood further that the platens 942 are similarly heated by means of steam introduced through flexible hose connections (not shown), that compressed air is continuously supplied to the rubberizing mechanism through the pipe 772 (Figs. 24 and 25), and that a suitable rubber cementing material is similarly supplied through the pipe 764. It is obvious that, so long as a suitable batt is supplied to the inserting mechanism 200, and rubberized fabric is supplied from the roll 1100, the action of the machine is continuous.

Referring in general to Figs. 40, 41 and 42, Fig. 40 illustrates the position of the inserting elements just prior to the formation of a new loop, the presser-feet 380 and 384 pressing the loop sections or pleats on the corresponding "wires," the holding blade 382 occupying the full depth of the loop just formed, while the inserting blade 386 is about to descend for the purpose of forming a new loop. The inserting blade 386 then descends, compressing and drawing the batt between the forward edge of the central presser-foot 384 and the spacing bar 390, the latter relieving the upper portion of the "wire" 151' of the strain of compressing the batt which might otherwise cause an undesirable deflection of the wire. The forward presser-foot 388 then descends, compressing the batt between its lower edge and the spacing bar 390, at which point the various elements occupy the relationship shown in Fig. 41. The holding blade 382 and the inserting blade 386 are then withdrawn simultaneously while the three presser-feet maintain their pressure unchanged, thus serving to prevent any derangement, by the withdrawal of the blades, of the loops already formed. The three presser-feet are then withdrawn from contact with the looped material on the "wires," after which the inserting elements are moved, by means later to be described, into the position required for the formation of the next succeeding loop.

To recapitulate, the following operations are involved in a single cycle of the inserting elements:

Phase A

1. Simultaneous descent of the presser-feet 380 and 384;
2. Descent of the holding blade 382;
3. Descent of the inserting blade 386;
4. Descent of the presser-foot 388;
5. Withdrawal of the blades 382 and 386; and
6. Withdrawal of the presser-feet 380, 384 and 388.

Phase B

7. Movement of elements into position for the formation of a new loop.

During the portion of the cycle represented by the steps under "Phase A" above, the inserting and holding elements, together with the spacing bar 390, have been maintained motionless relative to the "wires" by means later to be described, it being understood that the drum 100 is continuously in motion. On the completion of the "Phase A" steps, the inserting and holding elements, together with the spacing bar 390, are moved by the same means into a position appropriate for the formation of a new loop.

Referring to Fig. 1, all parts of the machine are primarily driven by the shaft 240, which may be operated by means of a belt drive 169, operating on a pulley 174, as illustrated. The gears 238 drive the cam shafts 236 through the medium of the gears 234, which in turn drive the gears 230, which, with the clutch elements in the position shown in Figs. 9 and 10, rotate the main shaft 232 of the inserting mechanism. In the construction shown, the gears 230 are twice the diameter of the gears 234, so that the main shaft 232 of the inserting mechanism makes one revolution for two revolutions of the cam shafts 236. The cams 392 (Fig. 8) are two-lobed, producing two complete cycles of the associated parts for each revolution of the main shaft 232, so that there is a complete cycle of the inserting elements operated by the cams 392 for each revolution of the cam shafts 236.

Referring to Figs. 7, 8 and 44–50, in connection with the description of the construction of the inserting mechanism, it will be noted that the inserting elements divide themselves into two groups: on the one hand the holding blade 382 and the inserting blade 386, which are positively actuated by their appropriate cams, their vertical reciprocating movements corresponding to the amplitude of the cams; on the other hand, the presser-feet 380, 384 and 388, which are spring-relieved, so that their downward motion is arrested when they make contact with the corresponding "wires".

Referring to Figs. 7 and 44–47, the operation of the former group will be entirely clear, in view of the fact that the repiling blade 382, attached to the bar 412, becomes essentially a part of the slide 416 which, being rigidly attached to the cam-slide 404, receives direct motion from the appropriate cams. The operation of the latter group is clear from a consideration of Figs. 7 and 48–50, in which the slide 426, rigidly attached to the cam slides 404, produces upward motion of the presser-foot 380 by means of the engagement of the projecting lugs 422 with the lower edges of the rectangular openings 424 in the slide 426; while the presser-foot 380, on coming in contact with the material on the corresponding "wire", is checked in its downward movement, the slide 426, under the continued action of the cam slides 404 and the associated cams, continuing its downward motion, in view of the rectangular openings 424, the springs contained therein merely increasing the downward pressure of the presser-foot 380.

Referring to Figs. 7 and 11, the cams 320 associated with the cam shafts 236, acting through the cam rollers 354, their associated bushings, and the brackets 330, impart a clockwise motion of rotation to the inserting mechanism casing 291 such that the inserting elements 382, 384, 386 and 388 and the spacing bar 390 are maintaining motionless relative to the "wires" 151 throughout "Phase A" of the inserting cycle.

During "Phase B", that is, that period during which the inserting elements are not engaged with the "wires", the cams 322 impart to the casing 291 counter-clockwise motion of suitable amplitude to bring the inserting elements into position for the formation of a new loop.

It will be understood that the cams 320 on the one hand, and the cams 322 on the other, have contours which are respectively complementary, mutually co-operating to eliminate back-lash or lost motion, with the result that the inserting elements always occupy the exact positions required by the inserting operation. It may be specifically pointed out that, in the preferred form of the machine as illustrated, the contours of the various cams 396, which operate the inserting elements, are such that the steps represented by "Phase A", above referred to, occupy about 75%, and those of "Phase B" about 25%, of the inserting cycle.

Referring again to the main driving shaft 240 (Fig. 10) the worms 242, engaging the worm-wheels 244 on the shafts 246, rotate the worms 254, which in turn engage the worm-wheels 136, 137 thus rotating the drum 100 in a counter-clockwise direction, with reference to Fig. 1. The gear ratios in the gear train 238—234—230 on the one hand, and the worm and wheel train 242—244, 254—136 are preferably so designed that a cycle of the inserting mechanism is completed in the exact period corresponding to the movement of the drum through the space separating the centers of a single pair of "wires".

In case of emergency, such as a deformation of the batt, or the accidental introduction of some foreign material, necessitating the stoppage of the inserting mechanism, either one of the handles 286 (Fig. 10) may be moved to throw the latches 280 into the positions shown by the dotted line, thus disengaging the hubs 260 from the gears 230 and bringing the inserting elements to rest. It may be pointed out in this connection that the hubs 260 are keyed on the shaft 232 in such position, not only that the clutches engage and disengage simultaneously, but also that when they are disengaged, the inserting elements come to rest in their uppermost position.

Furthermore, for the same reason, on re-engaging the clutches, the inserting elements resume their functions in phase with the "wires".

Referring to Figs. 7 and 11, it will be noted that the position of the inserting mechanism casing 291 is fixed by the cam-shafts 236. Should occasion arise to withdraw the inserting and holding blades from the inserting mechanism, either for repairs or to change the depth of insertion, the cam shafts 236 may be withdrawn longitudinally, as, for instance, to the right in Fig. 11, on removing the nut 374, thus leaving the cam assemblies on their respective sleeves 324 undisturbed in the brackets 330. The casing 291 may then be freely revolved in a counter-clockwise direction about the shaft 232 as a center to the extent necessary to permit the bars 412 (Figs. 45 and 46), to which are attached the inserting and holding blades, to be removed longitudinally from the slide 416 and the corresponding slide related to the inserting blade 386, without interference with the gear casings 218 (Fig. 5).

Referring to Figs. 1, 12, 13 and 14, in the construction shown, the sprocket 692 on the main driving shaft 240 is connected by the the roller chain 693 with the sprocket 690 on the shaft 590, to which are keyed the sprockets 694 and 691. The latter are connected by the roller chains 695 with the sprockets 697 and 696 on the shafts 512 and 516. The sprockets 694 and 691 being of the same size, as are also the sprockets 697 and 696, the shafts 512 and 516 are driven at the same speed. The helical gears 520 and 530, as well as 522 and 532, being identical, the chains 544 and 546 are driven at the same speed. The chains 544 and 546, passing around the idler sprockets 548 and 550, by means of their attachment to the fixtures 568 and 570, cause the carriage 508, supported on the rollers 510 (Figs. 12 and 20), to move continuously from one end to the other of the guides 502 and 504. The plane of movement of the carriage 508 transversely of the drum is tangent with the surface of the latter, the subsidiary carriage 509 being capable of limited motion radially of the drum in the body of the carriage 508. This latter motion of the subsidiary carriage permits the rubberizing roller 638 to roll in contact with the material on the "wires" throughout that portion of the transverse "wire" surface covered by the inserted material, and to be removed therefrom during the remaining portions of the excursions of the carriage. This application and withdrawal of the rubberizing roller 638 is effected by the rails 670 (Figs. 12, 13 and 16) in conjunction with the rollers 668, which are mounted on the shaft 622. When the rollers 668 are bearing on the rails 670, the shaft 622 is correspondingly lifted, so that the rubberizing roller 638 is out of contact with the wire surface; on the other hand, when during the excursions of the carriage 508, the rollers 668 are not in contact with the rails 670, the rubberizing roller makes contact with the looped pile material on the wires. The pressure of the rubberizing roller thereon is determined by the adjustment of the spiral springs 580 (Fig. 21), which balance out the weight of the subsidiary carriage 509, the roller 638, and the associated parts to any desired degree, while pressure of the roller 638 may be increased by adjustment of the springs 586. It is obvious that, by longitudinal adjustment of the rails 670 in their corresponding guides 672 and 674, the contact of the rubberizing roller 638 may be adapted to the width of material desired to be manufactured by the machine.

Referring to Figs. 12 and 14, the movement of the carriage 508 in either direction causes the shaft 622, and, with it, the roller 638, to rotate by virtue of the engagement of the sprocket 658 with the chain 660, which, as previously pointed out, acts as a rack. In view of the fact that in the construction shown the pitch diameter of the sprocket 658 is less than the diameter of the roller, the latter makes friction contact or motion with reference to the drum surface, thus improving the impregnation of the looped material on the wires by the cementing material.

Referring to Figs. 12, 13 and 15, the helical gear 598, which is slidably keyed practically throughout the length of the shaft 590, is rotated thereby throughout the travel of the carriage 508. The gear 602, (Figs. 12 and 15) meshing with the gear 598, accordingly rotates the shaft 604 and with it the worm 608, which turns the worm-wheel 610. The shell 612 thus rotates the cylindrical cam 614 embodying the groove 620, which engages the cam-roller 632 on the stud 630 attached to the sleeve 628, the latter, which is prevented from rotating by the keys 636, being thus moved longitudinally of the shaft 622, imparting corresponding motion to the roller 638.

With the construction described, the shaft 590 is driven at such a speed, and the ratio between the worm 608 and the worm-wheel 610 is such, that the cam 614 completes one revolution, thereby moving the roller 638 through one longitudinal cycle on the shaft 622, while the carriage 508 is passing from one end of the guides 502 and 504 to the opposite end.

The foregoing ratio is such also that the motion of translation of the roller 638 longitudinally of the shaft 622 corresponds exactly to the circumferential motion of the "wires" 151, with the result that the roller follows a path strictly parallel to the wires.

When a given relationship between the amplitude of the cam 614, the rate of movement of the carriage 508, and the proportion of the width of the roller to which cementing material is applied by the nozzle 706, the apparatus may be adapted to apply one, two, or more successive coats to the looped material.

Referring in general to Figs. 26, 27 and 28, Fig. 27 represents the schematically developed center line of the groove 620 in the cam 614, while Fig. 26 is a representation of the cam itself. It will be noted that, of the total cycle of the cam, ninety degrees (90°) is occupied by the return motion to the zero position, while the remaining two hundred and seventy degrees (270°) correspond to the maximum period, under the various adjustments, during which the roller 638 may be required to be in contact with the "wires". Owing to the relative steepness of outline of the ninety degree (90°) return-portion of the cam groove, and the weight and frictional resistance of the roller 638 and the associated parts, the spiral spring 644 (Figs. 13 and 14) is provided to assist the cam during this portion of its cycle.

Referring to Figs. 22, 23, 24 and 25, the nozzle 706 supported by the bracket 702, attached to the sleeve 628, accompanies the roller 638 in its excursions, and applies to its surface through the holes in the nozzle plate 740 a series of streams of rubber cement or similar material. Generally speaking, the supply thus described is maintained throughout that portion of the excursion of the roller during which the latter is in contact with the looped material, the openings 739 in the nozzle plate being stopped by the pins 738, acting as valves, until the roller is reapplied. Air pressure supplied through the pipe 728 to the cylinder 716 serves to raise the cylinder body with reference to the nozzle 706, the piston rod 710 and the nozzle body 706 being immovably attached to the brackets 702. The upward motion of the cylinder body, just described, raises the cylinder head 732, the rods 730 attached to the plunger 736, thus opening the holes in the nozzle plate 740. The relief of the air pressure supplied through the pipe 728 allows the spiral spring 718 to lower the cylinder head 732, and, with it, the connecting parts, causing the pins 738 to close the holes in the nozzle plate.

Referring to Figs. 24 and 25, rubber cement or similar material from the supply tank 744 is drawn through the strainer 748 by the pump 752 and delivered by the pipe 758 to the two-way cock 760. At the same time compressed air is supplied through the pipe 768 to the two-way cock 770. The roller chain 776 driven by the sprocket 700 on the shaft 512 carries the lugs 780 which successively engage, at suitable intervals, the arms of the star wheel 762, alike attached to the spindles of the cocks 760 and 770, thereby cutting off and re-establishing the supply of air and rubber cement at the appropriate times. The cocks 760 and 770 are closed simultaneously at such a time interval prior to the arrival of the rubberizing roller at the end of its path across the looped material to be rubberized as corresponds substantially to one half a revolution of the roller 638. Similarly, the cocks are opened at a corresponding time interval in advance of the re-application of the roller.

It is obvious that the chain 776 must be of such length that it completes its circuit in the time occupied by the carriage 508 in making a complete cycle, and that the chain must carry four lugs 780. It is also obvious that, by adjustment of the relative positions of the lugs 780, the functions of the cocks 760 and 770 may be properly related to the width of the material to be rubberized.

Referring to Figs. 1 and 29, the blower 802, the duct 804 and the hood 810 together with the return duct 820 form a closed circuit. Air, supplied by the blower to the duct 804, and suitably heated by the heating elements 806, passes to the plenum chamber 812, (Fig. 29) through the nozzles 814, from which it is delivered in jets upon the rubberized material on the surface of the drum. The air thus emerges at high velocity, so that it penetrates the minute pores of the impregnated surface of the looped material, producing a very efficient drying effect. The air thus delivered, together with the evaporated moisture, is withdrawn from the surface of the drum through the pipes 818 into the suction chamber 816, from which it passes through the duct 820 to the blower 802, and so on in a cycle. To prevent too great a degree of saturation of the air or drying medium with moisture, a portion thereof, may be continuously rejected to the atmosphere through the duct 822, which is connected, as shown in Fig. 1 of the drawings, with the duct 804, in which the drying medium is under pressure, the amount expelled through the duct being suitably controlled by a damper 824 or other suitable means.

Referring to Figs. 1, 2 and 4, it will be seen that the entire vulcanizing mechanism is suspended from the split ring assemblies 140, which are free to turn, by virtue of the anti-friction rollers in their upper halves, on the flanged pulleys 138 extending from the end sections of the drum.

Referring particularly to Fig. 4, water introduced under pressure through the pipes 926 to the hydraulic rams 924 forces their pistons 922 downwardly, thus producing upward motion of the forked hangers 912 through the medium of the forked levers 910, thus raising the yokes 932 and applying the platens 942 to the surface of the drum. The reactions due to the operation of the rams 924 in applying the platens, as just described, bring the ram supports 902 into pressure contact with the corresponding inner surfaces of the end sections 102 and 103 of the drum, the lower halves of the split ring assemblies 140, to which the ram supports are attached, being relatively free to separate from the respective upper halves in view of the spiral relief springs 143 (Fig. 3a), so that the application of the platens produces no increased strain on the shaft 108 other than the slight one occasioned by the further compression of the springs 143 to the extent necessary to permit the ram supports to make the contact above described.

The yokes 932 being interconnected in pairs by the links 956, and the various pairs being in turn connected through the links 962 with the beams 960, the application of the platens 942 to the drum surface causes the whole assembly as a unit, including the beams 960, to rotate with the drum in a counter-clockwise direction with reference to Fig. 1 of the drawings.

In the position of the vulcanizing assembly and associated apparatus shown in Fig. 37, it is assumed that the platens have just been released from contact with the drum; also, that the vulcanizing assembly has swung back into a balancing position; and that the platens are in a position about to be reapplied. Referring also to Figs. 4 and 37, it will be understood that high pressure water from the accumulator 1060 is applied, under the conditions just specified, to both sides of the pistons 922. The effective area of the upper side of the pistons is diminished by the piston-rods, so that, under these conditions, the pistons are forced to the upper ends of the cylinders, thus maintaining the platens in the "off" position.

Referring particularly to Fig. 37, water of ordinary pressure, as from the general water supply, passes through the pilot cock 1024 and the pipe 1044 to the hydraulic cylinder 1048, whose piston 1092 will therefore move forward, reversing the control cock 1066. When thus reversed, the cock 1066 connects the pipe 1082 with the waste pipe 1052, with the result that the pressure on the under side of the pistons 922 in the rams 924 is released, while high-pressure water continues to be supplied to the upper side of the pistons through the pipe 1068 and the header 1072, so that the platens are immediately applied to the drum. The whole vulcanizing mechanism assembly then begins to travel with the drum in a direction which is counter-clockwise with reference to Fig. 1. This movement causes the connecting rods 974 to move the levers 976, rotating the shaft 978, and ultimately bringing the end of the slot 1028 in the connecting rod 1020 in contact with the pin 1026 attached to the operating lever 1022 of the pilot cock 1024. Continued motion of the connecting rod 1020, as just described, eventually brings the pins 1026 and 1034 in line with the center of the pilot cock 1024, whereupon the spiral spring 1040 throws the lever 1022 into a position ninety degrees (90°) removed from that shown, reversing the connections made by the pilot cock with respect to those shown in Fig. 37, the slot in the connecting rod 1020 permitting this reversal to be made almost instantaneously. Water supplied by the pipe 1042 then passes through the pipe 1046 to the corresponding end of the cylinder 1048, returning the piston 1092, and restoring the plug in the control cock 1066, to the positions shown. High-pressure water now acts on the under sides of the pistons 922, releasing the platens, whereupon the entire vulcanizing assembly swings in a clockwise direction with reference to Fig. 1, to the position of equilibrium shown in Fig. 37, preparatory to a fresh application of the platens, which immediately ensues upon a repetition of the cycle just described.

It should be pointed out in connection with Fig. 37, which is partly diagrammatic, that there is shown only a single control cock 1066, whereas in the preferred construction of the machine, there are two such control cocks, as shown in Fig. 36, each of them being connected by pipes 1082 with headers 1078, and with supply pipes 1064, on opposite sides of the machine.

When the platens have been applied to the surface of the drum, the vulcanization assembly is carried progressively out of a condition of equilibrium, thus imposing a constantly increasing load and undesirable friction on the main driving worms 254. With the object of substantially eliminating this increase in load, the apparatus shown in Figs. 34 and 35 is, in part, provided.

The struts 984 interconnecting the shaft 978 with the pin 986, on which is pivoted the forked lever 1014, absorb the thrust of the hydraulic cylinder 1012, acting on the lever 994. The pin 1008, on which is pivoted the lever 994 and the block 1006 attached to the piston rod 1010, passes through the slotted holes 1018 in the forked lever 1014, so that the hydraulic cylinder 1012 in effect forms one part of a toggle-joint, of which the lever 994 forms the other. The departure of the vulcanizing assembly from the condition of equilibrium illustrated in Fig. 37 immediately commences to deflect the toggle-joint just described through the medium of the connecting rods 974 and the levers 976, which rotate the shaft 978 to which the lever 994 is attached. High-pressure water is constantly supplied through the pipe 1016 to the hydraulic cylinder 1012, tending to drive the piston of the latter upward with a constant force. It is obvious that, as soon as the toggle-joint, comprising the lever 994 and hydraulic cylinder 1012, is deflected from the alignment shown in Fig. 35 by the movement of the vulcanizing assembly, the upward pressure on the pin 1008 by the hydraulic cylinder 1012 tends to rotate the shaft 978 in a counter-clockwise direction, thus exerting, through the levers 976 and connecting rods 974, a thrust on the vulcanizing assembly in the direction in which it is being carried by the drum. In the form of machine illustrated in the drawings, the cylinder area and leverages are so adjusted that this thrust increases on a sine curve, corresponding closely, within the limits of action required, with a sine curve representing the increased load on the worms 254, caused by the displacement of the vulcanizing assembly, from the balanced condition.

It will be understood that the considerable load represented by the vulcanizing assembly suspended on the split-ring assemblies 140, in spite of the provision of the relief friction rollers 144, imposes a considerable braking effect on the rotating drum while the platens are disengaged. This braking effect, in a machine having a drum twelve feet in diameter, for example, is of the order of 4000 pounds, measured tangentially on the surface of the drum constituting an undesirable, intermittent load on the driving worms. When the platens are applied, however, the braking effect disappears, and this alternate application and elimination of a load on the worms 254 of even this magnitude is undesirable. Accordingly, the hydraulic cylinder 1002 (Fig. 35) is provided, its piston-rod 1000 being connected by the pin 996 with the lever 994. Water supplied constantly through the pipe 1004 acts on the piston 1001, thereby producing a turning effort on the lever 994 tending to rotate the shaft 978 in a clockwise direction, and, through the levers 976 (Fig. 34) and the connecting rods 974, exerting a retarding force on the vulcanizing assembly, when applied to the drum, in a direction opposite to that in which it is being carried. The counter-rational force thus applied to the drum by the vulcanizing assembly corresponds substantially to the loss of braking effect on the pulleys 138 (Figs. 1 and 2) occasioned by the attachment of the vulcanizing assembly through the platens. When, after the vulcanizing assembly has reached its extreme limit of movement, the platens are released, the frictional braking effect of the split-ring assemblies 140 is simultaneously restored, while, as is obvious, the hydraulic cylinder 1002 can now have no effect on the drum, having no medium of connection therewith, and merely assists in returning the vulcanizing mechanism to a balanced position preparatory to the re-application of the platens.

It will be understood in connection with the above description, and the drawings annexed hereto, that the invention has been disclosed in the preferred embodiment, and that various changes might be made in the construction of parts as will be apparent to those skilled in the art without departing from the spirit or scope of the invention; and we desire, therefore, not to be limited to the exact construction shown, except as defined in the following claims.

Having thus described our invention, what we desire to claim is:

1. In a machine of the kind described, a cylindrical drum, a series of "wires" mounted on the surface of said drum parallel with the axis thereof, said "wires" being arranged in groups of units containing a small number of "wires," and means for fastening the said units to the drum surface comprising slots and holding means co-operating with said slots for removably connecting the said units to the drum.

2. In a machine of the kind described, a cylindrical drum, a series of "wires" mounted on the surface of said drum parallel with the axis thereof, said "wires" being arranged in groups of units containing a small number of "wires," and means for fastening the said units to the drum surface comprising slots extending into the bases of the units, and male elements cooperating with said slots for removably connecting the said units to the drum.

3. In a machine of the kind described, a cylindrical drum, a series of "wires" mounted on the surface of said drum and arranged in groups of units containing a small number of "wires," means for fastening said units to the drum surface comprising a series of recesses extending into the said units parallel with said "wires," means adapted to accurately align the said units parallel with the axis of the drum, a series of circumferential slots in said drum, a series of corresponding slots in the said units, a series of male elements engaging the said slots in the said drum and said units, and means for firmly securing the said male elements to interlock and rigidly fasten the said units to the surface of the drum.

4. In a machine of the kind described, a cylindrical drum, a series of "wires" mounted on the surface of said drum and arranged in groups of units containing a small number of "wires," means for fastening said units to the drum surface comprising a series of recesses extending into the said units parallel with said "wires," means adapted to accurately align the said units parallel with the axis of the drum, a series of circumferential slots in said drum, a series of corresponding slots in the said units, a series of male elements engaging the said slots in the said drum and said units, and means for firmly securing the said male elements to the surface of the drum, thereby interlocking and rigidly fastening the said units to the surface of the drum.

5. In a machine of the kind described, a cylindrical drum, a series of "wires" mounted on the surface of said drum parallel with the axis of said drum, said "wires" being arranged in groups of units containing a small number of "wires," means for fastening said units to the drum surface comprising a series of recesses extending into the lower edges of each of said units and extending parallel with the said "wires," keys adapted to register with said recesses, serving to accurately align the said units parallel with the axis of the drum, a series of circumferential slots in said drum, a series of corresponding slots in the said units, a series of T-bars engaging the said slots in said drum and said units, and means for firmly securing the said T-bars to the surface of the drum to interlock with and rigidly fasten the said units to the surface of the drum.

6. In a machine of the kind described, a cylindrical drum having a plurality of sections, means rigidly uniting the said sections, means for rotatably supporting said drum upon a shaft, a circumferential passageway in each of said sections adjacent the surface of said drum for the passage of a heating medium through said sections, a passageway in said shaft communicating with each of said circumferential passageways for the introduction of a heating medium thereto, a second passageway in said shaft communicating with the said circumferential passageways for the withdrawal of said heating medium therefrom, a series of "wires" mounted on the surface of said drum in heat-transferring relationship with said circumferential passageways, means for uniformly rotating the said drum, an inserting mechanism adapted for inserting pile element material between the said "wires," and means for automatically adjusting the position of the said inserting mechanism to compensate for changes in temperature of the said drum.

7. In a machine of the kind described, a cylindrical drum having a plurality of sections, means for rigidly uniting the said sections, means for rotatively supporting said drum upon a shaft, a circumferential passageway in each of said sections adjacent the surface of said drum for the passage of a heating medium through said sections, a passageway in said shaft communicating with each of said circumferential passageways for the introduction of a heating medium thereto, a second passageway in said shaft communicating with the said circumferential passageways for the withdrawal of said heating medium therefrom, a series of "wires" mounted on the surface of said drum in heat-transferring relationship therewith, means for uniformly rotating the said drum, an inserting mechanism having inserting elements adapted for inserting a pile element material between the said "wires", said mechanism being pivotally mounted so as to be moved about a fixed center of rotation located at a substantial distance from the portions of the inserting elements which engage the "wires," and yieldable means for automatically adjusting the position of the said inserting mechanism to compensate for changes in temperature of the said drum.

8. In a machine of the kind described, a cylindrical drum consisting of a plurality of sections, means rigidly uniting the said sections, means for rotatably supporting said drum upon a shaft, a circumferential passageway in each of said sections adjacent the surface of said drum for the passage of a heating medium through said sections, a passageway in said shaft communicating with each of said circumferential passageways for the introduction of a heating medium thereto, a second passageway in said shaft communicating with the said circumferential passageways for the withdrawal of said heating medium therefrom, a series of "wires" mounted on the surface of said drum in heat-transferring relationship therewith, said "wires" being arranged in groups of units containing a small number of "wires", means for fastening the said units to the drum surface to prevent distortion with changes in temperature comprising slots and male elements cooperating with said slots for removably connecting the said units to the drums, means for uniformly rotating the said drum, an inserting mechanism adapted for inserting a pile element material between the said "wires", and means for automatically adjusting the position of the said inserting mechanism to compensate for changes in temperature of the said drum.

9. In a machine of the kind described, a cylindrical drum, a series of "wires" mounted on the surface of said drum, means for inserting a pile element material between the said "wires" to form a series of folds or pleats therein, means for applying a vulcanizable cement material to the exposed base portions of the folds or pleats, means for vulcanizing the said cement material to permanently attach a backing to the coated portion of the said folds or pleats which comprises a large pulley on each side of the drum, carrying means mounted on the said pulleys to carry the weight of the vulcanizing elements when out of contact with the surface of the drum, and means operative independently of the said carrying means for applying the vulcanizing elements to the drum surface.

10. In a machine of the kind described, a cylindrical drum, a series of "wires" mounted on the surface of said drum, means for inserting a pile element material between the said "wires" to form a series of folds or pleats therein, means for applying a vulcanizable cement material to the exposed base portions of the folds or pleats, means for vulcanizing the said cement material to permanently attach a backing to the coated portion of the said folds or pleats which comprises supporting means on each side of the drum to carry the weight of the vulcanizing elements, means operative independently of the said supporting means for applying the vulcanizing elements to the drum surface, and for uniformly distributing the stresses and strains on the immediate portion of the drum to which the vulcanizing elements are directly applied.

11. In a machine of the kind described, a cylindrical drum consisting of a plurality of sections, means rigidly uniting the said sections, means for supporting the drum upon a shaft, a circumferential passageway in each of said sections adjacent the surface of said drum for the passage of a heating medium through said sections, a passageway in said shaft communicating with each of the circumferential passageways for the introduction of a heating medium to the said circumferential passageways, a second passageway in said shaft communicating with the said circumferential passageways for the withdrawal of said heating medium, a series of "wires" mounted on the surface of said drum in heat-transferring relationship therewith, means for inserting a pile element material between the said "wires", means for applying a vulcanizable cement material to the inserted pile element material, means for vulcanizing the cement material comprising a pulley carried on each side of the drum, rings mounted on the said pulleys carrying vulcanizing elements supported in such a manner that the weight of the said vulcanizing elements is carried thereby, and means independent of the said carrying means for applying the said vulcanizing elements to the drum surface.

12. In a machine of the kind described, a cylindrical drum, a series of "wires" mounted on the surface of said drum parallel with the axis thereof, said "wires" being arranged in groups of units containing a small number of "wires", means for fastening the said units to the drum surface by means of slots and corresponding male elements, means for uniformly rotating the said drum, an inserting mechanism, and means for operating the said inserting mechanism in synchronism with the said drum to maintain registration of the parts of the inserting mechanism with the said "wires".

13. In a machine of the kind described, a cylindrical drum, a series of "wires" arranged in groups on said drum, means for fastening the said groups on the drum so as to maintain the "wires" in alignment irrespective of changes of temperature of the drum, an inserting mechanism having an inserting blade, a holding blade and presser-feet associated therewith as a unit for inserting a pile element material between the said "wires", a worm-wheel mounted on the said drum, and a driving worm mounted substantially in a plane with the said inserting mechanism on the said worm-wheel so as to maintain the "wires" at the inserting mechanism in registry with the inserting mechanism elements irrespective of expansion or contraction of portions of the drum due to changes in temperature.

14. In a machine of the kind described, a cylindrical drum, a series of "wires" arranged on the surface of the said drum parallel to the axis thereof, an inserting mechanism, means for mounting said mechanism to move as a unit about a pivot substantially independently of the said drum to automatically compensate for changes in temperature of the said drum, and means to limit outward movement of the inserting mechanism away from the said drum.

15. In a machine of the kind described, a cylindrical drum, a series of "wires" arranged on the surface of the said drum parallel to the axis thereof, an inserting mechanism comprising an inserting blade for inserting loops or pleats in a pile element between said "wires" and a holding blade and parts for holding the pile element material during the formation of each of said loops or pleats, means for mounting said mechanism to move as a unit about a pivot to automatically compensate for changes in temperature of the said drum, and means to limit outward movement of the inserting mechanism away from the said drum.

16. In a machine of the kind described, a cylindrical drum, a series of "wires" arranged on the surface of said drum parallel with the axis thereof, an inserting mechanism having elements for inserting a pile element material between the said "wires", means for mounting the said inserting mechanism independently of the drum so as to permit movement thereof with expansion or contraction of the drum surface and adjustable driving means for the drum mounted substantially in a plane with the said inserting mechanism to maintain the "wires" in registry with the inserting mechanism irrespective of expansion or contraction of the drum.

17. In a machine of the kind described, a cylindrical drum, a series of "wires" arranged in groups on said drum and parallel with the axis of the said drum, means for fastening the said groups on the drum so as to maintain the "wires" in alignment, an inserting mechanism having elements for inserting a pile element material between the said "wires", means for mounting the said inserting mechanism independently of the drum to permit movement thereof with expansion or contraction of the drum surface, and means for driving the said drum mounted substantially in a plane with the operating elements of said inserting mechanism so as to maintain the "wires" in registry with the inserting mechanism irrespective of expansion or contraction of the drum or parts thereof.

18. In a machine of the kind described, a cylindrical drum, a series of "wires" arranged in groups on said drum, means for fastening the said groups on the drum so as to maintain the "wires" in alignment irrespective of expansion or contraction of the drum, an inserting mechanism having an inserting blade, a holding blade and presser-feet associated therewith as a unit for inserting a pile element material between the said "wires", a worm-wheel mounted on the said drum, a driving worm mounted adjacent the said inserting mechanism on the said worm-wheel so as to maintain the said "wires" in registry with the inserting mechanism elements irrespective of expansion or contraction of the drum, and means for automatically adjusting the position of said worm with respect to said worm-wheel to compensate for expansion or contraction of the said drum.

19. In a machine of the kind described, a cylindrical drum, a series of "wires" mounted on the surface of said drum parallel with the axis thereof, said "wires" being arranged in groups of units containing a small number of "wires", means for rigidly fastening the said units to the drum surface by means of slots and corresponding male elements, to hold said wires in place irrespective of changes in temperature. means for uniformly rotating the said drum, an inserting mechanism, means for mounting the said mechanism independently of said drum, so as to move as a unit about a pivot on one side of the plane of its inserting elements, and means for operating the said inserting mechanism in synchronism with the said drum to maintain proper registration of the parts of the inserting mechanism with the said "wires".

20. In a machine of the kind described, a rotatable cylindrical drum, a series of "wires" on the surface of the said drum, an inserting mechanism mounted to operate on the said drum, levers for mounting the said inserting mechanism about a pivot supported independently of said drum, a roller adjustably mounted in position on the said inserting mechanism and adapted to ride on an inner surface of said drum to limit the outward movement of the said inserting mechanism, driving means for said drum including a worm-wheel connected concentrically with said drum and a driving worm associated therewith mounted adjacent the said inserting mechanism, and means including spring members to raise the inserting mechanism assembly when the said drum expands under the influence of heat, thereby maintaining correct meshing of the driving means for said drum.

21. In a machine of the kind described, a cylindrical drum of large mass consisting of a plurality of sections, means rigidly uniting the said sections, means for supporting the drum upon a shaft, a circumferential passageway in each of said sections adjacent the surface of said drum for the passage of a heating medium through said sections, a passageway in said shaft communicating with each of the circumferential passageways for the introduction of a heating medium thereto, a second passageway in said shaft communicating with said circumferential passageways for the withdrawal of said heating medium therefrom, a series of "wires" mounted on the surface of said drum in heat-transferring relationship with the said circumferential passageways, means for inserting pile element material between the said "wires", and means for uniformly rotating the said drum.

22. In a machine of the kind described, a cylindrical drum, a series of "wires" arranged on the surface of said drum parallel to the axis thereof, an inserting mechanism comprising an inserting blade and a holding blade, means for rotating said drum, means operated interdependently with the last named means for moving said blades at predetermined intervals into and out of the spaces between said "wires", and means operated interdependently with said drum-rotating means for positively moving the said blades along with the said "wires" during the time that the blades are held between said "wires".

23. In a machine of the kind described, a cylindrical drum, a series of "wires" arranged on the surface of said drum parallel to the axis thereof, an inserting mechanism comprising a shaft-holding means, means for supporting said shaft-holding means so as to maintain a substantially constant distance of the said shaft from the said "wires", a driving means contained within said shaft-holding means for rotating said drum, a casing supported on said shaft and mounted for limited movement within said shaft-holding means, an inserting blade and a holding blade reciprocally mounted within said casing, cam means mounted on said shaft for reciprocally operating said inserting blade and said holding blade, and means operatively connected to said driving means for oscillating said casing and said blades with respect to said "wires" to permit movement of said blades with said "wires" while the blades are engaged between said "wires".

24. In a machine of the kind described, a cylindrical drum, a series of "wires" arranged on the surface of said drum parallel to the axis thereof, an inserting mechanism comprising a casing, means for pivotally mounting the said casing on a shaft, an inserting blade mounted so as to reciprocate within said casing, means mounted on said shaft for reciprocating the said blade for the insertion of a pile element material between said "wires", means for rotating the said drum, and interdependent operating means associated with the last named means for moving said casing along said "wires" while the said inserting blade is inserted between said "wires" and for returning the said casing and said blade to its initial position when the said inserting blade is removed from between said "wires".

25. In a machine of the kind described, a cylindrical drum, a series of "wires" arranged on the surface of said drum, parallel to the axis thereof, an inserting mechanism comprising a shaft-holding means, means for supporting said shaft-holding means to maintain a substantially constant distance of the said shaft from the said "wires", a driving means for rotating said drum contained within said shaft-holding means, a casing supported on said shaft and mounted for limited movement within said holding means, an inserting blade and a holding blade reciprocally mounted within said casing, cam means mounted on said shaft for reciprocally operating said inserting blade and said holding blade, means operatively connected to said driving means for oscillating said casing and said blades in relation to said "wires" to positively move said blades with said "wires" while the blades are engaged between said "wires", and clutch means operative only when the said inserting blade and holding blade are disengaged from said "wires" serving to disengage the driving means for said shaft.

26. In a machine of the kind described, a cylindrical drum, a series of "wires" arranged on the surface of said drum parallel to the axis thereof, an inserting mechanism comprising a shaft-holding means, a shaft mounted therein, means for supporting said shaft-holding means to maintain a substantially constant distance of the said shaft from the said "wires", a driving means for rotating said drum contained within said shaft-holding means, a casing supported on said shaft and mounted for limited movement within said holding means, an inserting blade and a holding blade reciprocally mounted within said casing, means for supporting the said shaft so as to be moved in a substantially radial direction with respect to said drum to compensate for expansion and contraction of said drum with changes of temperature, and means operatively connected with said driving means for oscillating said casing to permit the contacting portions of said blades to move linearly with said "wires" while the blades remain inserted between the said "wires".

27. In a machine of the kind described, a cylindrical drum, a series of "wires" arranged on the surface of said drum parallel to the axis thereof, an inserting mechanism comprising an inserting blade, a holding blade and presser-feet mounted as a unit on a pivot permitting limited movement to compensate for expansion and contraction of said drum, a roller mounted with respect to said inserting mechanism to move along an inner rim of said drum to limit the outward movement of said inserting mechanism away from the said drum, means for adjusting the position of the said roller to regulate the distance of said blades from the said "wires" in one position thereof, means for positively moving the said inserting and holding blades while in engagement with said "wires", and means for positively returning said blades to the initial position after the withdrawal thereof from said "wires".

28. In a machine of the kind described, a cylindrical drum, a series of "wires" arranged on the surface of said drum parallel to the axis thereof, a worm-wheel mounted concentrically on said drum, an inserting mechanism comprising an inserting blade and a holding blade mounted upon a shaft movably held, with respect to said drum, on a pivot to maintain a constant distance of said shaft from the said "wires", resilient means mounted independently of said shaft for supporting said shaft with limited movement, a worm mounted in substantially the plane of the said inserting mechanism to engage said worm-wheel to drive said drum, means for oscillating the said blades about said shaft, said means being interdependently driven with said worm to maintain registration of said blades with said "wires" during engagement therewith, and means for rotating said shaft interdependently with said driving worm for reciprocating said blades at the desired predetermined intervals.

29. In a machine of the kind described, an inserting mechanism comprising a casing supported on a shaft adapted to be moved to compensate for expansion and contraction of a rotatable cylindrical drum, an inserting blade and a holding blade reciprocally mounted on said shaft for inserting a pile element material between "wires" mounted on said drum, and guide means connected to said casing for relieving strain from the forward "wire" while the pile element material is being inserted.

30. In a machine of the kind described, an inserting mechanism comprising a casing supported on a shaft so as to be moved to compensate for expansion and contraction of a rotatable cylindrical drum, an inserting blade and a holding blade reciprocally mounted on said shaft for inserting a pile element material between "wires" mounted on said drum, means for controllably oscillating the said casing and said blades to permit registration of said blades with said "wires" during engagement therewith, and guide means associated with said inserting mechanism to guide pile element material onto the "wires" into position to be inserted by the said blades between said "wires", said guide means being mounted with respect to said "wires" so as to relieve the "wires" of strain during the inserting operation.

31. In a machine of the kind described, a cylindrical drum, "wires" mounted on the surface of said drum, means for driving said drum from a main drive shaft, an inserting mechanism having an inserting element for inserting pile element material between said "wires", means operatively connected with said main drive shaft for intermittently operating the said inserting element and means for moving the said element so that when engaged with said "wires" the said element will be positively moved therewith.

32. In a machine of the kind described, an inserting mechanism comprising a shaft, means for supporting said shaft, a casing mounted on said shaft so as to permit oscillating movement of said casing on said shaft, an inserting blade mounted within said casing, means for mounting the said inserting blade on said shaft so as to be positively reciprocated, a holding blade mounted within said casing, means for mounting the said holding blade so as to be positively reciprocated with rotary movement of said shaft, a resiliently mounted presser-foot mounted within said casing between said inserting and holding blades, presser-feet resiliently mounted within said casing on the other side of said inserting blade and said holding blade, and positive means for moving the said presser-feet into engaging position at predetermined intervals, substantially as described.

33. In a machine of the kind described, a cylindrical drum, a series of "wires" mounted on the surface of said drum parallel with the axis thereof, an inserting mechanism mounted in operative position with relation to said drum to insert a pile element material between said "wires", a cement-applying means operatively mounted upon said drum so as to move in a path longitudinally along the said "wires", thus describing, during the rotation of the drum, a helical path in space, and means for limiting the application of the cement material to a predetermined width on the surface of said drum.

34. In a machine of the kind described, a cylindrical drum, a series of "wires" mounted on the surface of said drum parallel with the axis thereof, an inserting mechanism operatively mounted with respect to said drum to insert a pile element material between the said "wires", means for driving the said drum, a cement-applying roller operatively mounted with respect to said drum so as to move in a path longitudinally along the said "wires" during the rotation of said drum, means for limiting the contacting path of movement of the cement-applying roller to the width of pile element material to be coated, and means for driving the said roller so as to frictionally engage with the said pile element material.

35. In a machine of the kind described, a cylindrical drum, a series of "wires" mounted on the surface of said drum parallel with the axis thereof, an inserting mechanism mounted independently of said drum and operative to insert a pile element material between said "wires", a cement-applying mechanism mounted with said inserting mechanism independently of said drum, means for interdependently driving the said drum, the said inserting mechanism and the said cement-applying mechanism to obtain the desired correlated movements between them, and means for limiting the movement of the said cement-applying means along a predetermined path on the said drum so as to supply cement material only along a predetermined width of material.

36. In a machine of the kind described, a cylindrical drum, a series of "wires" mounted on the surface of said drum parallel with the axis thereof, an inserting mechanism for inserting pile element material between said "wires", means for rotating the said drum and for interdependently operating the said inserting mechanism, a cement-applying roller operatively mounted upon the said drum so as to move in a path longitudinally along said "wires" during the rotation of the drum, means for causing contact of the said cement-applying roller for a predetermined distance on the surface of said drum corresponding to a predetermined width of pile element material to be treated, and means for supplying and cutting off the supply of cement material to the said roller at predetermined portions of its path of movement to cause said roller to apply cement material only at the desired predetermined points.

37. In a machine of the kind described, a cylindrical drum, a series of "wires" mounted on the surface of said drum parallel with the axis thereof, an inserting mechanism mounted in a substantially fixed position with respect to said drum, means permitting movement of the said inserting mechanism in a radial direction with respect to said drum to maintain the inserting elements thereof in operative position with respect to said "wires" irrespective of changes in temperature of the said drum, means for driving the said drum mounted adjacent the said inserting mechanism to maintain registration of the "wires" with the operative parts of the inserting mechanism, a cement-applying roller operatively mounted upon the said drum so as to move in a path during the rotation of the drum longitudinally along the said "wires", thus describing a helical path during movement of the said drum, means for causing contact of the cement-applying roller a predetermined distance on the surface of said drum corresponding to the width of pile element material to be covered with cement material, means for driving the roller so as to frictionally engage with the surface to be coated, and means for supplying and cutting off the supply of cement material to the said roller at predetermined portions of its path of movement so that the said roller will apply cement material only at desired predetermined points, and means for coordinating the movements of said roller with the said inserting mechanism.

38. In a machine of the kind described, a cylindrical drum, a series of "wires" arranged on the surface of said drum parallel to the axis thereof, means for inserting a pile element material between said "wires", means for applying a cement material to the inserted pile element material comprising a cement-applying element, means for moving the said cement-applying element across the drum surface, and means associated therewith for causing transverse movement of the said element, whereby the said element may be caused to move strictly longitudinally of the "wires", describing in space a resultant helical movement.

39. In a machine of the kind described a cylindrical drum, a series of "wires" arranged on the surface of said drum parallel to the axis thereof, means for inserting a pile element material between said "wires", means for applying a cement material to the inserted pile element material comprising a cement-applying element, holding means for supporting the said element, means for guiding the said holding means across the drum surface parallel to the axis thereof, and means associated with said element for controllably moving the said element transversely with respect to said holding means, so as to cause movement of the said element strictly longitudinally of the "wires" irrespective of the continuous movement of the said drum.

40. In a machine of the kind described, a cylindrical drum, a series of "wires" arranged on the surface of said drum parallel to the axis thereof, means for inserting a pile element material between said "wires", means for applying a cement material to the inserted pile element material, comprising a roller, means for mounting the said roller in an inner carriage adapted to support said roller, means for guiding the said inner carriage across the drum surface parallel to the axis of the said drum, means associated with said roller for controllably moving the roller transversely of the inner carriage, and means for relating the movement of said guiding means and said transverse moving means to cause said roller to longitudinally follow the said "wires" irrespective of the continuous rotary movement of the said drum.

41. In a machine of the kind described, a cylindrical drum, a series of "wires" arranged on the surface of said drum parallel to the axis thereof, means for inserting a pile element material between said "wires", means for applying a cement material to the exposed surface of the pile element material, comprising a cement-applying roller, an inner carriage for supporting the said roller, a main carriage, means for mounting the said inner carriage within said main carriage, means for guiding said main carriage across the drum surface parallel to the axis of the drum, means for moving the said roller within said inner carriage transversely thereof, means for regulating the said transverse movement to correspond to the simultaneous linear movement of the drum surface during the passage of the roller in contact with the pile element material, whereby the cement material is applied strictly longitudinally of the "wires" irrespective of the rotary movement of said drum.

42. In a machine of the kind described, a cylindrical drum, a series of "wires" arranged on the surface of said drum parallel to the axis thereof, means for inserting a pile element material between said "wires", means for applying a cement material to the inserted pile element material comprising a cement-applying roller, an inner carriage for supporting the said roller, a main carriage, means for mounting the said inner carriage within said main carriage, means for guiding said main carriage across the drum surface parallel to the axis thereof, means for moving the said roller within said inner carriage transversely thereof, means for rotating said roller to attain frictional engagement with said pile element material, and means for raising the said inner carriage at predetermined portions of its movement across the drum surface, whereby the cement material is applied only along a width corresponding to the width of the pile element material to be coated.

43. In a machine of the kind described, a cylindrical drum, a series of "wires" arranged on the surface of said drum parallel to the axis thereof, driving means for rotating the said drum, means for inserting a pile element material between said "wires", means for applying a cement material to the inserted pile element material, comprising a cement-applying roller, an inner carriage for supporting the said roller, a main carriage, means for mounting said inner carriage and roller within said main carriage, means for reciprocally moving the said main carriage across the drum surface parallel to the axis thereof, means for moving the said roller within said inner carriage transversely thereof interdependently with the said driving means so as to cause said roller to apply cement material strictly longitudinally of the "wires" irrespective of the continuous rotary movement of the drum, means for raising said inner carriage within said main carriage at a predetermined point so as to apply cement material only along the width corresponding to the width of the pile element material to be coated, means for regulating the raising means for said inner carriage to cause raising movement of the roller at the desired point in its path of movement, and means for over-driving the said roller to cause frictional engagement thereof with the material to be coated.

44. In a machine of the kind described having means for applying a cement material to a pile element material inserted into the spaces between spacing elements on a drum, the sub-combination which comprises a cement distributing roller, a nozzle for applying a cement material to said roller, a valve for controlling the passage of said material through said nozzle, and means for controlling the operation of said valve, at predetermined parts of the path of movement of said roller across the said drum, to supply cement material to the said roller at predetermined portions of its path of movement so as to apply cement material only to the desired width of the inserted pile element material.

45. In a machine of the kind described, a cylindrical drum, a series of "wires" arranged on the surface of the said drum, driving means for rotating the said drum, an inserting mechanism for inserting a pile element material between the said "wires", means for applying a vulcanizable cement material to portions of the inserted pile element material, means for vulcanizing the said rubber cement material comprising heated surfaces adapted to be flexibly applied to the material to be vulcanized, and means for alternately applying and withdrawing the said heated surfaces without substantially changing the load imposed on the said driving means.

46. In a machine of the kind described, a vulcanizing means comprising a series of flexibly mounted platens, means for heating the said platens, means for automatically applying the said platens to a portion of the drum surface containing material to be vulcanized, and means for uniformly distributing the stresses and strains during application of the said platens over the adjacent drum surface.

47. In a machine of the kind described, a cylindrical drum, "wires" mounted on the surface of said drum, driving means for rotating the said drum, a vulcanizing assembly operatively associated with said drum, means for applying the vulcanizing assembly to the drum surface during the rotation of the drum, whereby the vulcanizing assembly is carried progressively forward by said drum, imposing a constantly changing load on the said driving means, and means operatively associated with said vulcanizing assembly for counteracting the changing load on the drum to eliminate changes in load on the said driving means.

48. In a machine of the kind described, a cylindrical drum, "wires" mounted on the surface of the said drum, driving means for constantly rotating the said drum, a vulcanizing means of large mass, means for mounting said vulcanizing means on the said drum to carry the load thereof, means independent of the said mounting means for applying the vulcanizing elements to the surface of the drum, means for proportionately compensating for the additional increasing load imposed on the said driving means when the said vulcanizing elements are applied to the drum surface, and means for imposing a constant load on said driving means to compensate for the reduced frictional load when the said vulcanizing elements are applied to the drum surface.

49. In a machine of the kind described, a cylindrical drum, a series of "wires" mounted on the surface of said drum, driving means for uniformly rotating the said drum, means for inserting a pile element material between said "wires" to form a series of folds or pleats therein, means for applying a vulcanizable cement material to the exposed surface of said folds or pleats, means for vulcanizing the said cement material to permanently attach a backing to the coated portion of the said folds or pleats which comprises vulcanizing elements mounted on pulleys carried by said drum, carrying means mounted on said pulleys to carry the weight of the vulcanizing elements, means independent of the said carrying means for applying the vulcanizing elements to the drum surface, and means for imposing a constant load on said driving means to compensate for the reduced frictional load when the said vulcanizing elements are applied to the drum surface.

50. In a machine of the kind described, a cylindrical drum, a series of "wires" mounted on the surface of said drum parallel to the axis thereof, driving means for rotating the said drum, an inserting mechanism operatively mounted to insert a pile element material between said "wires" to form a series of folds or pleats therein, means for applying a vulcanizable cement material to portions of said folds or pleats in uniformly controlled amounts, means for passing a heated drying medium into contact with the coated portions of said folds or pleats to locally heat and draw off volatile material from the said vulcanizable cement material, means for passing a flexible backing material into contact with the dried coated portions of the said loops or pleats, means for vulcanizing the said cement material to permanently attach the said backing to the folds or pleats which comprises means for carrying the load of the vulcanizing means on a portion of the drum, means independent of the last-named means for applying the vulcanizing means to the drum surface, and means for imposing a constant load on the said driving means to compensate for the reduced frictional load when the said vulcanizing elements are applied to the drum surface.

51. In a machine of the kind described, a cylindrical drum having a series of spacing elements thereon, an inserting mechanism having inserting elements for inserting pile element material between said spacing elements, and means for rotating the drum mounted substantially in a plane passing through the axis of the drum and said inserting elements of said inserting mechanism, thereby eliminating deviations due to temperature changes in the drum and assuring registration of the inserting elements of said inserting mechanism.

52. In a machine of the kind described, a cylindrical drum having a series of spacing elements thereon, an inserting mechanism having inserting elements for inserting pile element material between said spacing elements, means for rotating the drum mounted adjacent the peripheral portion of the drum and substantially in a plane including the axis of the drum and said inserting elements, thereby eliminating deviations due to temperature changes in the drum and assuring registration of the inserting elements of said inserting mechanism.

53. In a machine of the kind described, a cylindrical drum having a series of spacing elements thereon, an inserting mechanism having inserting elements for inserting pile element material between said spacing elements, means for operating the said inserting mechanism in synchronized relation with the rotation of said drum, and means for adjustably controlling the position of the inserting mechanism radially of the drum to eliminate deviations in the position of the inserting elements relative to said spacing elements, with temperature changes of said drum.

54. In a machine of the kind described, a cylindrical drum having a series of spacing elements thereon, an inserting mechanism having inserting elements for inserting pile element material between said spacing elements, means for operating the said inserting mechanism in synchronized relation with the rotation of said drum, and means for pivotally mounting the inserting mechanism on a stationary center of rotation so that the said inserting elements, moving with the drum during the period in which they are engaged with said spacing elements, are angularly displaced to a negligible degree.

55. In a machine of the kind described, a cylindrical drum having a series of spacing elements thereon, an inserting mechanism having inserting elements for inserting pile element material between said spacing elements, means for rotating the drum, means for operating the said inserting mechanism in synchronized relation with the rotation of said drum, means for mounting the inserting mechanism and the said means for rotating the drum so that the inserting elements and the drive portion of the said means for rotating the drum operate in the same plane, including the axis of the drum, thereby insuring the registration of the inserting elements with the spaces between said spacing elements irrespective of temperature changes or other factors tending to cause deviation.

56. In a machine of the kind described, a cylindrical drum having a series of spacing elements thereon, an inserting mechanism having inserting elements for inserting pile element material between said spacing elements, means for rotating the drum, mounted substantially in a plane including the said inserting elements and the axis of said drum, means for operating the said inserting mechanism in synchronized relation with the rotation of said drum, and means for pivotally mounting the inserting mechanism on a stationary center of rotation to permit the inserting elements to operate in substantially the said plane, thereby insuring the registration of the inserting elements with the spaces between said spacing elements.

57. In a machine of the kind described, a cylindrical drum having a series of spacing elements thereon, an inserting mechanism having inserting elements for inserting pile element material between said spacing elements, means for pivotally supporting the said inserting mechanism to one side of a plane through the said inserting elements and the axis of the drum, to permit limited pivotal movement of the said inserting elements with expansion or contraction of said drum, a driving element for the drum mounted adjacent the drum surface in the said plane including the said inserting elements and the axis of the drum, and means for synchronizing the movement of the inserting elements of said inserting mechanism with said driving means to insure continued registration of the inserting elements with the spaces between said spacing elements during the rotation of the drum.

58. In a machine of the kind described, a cylindrical drum, an inserting mechanism for inserting pile element material between spacing elements on the drum, means for operating the said drum and said inserting mechanism, means for syncronizing the movement of the drum with the inserting mechanism and means to adjustably control the registration of the inserting mechanism with the said spacing elements to eliminate deviations due to expansion or contraction of the drum.

59. In a machine of the kind described, a cylindrical drum having a series of spacing elements thereon, an inserting mechanism having inserting elements for inserting pile element material between said spacing elements, means for pivotally supporting the said inserting mechanism to one side of a plane through the said inserting elements and the axis of the drum to permit limited pivotal movement of the said inserting elements with expansion or contraction of said drum, a driving element for the drum mounted adjacent the drum surface in the said plane, means for synchronizing the movements of the said inserting elements with said driving means to insure continued registration of the inserting elements with the spaces between said spacing elements, a cement-applying mechanism for applying cement material to portions of the said pile element material while rigidly held between said spacing elements and means for varying the operation of the said cement-applying mechanism so as to apply cement material in a limited path of movement.

60. In a machine of the kind described, a cylindrical drum having a series of spacing elements thereon, an inserting mechanism for inserting pile element material between spacing elements on the drum, means for operating the said drum and said inserting mechanism, a cement-applying mechanism, means for operating the said cement-applying mechanism in a path longitudinally of the said spacing elements during the rotation of the drum, means for synchronizing the movement of the drum with the movements of the inserting mechanism and said cement-applying mechanism, and means to adjustably control the registration of the inserting mechanism and path of movement of the said cement-applying mechanism with respect to said spacing elements.

61. In a machine of the kind described, a cylindrical drum having spacing elements thereon, means for rotating the drum, an inserting mechanism, means for synchronizing the movement of said drum with the movement of the said inserting mechanism, a casing for the said inserting mechanism and means for pivotally supporting the said casing so as to maintain registration of the inserting elements with the said spacing elements with expansion or contraction of the drum.

62. In a machine of the kind described, a cylindrical drum, a series of spacing elements on said drum, an inserting mechanism having an inserting blade for inserting pile element material between said spacing elements, a worm wheel connected to said drum, and a driving worm operatively connected to said worm wheel adjacent said inserting mechanism and substantially in the plane including the axis of the drum and said inserting blade, thereby maintaining said spacing elements in registration with said inserting blade irrespective of expansion or contraction of the drum.

63. In a machine of the kind described, a cylindrical drum, a series of spacing elements on said drum, an inserting mechanism having an inserting blade for inserting pile element material between said spacing elements, a worm wheel connected to said drum, a driving worm operatively connected to drive said worm wheel adjacent said inserting mechanism in substantially the plane including the axis of said drum and said inserting blade, thereby maintaining said spacing elements in registration with said inserting blade irrespective of expansion or contraction of the drum, and means for automatically adjusting the position of said worm with respect to said worm wheel to compensate for expansion or contraction of the said drum.

64. In a machine of the kind described, a cylindrical drum, a series of spacing elements mounted on the surface of said drum, means for uniformly rotating said drum, an inserting mechanism, means for operating the said inserting mechanism in synchronism with the said drum to maintain registration of the parts of the inserting mechanism with said spacing elements and means for automatically adjusting the position of said driving means to compensate for expansion or contraction of said drum.

65. In a machine of the kind described, a cylindrical drum, a series of spacing elements on said drum, an inserting mechanism having elements for inserting a pile element material between said spacing elements, means for mounting the said inserting mechanism independently of the drum to permit automatic adjustment of the said inserting mechanism with expansion or contraction of the drum and means for driving the said drum mounted with respect thereto so as to eliminate deviations due to expansion or contraction of the drum tending to prevent registration of the said elements of the inserting mechanism with the spaces between said spacing elements.

66. In a machine of the kind described, a cylindrical drum, a series of spacing elements arranged on the surface of said drum, an inserting mechanism having an element for inserting a material operated upon into the spaces between said spacing elements, means for pivotally supporting said inserting mechanism to maintain a substantially constant distance thereof from said spacing elements, a driving means for rotating said drum, means for permitting limited oscillating movement of said inserting mechanism to permit movement of said elements of the inserting mechanism with said spacing element during the time it is in engagement in the space between two adjacent spacing elements, and clutch means operative only when the said element is disengaged from said spacing elements serving to disengage the said driving means.

67. In a machine of the kind described, a cylindrical drum, a series of spacing elements arranged on the surface of said drum, an inserting mechanism pivotally mounted to maintain a substantially constant distance from said spacing elements, a driving means for rotating said drum, means for operating said inserting mechanism interdependently with said driving means and means operatively connected with said driving means for oscillating said inserting mechanism to permit movement with said spacing elements of the inserting elements during the time that they remain inserted between said spacing elements.

68. In a machine of the kind described, a cylindrical drum, a series of spacing elements on the surface of said drum, an inserting mechanism having inserting elements, said inserting mechanism being pivotally mounted to maintain engagement between said inserting elements and said spacing elements during movement together, means for oscillating the said inserting elements to move with said spacing elements during engagement therewith, driving means for said drum mounted in substantially the plane of said inserting elements and the axis of the drum to maintain registration of the inserting elements with the spacing elements irrespective of expansion or contraction of the drum with changes in temperature and means for interdependently operating said inserting mechanism with said driving means to reciprocate the inserting elements into the spaces between the spacing elements at the desired predetermined intervals.

69. In a machine of the kind described having means for applying a cement material to a pile element material inserted into the spaces between spacing elements on a drum, the sub-combination which comprises a cement-distributing means, means for moving the said distributing means to longitudinally follow said spacing elements during the rotation of the drum and means for cutting off the supply of cement material therefrom at pre-determined points in the movement of said cement-distributing means so as to supply cement material to only desired portions along the drum.

70. In a machine of the kind described, having means for applying a cement material to a pile element material held on the surface of a drum, the sub-combination comprising a cement applying roller, means for overdriving said roller to cause frictional engagement thereof with the material to be coated, means for applying cement material to the said roller along a pre-determined path, means for moving the said roller out of engagement with the material to be coated at pre-determined points and means for cutting off supply of cement material to said roller at pre-determined points so that substantially all the cement material will be removed from said roller when drawn out of contact with the material to be coated in the path of its travel.

71. In a machine of the kind described, a cylindrical drum, spacing elements mounted on the surface of said drum, driving means for rotating the said drum, means for applying an element to the drum during the rotation thereof modifying the load on said driving means and imposing a constantly changing load thereon, and means operatively associated with the said element for counteracting the changing load on the drum to eliminate changes in load on the said driving means.

In testimony whereof, we affix our signatures.

PAUL S. SMITH.
EMIL G. JEGGE.